(12) United States Patent
Ryou et al.

(10) Patent No.: US 11,875,227 B2
(45) Date of Patent: Jan. 16, 2024

(54) DEVICES AND METHODS FOR FORMING OPTICAL TRAPS FOR SCALABLE TRAPPED ATOM COMPUTING

(71) Applicant: Atom Computing Inc., Berkeley, CA (US)

(72) Inventors: Albert Ryou, Berkeley, CA (US);
Mark Stone, Berkeley, CA (US);
Matthew Norcia, Berkeley, CA (US);
Mickey Mcdonald, Berkeley, CA (US);
Brian Lester, Berkeley, CA (US);
Benjamin Bloom, Berkeley, CA (US)

(73) Assignee: Atom Computing Inc., Berkeley, CA (US)

( * ) Notice: Subject to any disclaimer, the term of this patent is extended or adjusted under 35 U.S.C. 154(b) by 0 days.

(21) Appl. No.: 18/333,437

(22) Filed: Jun. 12, 2023

(65) Prior Publication Data
US 2023/0376819 A1 Nov. 23, 2023

Related U.S. Application Data

(63) Continuation of application No. PCT/US2023/022780, filed on May 18, 2023.
(Continued)

(51) Int. Cl.
*G06N 10/40* (2022.01)

(52) U.S. Cl.
CPC .................................. *G06N 10/40* (2022.01)

(58) Field of Classification Search
CPC .............. G06N 10/40; H01S 3/00; G04F 5/14
See application file for complete search history.

(56) References Cited

U.S. PATENT DOCUMENTS

| 4,225,938 A | 9/1980 | Turpin |
| 4,320,300 A | 3/1982 | Mariella, Jr. |

(Continued)

FOREIGN PATENT DOCUMENTS

| CN | 113808774 A | * 12/2021 |
| CN | 216119577 U | * 3/2022 |

(Continued)

OTHER PUBLICATIONS

Wei et al. "Determination of the coefficient of thermal expansion of ultra-low-expansion glass using an ultrasonic immersion testing method", Applied Optics, May 2023, pp. 3347-3356.*

(Continued)

*Primary Examiner* — Li Wu Chang
(74) *Attorney, Agent, or Firm* — Wilson Sonsini Goodrich & Rosati

(57) ABSTRACT

In an aspect, the present disclosure provides methods and systems for forming optical traps. The optical traps may be three-dimensional optical traps. The methods and systems may comprise use of cavity based optical traps. A device for forming an optical trap may comprise a first optical cavity, said first optical cavity configured to form a first standing wave pattern, wherein said first standing wave pattern is one or two dimensional; a second optical cavity, said second optical cavity configured to form a second standing wave pattern; and a chamber configured to hold one or more atoms disposed within a three-dimensional trapping potential formed by at least said first standing wave pattern and said second standing wave pattern.

34 Claims, 16 Drawing Sheets

Related U.S. Application Data

(60) Provisional application No. 63/343,813, filed on May 19, 2022.

(56) References Cited

U.S. PATENT DOCUMENTS

| | | | |
|---|---|---|---|
| 4,335,938 A | 6/1982 | Giglia et al. | |
| 4,958,357 A | 9/1990 | Kinoshita | |
| 6,252,897 B1 | 6/2001 | Abe | |
| 6,548,809 B2 | 4/2003 | Bouyer et al. | |
| 6,751,009 B2 | 6/2004 | Khoshnevisan et al. | |
| 6,930,318 B2 | 8/2005 | Vion et al. | |
| 6,943,368 B2 | 9/2005 | Amin et al. | |
| 6,979,822 B1 | 12/2005 | Stewart et al. | |
| 6,995,840 B2 | 2/2006 | Hagler | |
| 7,018,852 B2 | 3/2006 | Wu et al. | |
| 7,109,593 B2 | 9/2006 | Freedman et al. | |
| 7,126,112 B2 | 10/2006 | Anderson et al. | |
| 7,133,173 B2 | 11/2006 | Beausoleil, Jr. et al. | |
| 7,277,872 B2 | 10/2007 | Raussendorf et al. | |
| 7,364,923 B2 | 4/2008 | Lidar et al. | |
| 7,398,162 B2 | 7/2008 | Downs et al. | |
| 7,411,181 B2 | 8/2008 | Plewa et al. | |
| 7,451,292 B2 | 11/2008 | Routt | |
| 7,483,142 B2 | 1/2009 | Kent et al. | |
| 7,560,726 B2 | 7/2009 | Beausoleil et al. | |
| 7,769,173 B2 | 8/2010 | Munro et al. | |
| 7,777,177 B2 | 8/2010 | Klotzer | |
| 7,778,951 B2 | 8/2010 | Gilbert et al. | |
| 7,791,780 B2 | 9/2010 | Munro et al. | |
| 7,836,007 B2 | 11/2010 | Beausoleil et al. | |
| 7,955,551 B2 | 6/2011 | McBride et al. | |
| 8,080,778 B2 | 12/2011 | McBride | |
| 8,174,742 B2 | 5/2012 | Roichman et al. | |
| 8,237,105 B1 | 8/2012 | Bulatowicz et al. | |
| 8,373,112 B2 | 2/2013 | Bouyer et al. | |
| 8,374,994 B2 | 2/2013 | Roshen et al. | |
| 8,405,021 B2 | 3/2013 | Anderson et al. | |
| 8,415,162 B2 | 4/2013 | Cerda et al. | |
| 8,415,612 B2 | 4/2013 | McBride et al. | |
| 8,488,232 B2 | 7/2013 | Nakamura et al. | |
| 8,817,254 B2 | 8/2014 | Santori et al. | |
| 8,832,164 B2 | 9/2014 | Allen et al. | |
| 8,849,580 B2 | 9/2014 | Kauffman et al. | |
| 8,860,515 B2 | 10/2014 | Aoyama et al. | |
| 8,913,900 B2 | 12/2014 | Lukin et al. | |
| 8,941,053 B1 | 1/2015 | Biedermann et al. | |
| 9,007,088 B2 | 4/2015 | Liao et al. | |
| 9,086,429 B1 | 7/2015 | Biedermann et al. | |
| 9,117,563 B2 | 8/2015 | Hughes et al. | |
| 9,317,473 B2 | 4/2016 | Yao et al. | |
| 9,355,750 B2 | 5/2016 | Saffman et al. | |
| 9,443,200 B2 | 9/2016 | Schroff | |
| 9,506,868 B2 | 11/2016 | Boufendi et al. | |
| 9,543,052 B2 | 1/2017 | Jackson | |
| 9,564,734 B2 | 2/2017 | Blauvelt et al. | |
| 9,841,375 B2 | 12/2017 | Chen et al. | |
| 9,858,531 B1 | 1/2018 | Monroe et al. | |
| 9,934,469 B1 | 4/2018 | Jau et al. | |
| 9,958,710 B1 | 5/2018 | Morse et al. | |
| 9,960,025 B1 | 5/2018 | Hughes | |
| 9,960,026 B1 | 5/2018 | Hughes | |
| 10,056,908 B2 | 8/2018 | Rigetti et al. | |
| 10,069,504 B2 | 9/2018 | Maki | |
| 10,096,376 B2 | 10/2018 | Benjamin et al. | |
| 10,102,479 B2 | 10/2018 | Tucci | |
| 10,103,463 B1 | 10/2018 | Hughes | |
| 10,192,168 B2 | 1/2019 | Rigetti et al. | |
| 10,278,275 B2 | 4/2019 | Imhof | |
| 10,311,370 B2 | 6/2019 | Bravyi et al. | |
| 10,339,466 B1 | 7/2019 | Ding et al. | |
| 10,352,992 B1 | 7/2019 | Zeng et al. | |
| 10,460,918 B2 | 10/2019 | Hughes | |
| 10,473,943 B1 | 11/2019 | Hughes | |
| 10,504,033 B1 | 12/2019 | King et al. | |
| 10,531,554 B2 | 1/2020 | Imhof | |
| 10,559,392 B1 | 2/2020 | Saffman | |
| 10,613,319 B2 | 4/2020 | Mihailovich et al. | |
| 10,629,417 B1 | 4/2020 | Hughes et al. | |
| 10,648,934 B2 | 5/2020 | Kim et al. | |
| 10,676,350 B2 | 6/2020 | Hughes | |
| 10,712,406 B2 | 7/2020 | Lukin et al. | |
| 10,755,831 B2 | 8/2020 | Anderson | |
| 10,809,177 B2 | 10/2020 | Cooper-Roy et al. | |
| 10,975,852 B2 | 4/2021 | Hughes | |
| 11,002,777 B2 | 5/2021 | Salim et al. | |
| 11,033,981 B2 | 6/2021 | Amini et al. | |
| 11,069,790 B2 | 7/2021 | Anderson et al. | |
| 11,120,360 B2 | 9/2021 | Kim et al. | |
| 11,580,435 B2 | 2/2023 | King et al. | |
| 11,586,968 B2 | 2/2023 | King et al. | |
| 2006/0179029 A1 | 8/2006 | Vala et al. | |
| 2007/0035810 A1 | 2/2007 | Henderson | |
| 2007/0291812 A1 | 12/2007 | Petersen et al. | |
| 2009/0122272 A1 | 5/2009 | Silverstein et al. | |
| 2010/0140458 A1 | 6/2010 | Meyers et al. | |
| 2010/0200739 A1 | 8/2010 | Anderson et al. | |
| 2011/0276526 A1 | 11/2011 | Turbin et al. | |
| 2012/0319085 A1 | 12/2012 | Gambetta et al. | |
| 2015/0000644 A1 | 1/2015 | Freeman | |
| 2015/0260847 A1 | 9/2015 | Sromin et al. | |
| 2016/0125311 A1 | 5/2016 | Fuechsle et al. | |
| 2016/0321559 A1 | 11/2016 | Rose et al. | |
| 2017/0140298 A1 | 5/2017 | Wabnig et al. | |
| 2017/0214410 A1 | 7/2017 | Hincks et al. | |
| 2017/0255871 A1 | 9/2017 | Macready et al. | |
| 2017/0323195 A1 | 11/2017 | Crawford et al. | |
| 2017/0357539 A1 | 12/2017 | Dadashikelayeh et al. | |
| 2018/0096085 A1 | 4/2018 | Rubin | |
| 2018/0114138 A1 | 4/2018 | Monroe et al. | |
| 2018/0232652 A1 | 8/2018 | Curtis et al. | |
| 2018/0246851 A1 | 8/2018 | Zaribafiyan et al. | |
| 2018/0247217 A1 | 8/2018 | Heeres et al. | |
| 2018/0260730 A1 | 9/2018 | Reagor et al. | |
| 2018/0308007 A1 | 10/2018 | Amin et al. | |
| 2018/0341874 A1 | 11/2018 | Puri et al. | |
| 2019/0087743 A1 | 3/2019 | Heeres et al. | |
| 2019/0138928 A1 | 5/2019 | Monroe et al. | |
| 2019/0200445 A1 | 6/2019 | Imhof | |
| 2019/0205784 A1 | 7/2019 | Monroe et al. | |
| 2019/0219815 A1 | 7/2019 | Price et al. | |
| 2020/0023462 A1 | 1/2020 | Amini et al. | |
| 2020/0082291 A1 | 3/2020 | Debnath et al. | |
| 2020/0103032 A1 | 4/2020 | Hughes | |
| 2020/0116623 A1 | 4/2020 | Cooper-Roy et al. | |
| 2020/0175411 A1 | 6/2020 | King et al. | |
| 2020/0185120 A1 | 6/2020 | Keesling Contreras et al. | |
| 2020/0274554 A1 | 8/2020 | Aspuru-Guzik et al. | |
| 2020/0284862 A1 | 9/2020 | Lukin et al. | |
| 2020/0301241 A1 | 9/2020 | Duan et al. | |
| 2020/0395726 A1 | 12/2020 | Lien et al. | |
| 2020/0402681 A1 | 12/2020 | Anderson et al. | |
| 2021/0049494 A1 | 2/2021 | King et al. | |
| 2021/0049495 A1 | 2/2021 | King et al. | |
| 2021/0072139 A1 | 3/2021 | Cooper-Roy et al. | |
| 2021/0166147 A1 | 6/2021 | Kim et al. | |
| 2021/0255228 A1 | 8/2021 | Salim et al. | |
| 2021/0272005 A1 | 9/2021 | King et al. | |
| 2021/0272006 A1 | 9/2021 | King et al. | |
| 2021/0279631 A1 | 9/2021 | Pichler et al. | |
| 2023/0237358 A1 | 7/2023 | King et al. | |

FOREIGN PATENT DOCUMENTS

| | | | |
|---|---|---|---|
| EP | 1310910 A1 | 5/2003 | |
| EP | 1130949 B1 | 9/2005 | |
| EP | 2941659 B1 | 6/2021 | |
| KR | 20120046121 A | 5/2012 | |
| WO | WO-2012113856 A1 | 8/2012 | |
| WO | WO-2015178992 A2 | 11/2015 | |
| WO | WO-2016089711 A1 | 6/2016 | |
| WO | WO-2016111441 A1 | 7/2016 | |
| WO | WO-2016138378 A1 | 9/2016 | |
| WO | WO-2016161935 A1 | 10/2016 | |
| WO | WO-2016196005 A1 | 12/2016 | |

(56) References Cited

FOREIGN PATENT DOCUMENTS

| WO | WO-2016205330 A1 | 12/2016 | | |
|---|---|---|---|---|
| WO | WO-2017066695 A1 | 4/2017 | | |
| WO | WO-2017151200 A1 | 9/2017 | | |
| WO | WO-2017195114 A1 | 11/2017 | | |
| WO | WO-2018033823 A1 | 2/2018 | | |
| WO | WO-2018064535 A1 | 4/2018 | | |
| WO | WO-2018147208 A1 | 8/2018 | | |
| WO | WO-2018236922 A1 | 12/2018 | | |
| WO | WO-2019014589 A1 | 1/2019 | | |
| WO | WO-2019018544 A1 | 1/2019 | | |
| WO | WO-2019021010 A1 | 1/2019 | | |
| WO | WO-2019055843 A1 | 3/2019 | | |
| WO | WO-2019092412 A1 | 5/2019 | | |
| WO | WO-2019094490 A1 | 5/2019 | | |
| WO | WO-2019117922 A1 | 6/2019 | | |
| WO | WO-2019117955 A1 | 6/2019 | | |
| WO | WO-2020102256 A1 | 5/2020 | | |
| WO | WO-2020172588 A1 | 8/2020 | | |
| WO | WO-2020205037 A1 | 10/2020 | | |
| WO | WO-2020236574 A1 | 11/2020 | | |
| WO | WO-2020253957 A1 | 12/2020 | | |
| WO | WO-2021007560 A1 | 1/2021 | | |
| WO | WO-2021048287 A1 | 3/2021 | | |
| WO | WO-2021055217 A1 * | 3/2021 | ............ | H01J 37/22 |
| WO | WO-2021062006 A1 | 4/2021 | | |
| WO | WO-2021165155 A1 | 8/2021 | | |
| WO | WO-2021178037 A1 | 9/2021 | | |
| WO | WO-2021178038 A1 | 9/2021 | | |
| WO | WO-2022251435 A1 | 12/2022 | | |
| WO | WO-2022256166 A2 | 12/2022 | | |

OTHER PUBLICATIONS

Li et al. "Coherent Electron Source Obtaining Device Based on Magnetic LightTrap", CN Doc, 2021, pp. 13.*
Akerman et al. Universal gate-set for trapped-ion qubits using a narrow linewidth diode laser. New Journal of Physics 17(11):1-20 (2015).
Barredo et al. An atom-by-atom assembler of defect-free arbitrary 2d atomic arrays. Science 354(6315):1021-1023 (2016).
Beloy et al. Micromagic clock: microwave clock based on atoms in an engineered optical lattice. Phys. Rev. Lett. 102:120801 (2009).
Benseny et al. Spatial non-adiabatic passage using geometric phases. EPJ Quantum 4(3):1-15 (2017).
Berry. Transitionless Quantum Driving. Journal of Physics A: Mathematical and Theoretical 42(36):365303 (2009).
Bloom et al. An optical lattice clock with accuracy and stability at the 10(-18) level. Nature 506:71-75 (2014).
Bluvstein et al.: A quantum processor based on coherent transport of entangled atom arrays. arXiv:2112.03923v1 [quant-ph], pp. 1-23 URL: https://arxiv.org/abs/2112.03923v1 (2021).
Bowden et al. An adaptable dual species effusive source and Zeeman slower design demonstrated with Rb and Li. Review of Scientific Instruments 87(4):043111 (2016).
Brown et al.: Gray-molasses optical-tweezer loading: controlling collisions for scaling atom-array assembly. Phys. Rev. X 9, 011057, pp. 1-8 (2019).
Butts et al. Efficient broadband Raman pulses for large-area atom interferometry. J. Opt. Soc. Am. B 30:922-927 (2013).
Cai et al.: Monolithic bowtie cavity traps for ultra-cold gases. pre-Print arXiv:2011.01992v1 [cond-mat.quant-gas], pp. 1-15 DOI:10.1364/JOSAB.401262 (2020).
Carpentier et al. Preparation of a single atom in an optical microtrap. Laser Phys. Lett. 10:125501 (2013).
Covey et al.: 2000-times repeated imaging of strontium atoms in clock-magic tweezer arrays. [arXiv:1811.06014v3 [cond-mat.quant-gas]] American Physical Society 122(17):173201, pp. 1-6 doi:10.1103/physrevlett.122.173201 (2019).
Deutsch et al.: Quantum computing with neutral atoms in an optical lattice. Fortschr. Physics 48(9-11):925-943 (2000).

Graham et al.: Rydberg-Mediated Entanglement in a Two-Dimensional Neutral Atom Qubit Array. Phys Rev Lett. 123(23):230501, pp. 1-21 doi: 10.1103/PhysRevLett.123.230501 (2019).
Heinz et al.: Crossed optical cavities with large mode diameters. pre-Print arXiv:2011.01616v2 [cond-mat.quant-gas], pp. 1-5 DOI:10.1364/OL.414076 (2021).
IBM Collaborating With Top Startups to Accelerate Quantum Computing. IBM Blog Research (2015). Available at: http://www.ibm.com/blogs/research/2018/04/ibm-startups-accelerate-quantum/. (10 pgs (Apr. 5, 2018).
International Application No. PCT/US2023/022780 filed on May 18, 2023.
International Application No. PCT/US2023/023897 filed on May 30, 2023.
Jau et al. Entangling Atomic Spins with a Strong Rydberg-Dressed Interaction. Nature Physics 12(1):71-74 (2016).
Jones et al. Fast quantum state control of a single trapped neutral atom. Phys. Rev. A 75:040301(R) (2007).
Katori et al. Ultrastable Optical Clock with Neutral Atoms in an Engineered Light Shift Trap. Phys. Rev. Lett. 91:173005 (2003).
Keating et al. Robust Quantum Logic in Neutral Atoms via Adiabatic Rydberg Dressing. Physical Review A 91:012337 (2015).
Khaneja et al. Optimal Control of Coupled Spin Dynamics: Design of NMR Pulse Sequences by Gradient Ascent Algorithms. Journal of Magnetic Resonance 172(2), 296-305 (2005).
Kim et al. In situ single-atom array synthesis using dynamic holographic optical tweezers. Nat. Commun. 7:13317 (2016).
King et al. Room-temperature in situ nuclear spin hyperpolarization from optically pumped nitrogen vacancy centres in diamond. Nat. Commun. 6:8965 (2015).
Kotru et al. Large-Area Atom Interferometry with Frequency-Swept Raman Adiabatic Passage. Phys. Rev. Lett. 115:103001 (2015).
Lee et al. Defect-Free Atomic Array Formation Using Hungarian Rearrangement Algorithm. Physical Review A 95:053424 (2017).
Lester et al.: Raman cooling imaging: Detecting single atoms near their ground state of motion. Phys. Rev. A 90, 011804(R), pp. 1-5 arXiv:1405.6156v3 [physics.atom-ph] doi:https://arxiv.org/abs/1405.6156 (2014).
Levine et al. High-Fidelity Control and Entanglement of Rydberg-Atom Qubits. Physical Review Letters 121:123603 (2018).
Levine et al.: Parallel Implementation of High-Fidelity Multiqubit Gates with Neutral Atoms. Phys Rev Lett. 123(17):170503, pp. 1-6 doi:10.1103/PhysRevLett.123.170503 (2019).
Lundblad: Designer atom arrays for quantum computing. Nature 561:43-44 doi:10.1038/d41586-018-06107-8 (2018).
Madjarov et al.: High-Fidelity Entanglement and Detection of Alkaline-Earth Rydberg Atoms. pre-Print arXiv:2001.04455v2 [physics.atom-ph] Nature Physics 16:857-861, pp. 1-16 DOI:10.1038/s41567-020-0903-z (2020).
Merrill et al. Progress in Compensating Pulse Sequences for Quantum Computation. Advances in Chemical Physics 154:241-294 (2014).
Mitra et al. Robust Mølmer-Sørenson Gate for Neutral Atoms Using Rapid Adiabatic Rydberg Dressing. Phys. Rev A 101:030301 [arXiv:1911.04045v2 [quant-ph]] (pre-print) (2020).
Mitra et al.: Robust Mølmer-Sørenson gate for neutral atoms using rapid adiabatic Rydberg dressing. Phys. Rev A 101:030301, pp. 1-7 doi:10.1103/physreva.101.030301 (2020).
Muldoon et al. Control and manipulation of cold atoms in optical tweezers. New Journal of Physics 14(7):073051 (2012).
Nelson et al.: Imaging single atoms in a three-dimensional array. Nature Physics 3(8):556-560 DOI:10.1038/nphys645 (2007).
Nielsen et al.: Quantum Computation and Quantum Information. Cambridge University Press 10th Anniversary Edition, pp. 1-704 (2010).
Nogrette et al. Single-Atom Trapping in Holographic 2D Arrays of Microtraps with Arbitrary Geometries. Physical Review X 4:021034 (2014).
Norcia et al.: Microscopic control and detection of ultracold strontium in optical-tweezer arrays. [arXiv:1810.06626 [physics.atom-ph]] American Physical Society (8)(4):041054, pp. 1-14 doi:10.1103/physrevx.8.041054 (2018).

(56) References Cited

OTHER PUBLICATIONS

Pagano et al.: Fast and scalable quantum information processing with two-electron atoms in optical tweezer arrays. ArXiv pre-print arXiv:1808.02503v1 [quant-ph], pp. 1-14 doi:10.48550/arXiv.1808.02503 (2018).
Papageorge et al. Coupling to modes of a near-confocal optical resonator using a digital light modulator. Opt. Express 24:11447-11457 (2016).
Parsons et al. Site-resolved imaging of fermionic A{6}Li in an optical lattice. Phys. Rev. Lett. 114:213002 (2015).
PCT/US2019/061029 International Search Report and Written Opinion dated Apr. 10, 2020.
PCT/US2020/067721 International Search Report and Written Opinion dated Mar. 25, 2021.
PCT/US2020/067740 International Search Report and Written Opinion dated Apr. 1, 2021.
PCT/US2022/029464 International Search Report and Written Opinion dated Feb. 27, 2023.
PCT/US2022/031047 International Search Report and Written Opinion dated Sep. 29, 2022.
Pedersen: Neutral Atom Quantum Computing with Rydberg Blockade. Lundbeck Foundation Theoretical Center for Quantum System Research Department of Physics and Astronomy, University of Aarhus Denmark. PhD Thesis, pp. 1-127. (2008).
Reagor et al. Demonstration of universal parametric entangling gates on a multi-qubit lattice. Sci Adv 4:eaao3603 (2018).
Saffman. Quantum computing with atomic qubits and Rydberg interactions: Progress and challenges. Journal of Physics B: Atomic, Molecular and Optical Physics 49(20):202001 [1-27] www.arxiv.org/abs/1605.05207 (2016).
Schlosser et al.: Collisional blockade in microscopic optical dipole traps. Phys Rev Lett 89(2):023005, pp. 1-4 doi:10.1103/PhysRevLett.89.023005 (2002).
Schlosser et al.: Scalable architecture for quantum information processing with atoms in optical micro-structures. arXiv:1108.5136v1, Quantum Information Processing 10(6):907-924 doi:10.1007/s11128-011-0297-z (2011).
Smith et al.: A practical quantum instruction set architecture. arXiv preprint arXiv:1608.03355, pp. 1-15 (2016).
Theis et al., Counteracting Systems of Diabaticities Using DRAG Controls: The Status after 10 Years. Europhysics Letters 123(6):60001 (2018).
Theis et al.: High-fidelity Rydberg-blockade entangling gate using shaped, analytic pulses. arXiv:1605.08891v3 [quant-ph] American Physical Society, Physical Review A. 94(3):1-7 (2016).
U.S. Appl. No. 16/676,317 Final Office Action dated Aug. 30, 2021.
U.S. Appl. No. 16/676,317 Non-Final Office Action dated Mar. 23, 2022.
U.S. Appl. No. 16/900,641 Final Office Action dated Aug. 30, 2021.
U.S. Appl. No. 16/900,641 Final Office Action dated Oct. 20, 2022.
U.S. Appl. No. 16/900,641 Non-Final Office Action dated Mar. 17, 2022.
U.S. Appl. No. 16/900,644 Non-Final Office Action dated Mar. 18, 2022.
U.S. Appl. No. 16/676,317 Office Action dated Feb. 3, 2021.
U.S. Appl. No. 16/900,641 Office Action dated Jan. 25, 2021.
U.S. Appl. No. 16/900,644 Office Action dated Dec. 24, 2020.
U.S. Appl. No. 16/900,644 Office Action dated Jul. 14, 2021.
Wang et al. Coherent Addressing of Individual Neutral Atoms in a 3D Optical Lattice. Phys. Rev. Lett. 115:043003 (2015).
Weiss et al.: Quantum computing with neutral atoms. Physics Today 70(7):44-50 doi:10.1063/PT.3.3626 (2017).
Willems et al. Creating long-lived neutral-atom traps in a cryogenic environment. Phys. Rev. A 51:1403-1406 (1995).
Wineland. Nobel Lecture: Superposition, entanglement, and raising Schrodinger's cat. Rev. Mod. Phys. 85:1103-1114 (2013).
Wolfowicz et al.: Pulse Techniques for Quantum Information Processing. eMagRes 5:1515-1528. DOI:10.1002/9780470034590.emrstm1521 (2016).
Yamaguchi. Metastable State of Ultracold and Quantum Degenerate Ytterbium Atoms: High-Resolution Spectroscopy and Cold Collisions. Thesis Kyoto University (3 pgs.) (2008).
Yamamoto et al. An ytterbium quantum gas microscope with narrow-line laser cooling. New J. Phys. 18:023016 (2016).
Yang et al.: Site-resolved imaging of ultracold fermions in a triangular-lattice quantum gas microscope. PRX Quantum, American Physical Society 2(2):020344, pp. 1-9 DOI:10.1103/PRXQuantum.2.020344 (2021).
PCT/US2023/022780 Invitation to Pay Additional Fees dated Jul. 7, 2023.
Bennetts et al.: Steady-State Magneto-Optical Trap with 100-Fold Improved Phase-Space Density. Phys Rev Lett. 119(22):223202, pp. 1-6. doi:10.1103/PhysRevLett.119.223202 (2017).
U.S. Appl. No. 16/900,641 Non-Final Office Action dated Jul. 19, 2023.
PCT/US2022/029464 Invitation to Pay Additional Fees dated Dec. 20, 2022.
PCT/US2023/022780 International Search Report and Written Opinion dated Sep. 29, 2023.
U.S. Appl. No. 18/068,408 Non-Final Office Action dated Aug. 2, 2023.
U.S. Appl. No. 16/405,877 Notice of allowance dated Aug. 7, 2019.
Wei et al., Determination of the coefficient of thermal expansion of ultra-low-expansion glass using an ultrasonic immersion testing method. Appl Opt. 62(13):3347-3356 (2023).

\* cited by examiner

DEVICES AND METHODS FOR FORMING OPTICAL TRAPS FOR SCALABLE TRAPPED ATOM COMPUTING

CROSS-REFERENCE

This application is a continuation of International Application No. PCT/2023/022780, filed May 18, 2023, which claims the benefit of U.S. Provisional Application No. 63/343,813, filed May 19, 2022, each of which is incorporated by reference herein in its entirety.

BACKGROUND

Quantum computers typically make use of quantum-mechanical phenomena, such as superposition and entanglement, to perform operations on data. Quantum computers may be different from digital electronic computers based on transistors. For instance, whereas digital computers require data to be encoded into binary digits (bits), each of which is always in one of two definite states (0 or 1), quantum computation uses quantum bits (qubits), which can be in superpositions of states.

SUMMARY

Recognized herein is the need for methods and systems for performing non-classical computations.

The present disclosure provides systems and methods for utilizing atoms (such as neutral or uncharged atoms) to perform non-classical or quantum computations. The atoms may be optically trapped in large arrays. Quantum mechanical states of the atoms (such as hyperfine states or nuclear spin states of the atoms) may be configured to function as quantum bit (qubit) basis states. The qubit states may be manipulated through interaction with optical, radiofrequency, or other electromagnetic radiation, thereby performing the non-classical or quantum computations.

In one aspect, the present disclosure provides a device for forming an optical trap, the device comprising: a first optical cavity, the first optical cavity configured to form a first standing wave pattern, wherein the first standing wave pattern is one or two dimensional; a second optical cavity, the second optical cavity configured to form a second standing wave pattern; and a chamber configured to hold one or more atoms disposed within a three-dimensional trapping potential formed by at least the first standing wave pattern and the second standing wave pattern.

In some embodiments, the one or more atoms comprise one or more qubits. In some embodiments, the one or more qubits are configured to perform a non-classical computation. In some embodiments, the non-classical computation is a quantum computation. In some embodiments, the non-classical computation is a gate-model quantum computation or an adiabatic quantum computation. In some embodiments, the one or more atoms comprises at least 100 atoms. In some embodiments, the one or more atoms comprise neutral atoms. In some embodiments, the one or more atoms comprise rare earth atoms. In some embodiments, the rare earth atoms comprise ytterbium atoms. In some embodiments, the one or more atoms comprise alkali atoms. In some embodiments, the one or more atoms comprise alkaline earth atoms. In some embodiments, the alkaline earth atoms comprise ytterbium atoms. In some embodiments, the ytterbium atoms comprise ytterbium-171 atoms. In some embodiments, the alkaline earth atoms comprise strontium atoms. In some embodiments, the strontium atoms comprise strontium-87 atoms. In some embodiments, the first optical cavity is a folded, standing wave cavity. In some embodiments, the first optical cavity comprises two end mirrors and at least two fold mirrors, wherein the at least two fold mirrors are oriented to form a point of interaction within the first cavity. In some embodiments, the two end mirrors each have a radius of curvature of at least about 40 millimeters (mm). In some embodiments, the at least two fold mirrors are substantially flat. In some embodiments, the point of interaction is coincident with an imaging axis of an imaging unit configured to obtain one or more images of the one or more atoms. In some embodiments, the second optical cavity is a folded, running wave cavity. In some embodiments, a first and a second arm of the folded, running wave cavity intersect to form an accordion mode. In some embodiments, a first and a second arm intersect to form a 1-dimension optical lattice with periodicity depending on an intersection angle of the first and the second arm, which may be referred to as an "accordion mode." In some embodiments, the first and the second arm intersect at an angle of about 30 degrees. In some embodiments, the folded, running wave cavity comprises a point of intersection, wherein the point of intersection is coincident with an imaging axis of an imaging unit configured to obtain one or more images of the one or more atoms. In some embodiments, the second optical cavity is a ring cavity. In some embodiments, the ring cavity comprises a bow-tie configuration. In some embodiments, the bow-tie configuration comprises a point of intersection, wherein the point of intersection is coincident with an imaging axis of an imaging unit configured to obtain one or more images of the one or more atoms. In some embodiments, the first standing wave pattern is within the first optical cavity. In some embodiments, the second standing wave pattern is within the second optical cavity. In some embodiments, the first standing wave pattern is a two-dimensional standing wave pattern and wherein the second standing wave pattern is within a third-dimension which is not parallel to either dimension of the first standing wave pattern. In some embodiments, a period of the standing wave pattern is about twice a period of the two-dimensional standing wave pattern. In some embodiments, the first optical cavity or the second optical cavity is part of the chamber. In some embodiments, the device further comprises a third optical cavity configured to form a third standing wave pattern. In some embodiments, the one or more atoms disposed within the three-dimensional trapping potential comprise a temperature of about 10 microkelvin (μK). In some embodiments, the first optical cavity and the second optical cavity are disposed within one or more vacuum units configured to maintain the system at a pressure of at most 10-6 Pascal (Pa). In some embodiments, the three-dimensional trapping potential comprises a plurality of optical trapping sites, wherein each optical trapping site of the plurality of optical trapping sites is spatially distinct. In some embodiments, each optical trapping site of the plurality of optical trapping sites is spatially separated from each other optical trapping site by at least 200 nanometers (nm). In some embodiments, each optical trapping site of the plurality of optical trapping sites is configured to trap a single atom of the plurality of atoms. In some embodiments, the first optical cavity and the second optical cavity each comprise one or more cavity mirrors, wherein each of the cavity mirrors are mounted within a cavity spacer. In some embodiments, the cavity spacer is made from glass whose thermal expansion coefficient is small. In some embodiments, the cavity spacer comprises ultra-low thermal expansion glass. In some embodiments, the ultra-low thermal expansion glass comprises a coefficient of thermal expansion of at most about 400+/−30 parts per billion (ppB)/° C. at an operating temperature. In some embodiments, the operating temperature is between 5 to 35° C.

In another aspect, the present disclosure provides a device for generating a phase stable cavity, the device comprising: a cavity spacer comprising one or more mirrors affixed to the cavity spacer; wherein the one or more mirrors are oriented to form a three-dimensional trapping potential within the cavity spacer; wherein the cavity spacer comprises glass having a coefficient of thermal expansion of at most about 400+/−30 ppB/° C. at an operating temperature. In some embodiments, the operating temperature is between 5 to 35° C.

In some embodiments, the one or more mirrors form a first optical cavity, the first optical cavity configured to form a first standing wave pattern, wherein the first standing wave pattern is one or two dimensional. In some embodiments, the one or more mirrors form a second optical cavity, the second optical cavity configured to form a second standing wave pattern. In some embodiments, the device further comprises one or more atoms disposed within the three-dimensional trapping potential formed by at least the first standing wave pattern and the second standing wave pattern. In some embodiments, the device further comprises one or more atoms trapped within the three-dimensional trapping potential. In some embodiments, the one or more atoms comprise one or more qubits. In some embodiments, the one or more qubits are configured to perform a non-classical computation In some embodiments, the non-classical computation is a quantum computation. In some embodiments, the non-classical computation is a gate-model quantum computation or an adiabatic quantum computation. In some embodiments, the one or more atoms comprises at least 100 atoms. In some embodiments, the one or more atoms comprise neutral atoms. In some embodiments, the one or more atoms comprise rare earth atoms. In some embodiments, the rare earth atoms comprise ytterbium atoms. In some embodiments, the one or more atoms comprise alkali atoms. In some embodiments, the one or more atoms comprise alkaline earth atoms. In some embodiments, the alkaline earth atoms comprise ytterbium atoms. In some embodiments, the ytterbium atoms comprise ytterbium-171 atoms. In some embodiments, the alkaline earth atoms comprise strontium atoms. In some embodiments, the strontium atoms comprise strontium-87 atoms. In some embodiments, the one or more atoms disposed within the three-dimensional trapping potential comprise a temperature of about 10 microkelvin (µK). In some embodiments, the cavity spacer is part of the chamber. In some embodiments, the device is configured to maintain the device at a pressure of at most 10-6 Pascal (Pa). In some embodiments, the three-dimensional trapping potential comprises a plurality of optical trapping sites, wherein each optical trapping site of the plurality of optical trapping sites is spatially distinct. In some embodiments, each optical trapping site of the plurality of optical trapping sites is spatially separated from each other optical trapping site by at least 200 nanometers (nm). In some embodiments, each optical trapping site of the plurality of optical trapping sites is configured to trap a single atom of the plurality of atoms.

In another aspect, the present disclosure provides a method for forming an optical trap, the method comprising: forming a first standing wave pattern with a first optical cavity, wherein the first standing wave pattern is one or two dimensional; forming a second standing wave pattern with a second optical cavity; and trapping one or more atoms within a three-dimensional trapping potential, wherein the three-dimensional trapping potential is formed by at least the first standing wave pattern and the second standing wave pattern.

In some embodiments, the one or more atoms comprise one or more qubits. In some embodiments, the one or more qubits are configured to perform a non-classical computation In some embodiments, the non-classical computation is a quantum computation. In some embodiments, the non-classical computation is a gate-model quantum computation or an adiabatic quantum computation. In some embodiments, the one or more atoms comprises at least 100 atoms. In some embodiments, the one or more atoms comprise neutral atoms. In some embodiments, the one or more atoms comprise rare earth atoms. In some embodiments, the rare earth atoms comprise ytterbium atoms. In some embodiments, the one or more atoms comprise alkali atoms. In some embodiments, the one or more atoms comprise alkaline earth atoms. In some embodiments, the alkaline earth atoms comprise ytterbium atoms. In some embodiments, the ytterbium atoms comprise ytterbium-171 atoms. In some embodiments, the alkaline earth atoms comprise strontium atoms. In some embodiments, the strontium atoms comprise strontium-87 atoms. In some embodiments, the one or more atoms disposed within the three-dimensional trapping potential comprise a temperature of about 10 microkelvin (µK). In some embodiments, the three-dimensional trapping potential comprises a plurality of optical trapping sites, wherein each optical trapping site of the plurality of optical trapping sites is spatially distinct. In some embodiments, each optical trapping site of the plurality of optical trapping sites is spatially separated from each other optical trapping site by at least 200 nanometers (nm). In some embodiments, each optical trapping site of the plurality of optical trapping sites is configured to trap a single atom of the plurality of atoms.

In another aspect, the present disclosure provides a method for generating a phase stable cavity, the device comprising: providing a cavity spacer comprising one or more mirrors affixed to the cavity spacer; wherein the one or more mirrors are oriented to form a three-dimensional trapping potential within the cavity spacer; wherein the cavity spacer comprises glass having a coefficient of thermal expansion of at most about 400+/−30 ppB/° C. at an operating temperature. In some embodiments, the operating temperature is between 5 to 35° C.

In some embodiments, the method further comprises forming a first standing wave pattern with a first optical cavity, wherein the first standing wave pattern is one or two dimensional. In some embodiments, the method further comprises forming a second standing wave pattern with a second optical cavity. In some embodiments, the method further comprises trapping one or more atoms within the three-dimensional trapping potential, wherein the three-dimensional trapping potential is formed by at least the first standing wave pattern and the second standing wave pattern. In some embodiments, the one or more atoms comprise one or more qubits. In some embodiments, the one or more qubits are configured to perform a non-classical computation In some embodiments, the non-classical computation is a quantum computation. In some embodiments, the non-classical computation is a gate-model quantum computation or an adiabatic quantum computation. In some embodiments, the one or more atoms comprises at least 100 atoms. In some embodiments, the one or more atoms comprise neutral atoms. In some embodiments, the one or more atoms comprise rare earth atoms. In some embodiments, the rare earth atoms comprise ytterbium atoms. In some embodiments, the one or more atoms comprise alkali atoms. In some embodiments, the one or more atoms comprise alkaline earth atoms. In some embodiments, the alkaline earth atoms comprise strontium atoms. In some embodiments, the strontium atoms comprise strontium-87 atoms. In some embodiments, the one or more atoms disposed within the three-dimensional trapping potential comprise a temperature of about 10 microkelvin (µK). In some embodiments, the cavity spacer is part of a chamber. In some embodiments, the three-dimensional trapping potential comprises a plurality of optical trapping sites, wherein each optical trapping site of the plurality of optical trapping sites is spatially distinct. In some embodiments, each optical trapping site of the plurality of optical trapping sites is spatially separated from each other optical trapping site by at least 200 nanometers (nm). In some embodiments, each optical trapping site of the plurality of optical trapping sites is configured to trap a single atom of the plurality of atoms.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
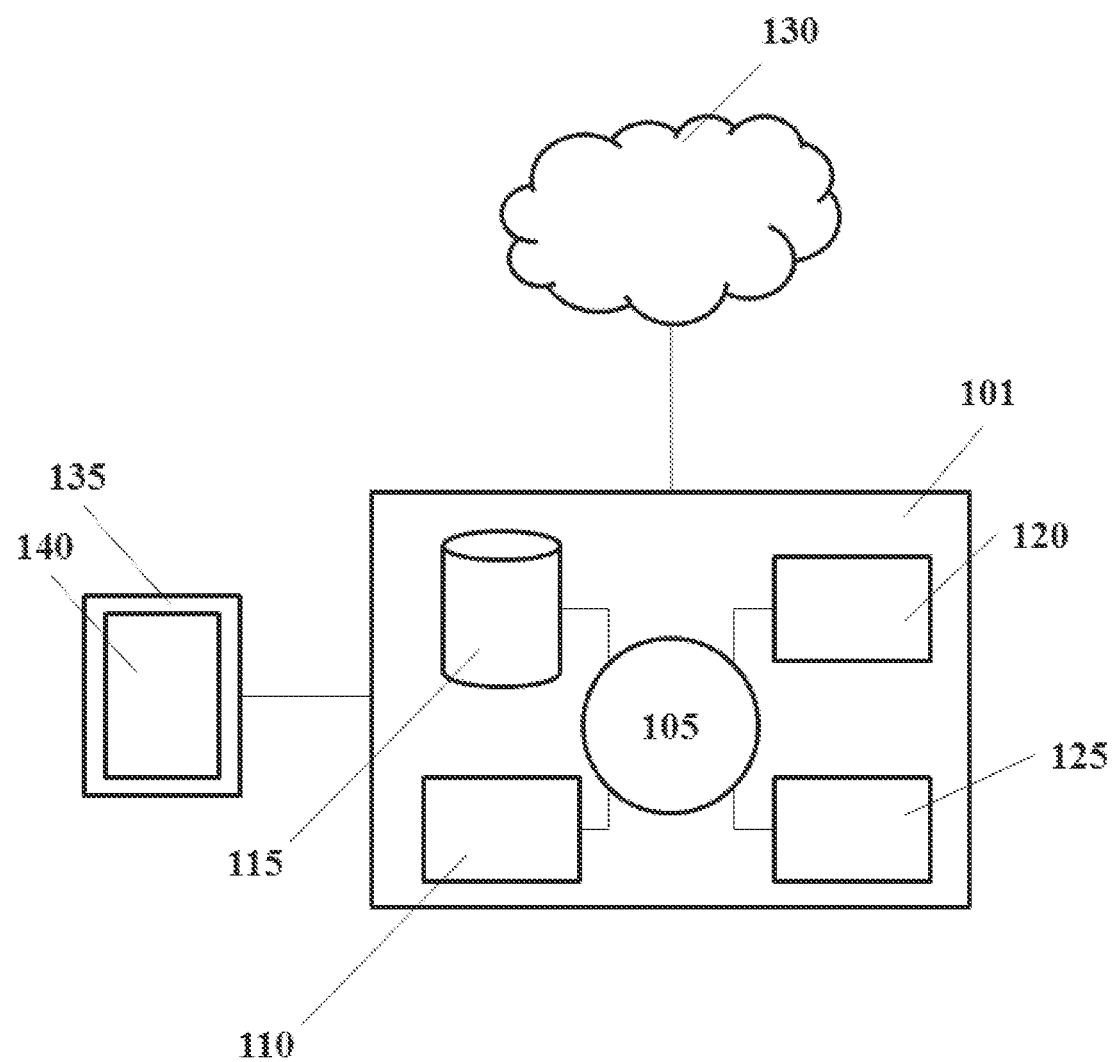
FIG. 1 shows a computer control system that is programmed or otherwise configured to implement methods provided herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

In some cases, a common readout technique for neutral-atom qubits may be fluorescence imaging, which may include shining a laser beam at trapped atoms that are trapped in an optical potential and collecting scattered photons. Aside from a high detector efficiency, efficient imaging may include, in some cases, multiple scattering events. However, in some cases, the act of scattering may heat the trapped atoms. In some cases, when one or more of the trapped atoms gain enough energy, the one or more trapped atoms can subsequently overcome a trapping potential barrier and become lost, which may induce error. Thus, in some cases, an optical potential may be designed to be "deep" in order to allow multiple scattering events without losing the trapped atoms. Conventional optical potentials such as those formed by optical tweezers (see, e.g., Madjarov, et al. 2020. "High-fidelity entanglement and detection of alkaline-earth Rydberg atoms," *Nature Physics*, 16, pp. 857-861, which is incorporated herein by reference in its entirety for all purposes) or optical lattices (see, e.g., Nelson et al. 2007. "Imaging single atoms in a three-dimensional array" *Nature Physics*, 3, pp. 556-560, or Yang, et al. 2021. "Site-resolved imaging of ultracold fermions in a triangular-lattice quantum gas microscope", *PRX Quantum*, 2, p. 020344, each of which is incorporated herein by reference in its entirety for all purposes) may use, for example, a few watts of laser power to trap hundreds of individual atoms, and can be made with a commercial laser. On the other hand, in some cases, scaling the number of atoms to hundreds, thousands, etc., as may be the goal of a quantum computer, may be difficult to be achieved the same way without extreme technical challenges, and thus may benefit from a new solution.

In some cases, optical cavities (or resonators), comprised of highly reflecting mirrors, can resonantly amplify light. An incident light, in some cases, once coupled into a cavity, can bounce multiple times inside the cavity before leaking out, with corresponding positive interference leading to overall amplification. Furthermore, in some cases, a corresponding build-up factor depends on the quality of the reflective coating of the highly reflecting mirrors and can easily reach tens of thousands or more. Thus, even a small incident laser beam (e.g., hundreds of milliwatts) can, in some cases, result in hundreds of watts inside the cavity. The present disclosure provides, in some cases, a solution that includes utilizing the cavity-enhanced light to make a large number (e.g., thousands) of deep optical traps for neutral atom qubits.

While optical cavities have been used, in some cases, for lasers, feedback, and quantum simulations, the application of optical cavities for creating optical lattices for atom trapping remains novel due to several challenges. First, the cavity-enhanced optical potentials may, in some cases, provide trapping in all three directions in order to trap atoms, which may implement complex engineering of the cavity geometry. While a few academic groups used two-dimensional cavity-enhanced traps (see, e.g., Cai et al. 2020. "Monolithic bowtie cavity traps for ultra-cold gases," *Journal of Optical Society of America B*, 37(12), pp. 3596-3603, or Heinz et al. 2021. "Crossed optical cavities with large mode diameters," *Optics Letters*, 46(2), pp. 250-253, each of which is incorporated herein by reference in its entirety for all purposes), the academic groups have resorted to using a conventional, non-cavity-enhanced laser to provide trapping along the third dimension, thus failing to take full advantage of cavities. Second, the potentials may, in some cases, benefit from being stable against noise, including slow drifts as well as short-term jitters. In some cases, common cavities are constructed by fixing mirrors on a monolithic material, called cavity spacer (e.g., stainless steel, invar, low thermal expansion glass, etc.), but there may be certain challenges in machining and assembling cavity spacers.

In some cases, the present disclosure provides a solution that includes a three-dimensional optical potential formed by two intersecting cavities: a folded, standing-wave cavity and a folded, running-wave cavity. In some cases, the standing-wave cavity may provide tight confinement in two dimensions, while the running-wave cavity may superimpose an additional lattice in the third direction with a flexible lattice spacing—a configuration that may be known as an "accordion." In some cases, the present disclosure may provide an exotic cavity spacer made of ultra-low thermal expansion (ULE) glass that holds numerous (e.g., eight) mirrors in a stable configuration via optical bonding.

In some cases, creating a three-dimensional trapping potential with optical cavities may include implementing a sophisticated design involving multiple overlapping beams. In some cases, the three-dimensional trapping potential may be created by two intersecting cavities: (A) a folded, standing-wave cavity in the "atom plane" and (B) a ring cavity in the bow-tie configuration (e.g., in which two arms of the cavity mode intersect at an oblique angle to create an "accordion", in the plane orthogonal to the atom plane and the objective plane).

Turning first to the atom plane, in some cases, in the atom plane, the "transverse" confinement may be created by a standard 1-dimensional cavity that has been folded onto itself, resulting in a 2-dimensional cavity made up of, for example, four mirrors. The point of interaction ("cavity center") may, in some cases, be coincident with the objective axis (e.g., the direction from which the microscope objectives can collect the scattered photons during imaging). In some cases, the geometry may be created by four mirrors: two curved outer mirrors with a large radius of curvature (ROC) and two flat inner mirrors that fold the beam. A large ROC may, in some cases, ensure that at the cavity center the beam size is also large (e.g., the radius scales as square root of the wavelength of the laser). The large beam size may also be, in some cases, useful in creating a uniform array of optical traps. Because the circulating light may be linearly polarized along the objective axis, in some cases, the resulting lattice may have four times the intensity due to interference relative to a standard 1-dimensional lattice.

Turning second to the accordion cavity, in some cases, in the objective plane, the "axial" confinement may be created by a 2-dimensional, running-wave ring cavity in the "bow-tie" configuration (e.g., in which two arms of the cavity mode intersect at an oblique angle). Compared to a standing-wave cavity, where the lattice spacing may be equal to wavelength/2 for a 1-dimensional cavity or may be equal to wavelength/$\sqrt{2}$ for the atom plane cavity described above, the accordion cavity may, in some cases, yield a larger spacing that depends on an angle of separation. In some cases, the angle of separation may be about 30 degrees, resulting in the axial spacing of about twice the wavelength. In some cases, the larger spacing may help to avoid atoms loading into multiple planes during their transfer from another optical potential (e.g., an array of tweezers used for computation) to the cavity-enhanced imaging lattice. The ROC of the four mirrors that comprise the accordion cavity may be, in some cases, tens of millimeters for the two adjacent mirrors and flat for the other mirrors. This asymmetry may, in some cases, help to maximize the beam size at the location of the cavity center, thereby improving trapping ability of a large array of uniform traps for trapping atoms.

While the methods and the systems disclosed herein may be applicable to performing non-classical computations, in some embodiments, the methods and the systems disclosed herein may be applied to quantum clocks or quantum sensors, e.g., using the presently-disclosed cavity techniques).

Example of Optical Cavities

In another aspect, the present disclosure provides a device for forming an optical trap. The device may comprise a first optical cavity. The first optical cavity may be configured to form a first standing wave pattern. The first standing wave pattern may be one dimensional or two dimensional. The device may comprise a second optical cavity. The second optical cavity may be configured to form a second standing wave pattern. The second optical cavity may be configured to form a running wave pattern. The device may comprise a chamber configured to hold one or more atoms disposed within a three-dimensional trapping potential formed by at least the first standing wave pattern and the second standing wave pattern.

The one or more atoms may comprise one or more qubits as described elsewhere herein. For example, the one or more atoms may be configured to be usable as one or more qubits. The one or more qubits may be configured to perform a non-classical computation (e.g., a non-classical computation as described elsewhere herein). For example, the one or more qubits can be configured to perform a gate-based quantum computation. In another example, the one or more qubits may be configured to perform a quantum computation. The one or more atoms may comprise at least about 1, 2, 3, 4, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 300, 400, 500, or more atoms. The one or more atoms may comprise at most about 500, 400, 300, 200, 190, 180, 170, 160, 150, 140, 130, 120, 110, 100, 95, 90, 85, 80, 75, 70, 65, 60, 55, 50, 45, 40, 35, 30, 25, 20, 15, 10, 5, 4, 3, 2, or fewer atoms. The one or more atoms may comprise a number of atoms as defined by any two of the proceeding values. For example, the one or more atoms may comprise from about 75 to about 150 atoms. The one or more atoms may comprise neutral atoms. For example, the one or more atoms may comprise atoms that are not ionized (e.g., are in a neutral state). Each atom of the one or more atoms may be a neutral atom. For example, each atom of an array of atoms can be not ionized. The one or more atoms may comprise rare earth atoms (e.g., lanthanide series atoms (e.g., ytterbium, neodymium, lanthanum, erbium, etc.), scandium, yttrium, etc.), alkali atoms (e.g., sodium, potassium, etc.), alkali earth atoms (e.g., calcium, strontium (e.g., strontium-87 atoms), etc.), or the like, or any combination thereof.

The first optical cavity may be a folded, standing wave cavity. A folded optical cavity may be configured to have light pass multiple times through the optical cavity, thus increasing the path length to a length larger than the length of the optical cavity. For example, a series of mirrors can be configured to reflect light in the folded cavity, thereby increasing the path length in the cavity by the length of the cavity for each reflection. In this way, optics with larger focal lengths can be fit into smaller footprints. In the case of an optical cavity, the smaller footprint may enable a larger cavity to be formed in a smaller space, improving the amount size of a non-classical computer that can be formed in the cavity. The folded optics may also provide for increased intensity (e.g., be configured as at least a portion of an enhancement cavity). For example, the folded optics can provide a resonant cavity configured to increase an intensity of a light applied to the folded optics. A standing wave cavity may be configured to maintain a standing wave in the cavity. A standing wave may be a wave that does not move in position while oscillating in time. For example, the locations of the maxima and minima of a standing wave may not move, though the amplitudes of the maxima and minima may change with time. The standing wave may be configured to provide a plurality of spatially stable locations for a plurality of optical traps in a plane of the first cavity. For example, an array of two-dimensional traps can be formed using the first optical cavity. In this example, the traps may not be trapping in a third dimension perpendicular to the plane of the two dimensions. The intensity fluctuations of the standing wave may be on a timescale such that an atom in the potential created by the standing wave may be subjected to an average of the intensity fluctuations (e.g., the fluctuations may be on a sufficiently fast time scale as to not impact the atom except in aggregate).

The first optical cavity may comprise two end mirrors and at least two fold mirrors. The at least two fold mirrors may be oriented to for a point of interaction within the first cavity. This plurality of mirrors may be as described elsewhere herein. For example, two of the mirrors can be flat end mirrors and two of the mirrors can be fold mirrors. The positioning of the mirrors can result in the generation of a point of interaction. Examples of the invention may incorporate pluralities of mirrors of previously determined or previously undetermined radii of curvature. Any mirror within a plurality of mirrors may have a radius of curvature of at least about 20, 25, 30, 35, 40, 41, 42, 43, 44, 45, 46, 47, 48, 49, 50, 51, 52, 53, 54, 55, 56, 57, 58, 59, 60, 65, 70, or more millimeters (mm). Any mirror within a plurality of mirrors may have a radius of curvature of at most about 70, 65, 60, 59, 58, 57, 56, 55, 54, 53, 52, 51, 50, 49, 48, 47, 46, 45, 44, 43, 42, 41, 40, 35, 30, 25, 20, or fewer mm. Any mirror within a plurality of mirrors may have a radius of curvature in a range as defined by any two of the proceeding values. These values and ranges may apply to any mirror incorporated into any example of the invention in circumstances when said mirror is intended to be curved or when said mirror is intended to be substantially flat. For example, the at least two fold mirrors may be configured not to have a predetermined radius of curvature (e.g., be configured to be flat within manufacturing tolerances). The at least two fold mirrors may be substantially flat.

The point of interaction may be configured to be usable in the generation of one or more optical traps in the cavity. The point of interaction may be coincident with an imaging axis of an imaging unit configured to obtain one or more images of the one or more atoms. For example, a camera system configured to illuminate and image the one or more atoms can be configured to image the area of the point of interaction.

The second optical cavity may comprise a folded, running wave cavity. The folded cavity may be as described elsewhere herein. The running wave cavity may be configured to provide a running wave (e.g., a wave whose amplitude and peak position both fluctuate with time). The running wave may be configurable to change a trapping configuration in the dimension of the running wave. For example, the running wave can be tuned to provide a first one dimensional array of traps at a first time, and a second one dimensional array of traps at a second time. In this way, the traps provided by the running wave cavity can be adjusted depending on a predetermined configuration of the traps. The running wave cavity can be configured to provide a third dimension of trapping to a two-dimensional trap array provided by a standing wave cavity.

A first and second arm of the folded, running wave cavity may intersect to form an accordion mode. The accordion mode may be configured to provide a plurality of peaks and valleys visually similar to the ribs of an accordion. The accordion mode may be configured to provide a plurality of traps in the cavity. The first and the second arms may intersect at an angle of at least about 5, 10, 15, 20, 25, 30, 35, 40, 45, 50, 55, 60, 65, 70, 75, 80, 85, or more degrees. The first and the second arms may intersect at an angle of at most about 85, 80, 75, 70, 65, 60, 55, 50, 45, 40, 35, 30, 25, 20, 15, 10, 5, or fewer degrees. The first and second arms may intersect at an angle in a range as defined by any two of the proceeding values. The folded, running wave cavity may comprise a point of intersection. The point of intersection may be coincident with an imaging axis of an imaging unit configured to obtain one or more images of the one or more atoms, as described elsewhere herein.

The second optical cavity may be a ring cavity. For example, the cavity may be configured to propagate light in a ring shape (e.g., around a central area). The ring cavity may comprise a bow-tie configuration. For example, the mirrors of the ring cavity can be positioned such that the path of light forms a bow-tie shape. The bow-tie configuration may comprise a point of intersection (e.g., a center point of the bow-tie configuration). The point of intersection may be coincident with an imaging axis of an imaging unit configured to obtain one or more images of the one or more atoms, as described elsewhere herein.

The first standing wave pattern may be within the first optical cavity. For example, the first standing wave pattern can be formed in the area bounded by the first optical cavity. The first optical cavity can be configured to generate the first standing wave pattern (e.g., the optics of the first optical cavity can be positioned to form the first standing wave pattern). The second standing wave pattern may be within the second optical cavity. For example, the second optical cavity can be configured to form the second standing wave pattern within the bounds of the second optical cavity. The first standing wave pattern may be a two-dimensional standing wave pattern. The second standing wave pattern may be within a third dimension which is not parallel to either dimension of the first standing wave pattern. In this way, the first and second standing wave patterns can form at least one trap in three dimensions. For example, a plurality of three-dimensional optical traps can be formed using the first and second standing waves, since the first standing wave pattern can form two dimensions of the optical traps, while the second standing wave pattern can form the third dimension of the optical traps.

A period of the standing wave pattern may be at least about 0.5, 1, 1.5, 2, 2.5, 3, 4, 5, or more times a period of the two-dimensional standing wave pattern. For example, the period of the standing wave pattern can be about twice the period of the two-dimensional standing wave pattern. In another example, for a standing wave with a period of $\lambda/2$, the two-dimensional standing wave can have a period of $\lambda/2$ if the polarizations of the standing wave and the two-dimensional standing wave are orthogonal, or a period of $\lambda/\sqrt{2}$ if the polarizations are the same. The first optical cavity or the second optical cavity can be a part of the chamber. For example, portions of the chamber can be fitted with mirrors to form at least portions of the first and/or second optical cavities. In this way, the first or second optical cavities can be formed integral to the chamber.

The device may comprise a third optical cavity configured to form a third standing wave pattern. The third optical cavity may be an optical cavity as described elsewhere herein. The third standing wave pattern may be configured to change and/or enhance the properties of the first and second standing wave patterns. For example, the third standing wave pattern can be configured to enhance certain traps formed by the first and second standing wave patterns.

The one or more atoms disposed within the three-dimensional trapping potential may comprise a temperature of at least about 1, 2, 3, 4, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 300, 400, 500, or more microkelvin. The one or more atoms disposed within the three-dimensional trapping potential may comprise a temperature of at most about 500, 400, 300, 200, 190, 180, 170, 160, 150, 140, 130, 120, 110, 100, 95, 90, 85, 80, 75, 70, 65, 60, 55, 50, 45, 40, 35, 30, 25, 20, 15, 10, 5, 4, 3, 2, 1, or less microkelvin. The one or more atoms disposed within the three-dimensional trapping potential may comprise a temperature in a range as defined by any two of the proceeding values. The first optical cavity and the second optical cavity may be disposed within one or more vacuum units configured to maintain the system at a pressure of at least about $10^{-10}$ (1E-10), 1E-9, 1E-8, 1E-7, 1E-6, 1E-5, or more Pascal. The first optical cavity and the second optical cavity may be disposed within one or more vacuum units configured to maintain the system at a pressure of at most about 1E-5, 1E-6, 1E-7, 1E-8, 1E-9, 1E-10, or less Pascal. The first optical cavity and the second optical cavity may be disposed within one or more vacuum units configured to maintain the system at a pressure in a range as defined by any two of the proceeding values.

The three-dimensional trapping potential may comprise a plurality of optical trapping sites. Each optical trapping site of the plurality of optical trapping sites may be spatially different. For example, each optical trapping site can be configured such that the area of a first optical trapping site is not shared with any other optical trapping sites. Each optical trapping site of the plurality of optical trapping sites may be separated from each other optical trapping site by at least about 10, 20, 30, 40, 50, 60, 70, 80, 90, 100, 200, 300, 400, 500, 600, 700, 800, 900, 1,000, or more nanometers. Each optical trapping site of the plurality of optical trapping sites may be separated from each other optical trapping site by at most about 1,000, 900, 800, 700, 600, 500, 400, 300, 200, 100, 90, 80, 70, 60, 50, 40, 30, 20, 10, or fewer nanometers. Each optical trapping site of the plurality of optical trapping sites may be separated from each other optical trapping site by a distance in a range as defined by any two of the proceeding values. Each optical trapping site of the plurality of optical trapping sites may be configured to trap a single atom of the plurality of atoms. For example, the optical trapping site can be configured such that if a plurality of atoms are trapped in a single optical trapping site, the atoms engage in collisions until either a single atom remains or no atoms remain, depending on if the starting plurality was odd or even.

The first optical cavity and the second optical cavity may each comprise one or more cavity mirrors. Each of the cavity mirrors may be mounted within a cavity spacer. The cavity mirrors may comprise one or more of, for example, glass (e.g., glass with a dielectric coating), silver, gold, aluminum, tin, nickel, chromium, alloys thereof, metamaterials (e.g., metamirrors), or the like, or any combination thereof. The mirror may be configured to be optimized for reflection at a predetermined wavelength. For example, the mirror material can be selected to provide a predetermined level of reflection at an operating wavelength of the cavity. The cavity spacer may comprise a metal, a polymer, a glass, or the like, or any combination thereof. The cavity spacer may comprise a low or ultra-low thermal expansion glass. The cavity spacer may comprise glass having a coefficient of thermal expansion of at least about 1, 2, 3, 4, 5, 6, 7, 8, 9, 10, 20, 30, 40, 50, 60, 70, 80, 90, 100, 200, 300, 400, 500, 600, 700, 800, 900, 1,000, or more parts per billion (ppb) per degree Celsius at an operating temperature. In some embodiments, the operating temperature is between 5 to 35° C. The cavity spacer may comprise glass having a coefficient of thermal expansion of at most about 1,000, 900, 800, 700, 600, 500, 400, 300, 200, 100, 90, 80, 70, 60, 50, 40, 30, 20, 10, 9, 8, 7, 6, 5, 4, 3, 2, 1, or less parts per billion (ppb) per degree Celsius at an operating temperature (e.g., 5 to 35° C.). The error of the proceeding values may be about 1, 5, 10, 20, 30, 40, 50, 60, 70, 80, 90, 100, or more parts per billion (ppb) per degree Celsius at an operating temperature (e.g., 5 to 35° C.).

In another aspect, the present disclosure provides a device for generating a phase stable cavity. The phase stability may comprise a polarization and/or intensity stability for different translations in free space. For example, the polarization and/or intensity may remain the same for different translations in space. The device may comprise a cavity spacer comprising one or more mirrors affixed to the cavity spacer. The one or more mirrors may be oriented to form a three-dimensional trapping potential within the cavity spacer. The cavity spacer may comprise glass having a coefficient of thermal expansion of at least about 1, 2, 3, 4, 5, 6, 7, 8, 9, 10, 20, 30, 40, 50, 60, 70, 80, 90, 100, 200, 300, 400, 500, 600, 700, 800, 900, 1,000, or more parts per billion (ppb) per degree Celsius at an operating temperature (e.g., 5 to 35° C.). The cavity spacer may comprise glass having a coefficient of thermal expansion of at most about 1,000, 900, 800, 700, 600, 500, 400, 300, 200, 100, 90, 80, 70, 60, 50, 40, 30, 20, 10, 9, 8, 7, 6, 5, 4, 3, 2, 1, or less parts per billion (ppb) per degree Celsius at an operating temperature (e.g., 5 to 35° C.). The error of the proceeding values may be about 1, 5, 10, 20, 30, 40, 50, 60, 70, 80, 90, 100, or more parts per billion (ppb) per degree Celsius at an operating temperature (e.g., 5 to 35° C.). Examples of cavity spacer materials include, but are not limited to, fused silica, ultra-low thermal expansion glasses (ULE), or the like.

The one or more mirrors may form a first optical cavity. The first optical cavity may be configured to form a first standing wave pattern. The first standing wave pattern may be one dimensional or two dimensional. The one or more mirrors may form a second optical cavity. The second optical cavity may be configured to form a second standing wave pattern. The one or more atoms may be disposed within the three-dimensional trapping potential formed by at least the first standing wave pattern and the second standing wave pattern. For example, the single cavity spacer can be the single substrate on which the first and second cavity mirrors can be placed. In this example, the first and second cavities can form overlapping potential waves, which in turn can form a plurality of optical traps. The plurality of optical traps can then be used as described elsewhere herein. Using a single spacer for the plurality of cavities can result in increased thermal, and thereby system, stability. In some cases, a plurality of different cavity spacers can be used for the plurality of optical cavities. For example, each optical cavity can be disposed on a different cavity spacer. Using multiple spacers for the plurality of cavities can provide simpler manufacturing and cost savings but may result in lower thermal stability.

The one or more atoms may comprise one or more qubits as described elsewhere herein. For example, the one or more atoms may be configured to be usable as one or more qubits. The one or more qubits may be configured to perform a non-classical computation (e.g., a non-classical computation as described elsewhere herein). For example, the one or more qubits can be configured to perform a gate-based quantum computation. In another example, the one or more qubits may be configured to perform a quantum computation. The one or more atoms may comprise at least about 1, 2, 3, 4, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 300, 400, 500, or more atoms. The one or more atoms may comprise at most about 500, 400, 300, 200, 190, 180, 170, 160, 150, 140, 130, 120, 110, 100, 95, 90, 85, 80, 75, 70, 65, 60, 55, 50, 45, 40, 35, 30, 25, 20, 15, 10, 5, 4, 3, 2, or fewer atoms. The one or more atoms may comprise a number of atoms as defined by any two of the proceeding values. For example, the one or more atoms may comprise from about 75 to about 150 atoms. The one or more atoms may comprise neutral atoms. For example, the one or more atoms may comprise atoms that are not ionized (e.g., are in a neutral state). Each atom of the one or more atoms may be a neutral atom. For example, each atom of an array of atoms can be not ionized. The one or more atoms may comprise rare earth atoms (e.g., lanthanide series atoms (e.g., ytterbium, neodymium, lanthanum, erbium, etc.), scandium, yttrium, etc.), alkali atoms (e.g., sodium, potassium, etc.), alkali earth atoms (e.g., calcium, strontium (e.g., strontium-87 atoms), etc.), or the like, or any combination thereof.

The first optical cavity may be a folded, standing wave cavity. A folded optical cavity may be configured to have light pass multiple times through the optical cavity, thus increasing the path length to a length larger than the length of the optical cavity. For example, a series of mirrors can be configured to reflect light in the folded cavity, thereby increasing the path length in the cavity by the length of the cavity for each reflection. In this way, optics with larger focal lengths can be fit into smaller footprints. In the case of an optical cavity, the smaller footprint may enable a larger cavity to be formed in a smaller space, improving the amount size of a non-classical computer that can be formed in the cavity. A standing wave cavity may be configured to maintain a standing wave in the cavity. A standing wave may be a wave that does not move in position while oscillating in time. For example, the locations of the maxima and minima of a standing wave may not move, though the amplitudes of the maxima and minima may change with time. The standing wave may be configured to provide a plurality of spatially stable locations for a plurality of optical traps in a plane of the first cavity. For example, an array of two-dimensional traps can be formed using the first optical cavity. In this example, the traps may not be trapping in a third dimension perpendicular to the plane of the two dimensions.

The first optical cavity may comprise two end mirrors and at least two fold mirrors. The at least two fold mirrors may be oriented to for a point of interaction within the first cavity. The two end mirrors may each have a radius of curvature of at least about 20, 25, 30, 35, 40, 41, 42, 43, 44, 45, 46, 47, 48, 49, 50, 51, 52, 53, 54, 55, 56, 57, 58, 59, 60, 65, 70, or more millimeters (mm). The two end mirrors may each have a radius of curvature of at most about 70, 65, 60, 59, 58, 57, 56, 55, 54, 53, 52, 51, 50, 49, 48, 47, 46, 45, 44, 43, 42, 41, 40, 35, 30, 25, 20, or fewer mm. The two end mirrors may each have a radius of curvature in a range as defined by any two of the proceeding values. The at least two fold mirrors may be substantially flat. For example, the at least two fold mirrors may be configured not to have a predetermined radius of curvature (e.g., be configured to be flat within manufacturing tolerances).

The point of interaction may be configured to be usable in the generation of one or more optical traps in the cavity. The point of interaction may be coincident with an imaging axis of an imaging unit configured to obtain one or more images of the one or more atoms. For example, a camera system configured to illuminate and image the one or more atoms can be configured to image the area of the point of interaction.

The second optical cavity may comprise a folded, running wave cavity. The folded cavity may be as described elsewhere herein. The running wave cavity may be configured to provide a running wave (e.g., a wave whose amplitude and peak position both fluctuate with time). The running wave may be configurable to change a trapping configuration in the dimension of the running wave. For example, the running wave can be tuned to provide a first one dimensional array of traps at a first time, and a second one dimensional array of traps at a second time. In this way, the traps provided by the running wave cavity can be adjusted depending on a predetermined configuration of the traps. The running wave cavity can be configured to provide a third dimension of trapping to a two-dimensional trap array provided by a standing wave cavity.

A first and second arm of the folded, running wave cavity may intersect to form an accordion mode. The accordion mode may be configured to provide a plurality of peaks and valleys visually similar to the ribs of an accordion. The accordion mode may be configured to provide a plurality of traps in the cavity. The first and the second arms may intersect at an angle of at least about 5, 10, 15, 20, 25, 30, 35, 40, 45, 50, 55, 60, 65, 70, 75, 80, 85, or more degrees. The first and the second arms may intersect at an angle of at most about 85, 80, 75, 70, 65, 60, 55, 50, 45, 40, 35, 30, 25, 20, 15, 10, 5, or fewer degrees. The first and second arms may intersect at an angle in a range as defined by any two of the proceeding values. The folded, running wave cavity may comprise a point of intersection. The point of intersection may be coincident with an imaging axis of an imaging unit configured to obtain one or more images of the one or more atoms, as described elsewhere herein.

The second optical cavity may be a ring cavity. For example, the cavity may be configured to propagate light in a ring shape (e.g., around a central area). The ring cavity may comprise a bow-tie configuration. For example, the mirrors of the ring cavity can be positioned such that the path of light forms a bow-tie shape. The bow-tie configuration may comprise a point of intersection (e.g., a center point of the bow-tie configuration). The point of intersection may be coincident with an imaging axis of an imaging unit configured to obtain one or more images of the one or more atoms, as described elsewhere herein.

The first standing wave pattern may be within the first optical cavity. For example, the first standing wave pattern can be formed in the area bounded by the first optical cavity. The first optical cavity can be configured to generate the first standing wave pattern (e.g., the optics of the first optical cavity can be positioned to form the first standing wave pattern). The second standing wave pattern may be within the second optical cavity. For example, the second optical cavity can be configured to form the second standing wave pattern within the bounds of the second optical cavity. The first standing wave pattern may be a two-dimensional standing wave pattern. The second standing wave pattern may be within a third dimension which is not parallel to either dimension of the first standing wave pattern. In this way, the first and second standing wave patterns can form at least one trap in three dimensions. For example, a plurality of three-dimensional optical traps can be formed using the first and second standing waves, since the first standing wave pattern can form two dimensions of the optical traps, while the second standing wave pattern can form the third dimension of the optical traps.

A period of the standing wave pattern may be at least about 0.5, 1, 1.5, 2, 2.5, 3, 4, 5, or more times a period of the two-dimensional standing wave pattern. For example, the period of the standing wave pattern can be about twice the period of the two-dimensional standing wave pattern. The first optical cavity or the second optical cavity can be a part of the chamber. For example, portions of the chamber can be fitted with mirrors to form at least portions of the first and/or second optical cavities. In this way, the first or second optical cavities can be formed integral to the chamber.

The device may comprise a third optical cavity configured to form a third standing wave pattern. The third optical cavity may be an optical cavity as described elsewhere herein. The third standing wave pattern may be configured to change and/or enhance the properties of the first and second standing wave patterns. For example, the third standing wave pattern can be configured to enhance certain traps formed by the first and second standing wave patterns.

The one or more atoms disposed within the three-dimensional trapping potential may comprise a temperature of at least about 1, 2, 3, 4, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 300, 400, 500, or more microkelvin. The one or more atoms disposed within the three-dimensional trapping potential may comprise a temperature of at most about 500, 400, 300, 200, 190, 180, 170, 160, 150, 140, 130, 120, 110, 100, 95, 90, 85, 80, 75, 70, 65, 60, 55, 50, 45, 40, 35, 30, 25, 20, 15, 10, 5, 4, 3, 2, 1, or less microkelvin. The one or more atoms disposed within the three-dimensional trapping potential may comprise a temperature in a range as defined by any two of the proceeding values. The first optical cavity and the second optical cavity may be disposed within one or more vacuum units configured to maintain the system at a pressure of at least about $10^{-10}$ (1E-10), 1E-9, 1E-8, 1E-7, 1E-6, 1E-5, or more Pascal. The first optical cavity and the second optical cavity may be disposed within one or more vacuum units configured to maintain the system at a pressure of at most about 1E-5, 1E-6, 1E-7, 1E-8, 1E-9, 1E-10, or less Pascal. The first optical cavity and the second optical cavity may be disposed within one or more vacuum units configured to maintain the system at a pressure in a range as defined by any two of the proceeding values.

The three-dimensional trapping potential may comprise a plurality of optical trapping sites. Each optical trapping site of the plurality of optical trapping sites may be spatially different. For example, each optical trapping site can be configured such that the area of a first optical trapping site is not shared with any other optical trapping sites. Each optical trapping site of the plurality of optical trapping sites may be separated from each other optical trapping site by at least about 10, 20, 30, 40, 50, 60, 70, 80, 90, 100, 200, 300, 400, 500, 600, 700, 800, 900, 1,000, or more nanometers. Each optical trapping site of the plurality of optical trapping sites may be separated from each other optical trapping site by at most about 1,000, 900, 800, 700, 600, 500, 400, 300, 200, 100, 90, 80, 70, 60, 50, 40, 30, 20, 10, or fewer nanometers. Each optical trapping site of the plurality of optical trapping sites may be separated from each other optical trapping site by a distance in a range as defined by any two of the proceeding values. Each optical trapping site of the plurality of optical trapping sites may be configured to trap a single atom of the plurality of atoms. For example, the optical trapping site can be configured such that if a plurality of atoms is trapped in a single optical trapping site, the atoms engage in collisions until either a single atom remains or no atoms remain, depending on if the starting plurality was odd or even.

The first optical cavity and the second optical cavity may each comprise one or more cavity mirrors. Each of the cavity mirrors may be mounted within a cavity spacer. The cavity mirrors may comprise one or more of, for example, glass (e.g., glass with a dielectric coating), silver, gold, aluminum, tin, nickel, chromium, alloys thereof, metamaterials (e.g., metamirrors), or the like, or any combination thereof. The mirror may be configured to be optimized for reflection at a predetermined wavelength. For example, the mirror material can be selected to provide a predetermined level of reflection at an operating wavelength of the cavity. The cavity spacer may comprise a metal, a polymer, a glass, or the like, or any combination thereof. The cavity spacer may comprise a low or ultra-low thermal expansion glass. The cavity spacer may comprise glass having a coefficient of thermal expansion of at least about 1, 2, 3, 4, 5, 6, 7, 8, 9, 10, 20, 30, 40, 50, 60, 70, 80, 90, 100, 200, 300, 400, 500, 600, 700, 800, 900, 1,000, or more parts per billion (ppb) per degree Celsius at an operating temperature (e.g., 5 to 35° C.). The cavity spacer may comprise glass having a coefficient of thermal expansion of at most about 1,000, 900, 800, 700, 600, 500, 400, 300, 200, 100, 90, 80, 70, 60, 50, 40, 30, 20, 10, 9, 8, 7, 6, 5, 4, 3, 2, 1, or less parts per billion (ppb) per degree Celsius at an operating temperature (e.g., 5 to 35° C.). The error of the proceeding values may be about 1, 5, 10, 20, 30, 40, 50, 60, 70, 80, 90, 100, or more parts per billion (ppb) per degree Celsius at an operating temperature (e.g., 5 to 35° C.).

In another aspect, the present disclosure provides a method for forming an optical trap. A first standing wave pattern may be formed within a first optical cavity. The first standing wave pattern may be one or two-dimensional. A second standing wave pattern may be formed within a second optical cavity. One or more atoms may be trapped within a three-dimensional trapping potential. The three-dimensional trapping potential may be formed by at least the first standing wave pattern and the second standing wave pattern.

The one or more atoms may comprise one or more qubits as described elsewhere herein. For example, the one or more atoms may be configured to be usable as one or more qubits. The one or more qubits may be configured to perform a non-classical computation (e.g., a non-classical computation as described elsewhere herein). For example, the one or more qubits can be configured to perform a gate-based quantum computation. In another example, the one or more qubits may be configured to perform a quantum computation. The one or more atoms may comprise at least about 1, 2, 3, 4, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 300, 400, 500, or more atoms. The one or more atoms may comprise at most about 500, 400, 300, 200, 190, 180, 170, 160, 150, 140, 130, 120, 110, 100, 95, 90, 85, 80, 75, 70, 65, 60, 55, 50, 45, 40, 35, 30, 25, 20, 15, 10, 5, 4, 3, 2, or fewer atoms. The one or more atoms may comprise a number of atoms as defined by any two of the proceeding values. For example, the one or more atoms may comprise from about 75 to about 150 atoms. The one or more atoms may comprise neutral atoms. For example, the one or more atoms may comprise atoms that are not ionized (e.g., are in a neutral state). Each atom of the one or more atoms may be a neutral atom. For example, each atom of an array of atoms can be not ionized. The one or more atoms may comprise rare earth atoms (e.g., lanthanide series atoms (e.g., ytterbium, neodymium, lanthanum, erbium, etc.), scandium, yttrium, etc.), alkali atoms (e.g., sodium, potassium, etc.), alkali earth atoms (e.g., calcium, strontium (e.g., strontium-87 atoms), etc.), or the like, or any combination thereof.

The first optical cavity may be a folded, standing wave cavity. A folded optical cavity may be configured to have light pass multiple times through the optical cavity, thus increasing the path length to a length larger than the length of the optical cavity. For example, a series of mirrors can be configured to reflect light in the folded cavity, thereby increasing the path length in the cavity by the length of the cavity for each reflection. In this way, optics with larger focal lengths can be fit into smaller footprints. In the case of an optical cavity, the smaller footprint may enable a larger cavity to be formed in a smaller space, improving the amount size of a non-classical computer that can be formed in the cavity. A standing wave cavity may be configured to maintain a standing wave in the cavity. A standing wave may be a wave that does not move in position while oscillating in time. For example, the locations of the maxima and minima of a standing wave may not move, though the amplitudes of the maxima and minima may change with time. The standing wave may be configured to provide a plurality of spatially stable locations for a plurality of optical traps in a plane of the first cavity. For example, an array of two-dimensional traps can be formed using the first optical cavity. In this example, the traps may not be trapping in a third dimension perpendicular to the plane of the two dimensions.

The first optical cavity may comprise two end mirrors and at least two fold mirrors. The at least two fold mirrors may be oriented to for a point of interaction within the first cavity. The two end mirrors may each have a radius of curvature of at least about 20, 25, 30, 35, 40, 41, 42, 43, 44, 45, 46, 47, 48, 49, 50, 51, 52, 53, 54, 55, 56, 57, 58, 59, 60, 65, 70, or more millimeters (mm). The two end mirrors may each have a radius of curvature of at most about 70, 65, 60, 59, 58, 57, 56, 55, 54, 53, 52, 51, 50, 49, 48, 47, 46, 45, 44, 43, 42, 41, 40, 35, 30, 25, 20, or fewer mm. The two end mirrors may each have a radius of curvature in a range as defined by any two of the proceeding values. The at least two fold mirrors may be substantially flat. For example, the at least two fold mirrors may be configured not to have a predetermined radius of curvature (e.g., be configured to be flat within manufacturing tolerances).

The point of interaction may be configured to be usable in the generation of one or more optical traps in the cavity. The point of interaction may be coincident with an imaging axis of an imaging unit configured to obtain one or more images of the one or more atoms. For example, a camera system configured to illuminate and image the one or more atoms can be configured to image the area of the point of interaction.

The second optical cavity may comprise a folded, running wave cavity. The folded cavity may be as described elsewhere herein. The running wave cavity may be configured to provide a running wave (e.g., a wave whose amplitude and peak position both fluctuate with time). The running wave may be configurable to change a trapping configuration in the dimension of the running wave. For example, the running wave can be tuned to provide a first one dimensional array of traps at a first time, and a second one dimensional array of traps at a second time. In this way, the traps provided by the running wave cavity can be adjusted depending on a predetermined configuration of the traps. The running wave cavity can be configured to provide a third dimension of trapping to a two-dimensional trap array provided by a standing wave cavity.

A first and second arm of the folded, running wave cavity may intersect to form an accordion mode. The accordion mode may be configured to provide a plurality of peaks and valleys visually similar to the ribs of an accordion. The accordion mode may be configured to provide a plurality of traps in the cavity. The first and the second arms may intersect at an angle of at least about 5, 10, 15, 20, 25, 30, 35, 40, 45, 50, 55, 60, 65, 70, 75, 80, 85, or more degrees. The first and the second arms may intersect at an angle of at most about 85, 80, 75, 70, 65, 60, 55, 50, 45, 40, 35, 30, 25, 20, 15, 10, 5, or fewer degrees. The first and second arms may intersect at an angle in a range as defined by any two of the proceeding values. The folded, running wave cavity may comprise a point of intersection. The point of intersection may be coincident with an imaging axis of an imaging unit configured to obtain one or more images of the one or more atoms, as described elsewhere herein.

The second optical cavity may be a ring cavity. For example, the cavity may be configured to propagate light in a ring shape (e.g., around a central area). The ring cavity may comprise a bow-tie configuration. For example, the mirrors of the ring cavity can be positioned such that the path of light forms a bow-tie shape. The bow-tie configuration may comprise a point of intersection (e.g., a center point of the bow-tie configuration). The point of intersection may be coincident with an imaging axis of an imaging unit configured to obtain one or more images of the one or more atoms, as described elsewhere herein.

The first standing wave pattern may be within the first optical cavity. For example, the first standing wave pattern can be formed in the area bounded by the first optical cavity.

The first optical cavity can be configured to generate the first standing wave pattern (e.g., the optics of the first optical cavity can be positioned to form the first standing wave pattern). The second standing wave pattern may be within the second optical cavity. For example, the second optical cavity can be configured to form the second standing wave pattern within the bounds of the second optical cavity. The first standing wave pattern may be a two-dimensional standing wave pattern. The second standing wave pattern may be within a third dimension which is not parallel to either dimension of the first standing wave pattern. In this way, the first and second standing wave patterns can form at least one trap in three dimensions. For example, a plurality of three-dimensional optical traps can be formed using the first and second standing waves, since the first standing wave pattern can form two dimensions of the optical traps, while the second standing wave pattern can form the third dimension of the optical traps.

A period of the standing wave pattern may be at least about 0.5, 1, 1.5, 2, 2.5, 3, 4, 5, or more times a period of the two-dimensional standing wave pattern. For example, the period of the standing wave pattern can be about twice the period of the two-dimensional standing wave pattern. The first optical cavity or the second optical cavity can be a part of the chamber. For example, portions of the chamber can be fitted with mirrors to form at least portions of the first and/or second optical cavities. In this way, the first or second optical cavities can be formed integral to the chamber.

The device may comprise a third optical cavity configured to form a third standing wave pattern. The third optical cavity may be an optical cavity as described elsewhere herein. The third standing wave pattern may be configured to change and/or enhance the properties of the first and second standing wave patterns. For example, the third standing wave pattern can be configured to enhance certain traps formed by the first and second standing wave patterns.

The one or more atoms disposed within the three-dimensional trapping potential may comprise a temperature of at least about 1, 2, 3, 4, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 300, 400, 500, or more microkelvin. The one or more atoms disposed within the three-dimensional trapping potential may comprise a temperature of at most about 500, 400, 300, 200, 190, 180, 170, 160, 150, 140, 130, 120, 110, 100, 95, 90, 85, 80, 75, 70, 65, 60, 55, 50, 45, 40, 35, 30, 25, 20, 15, 10, 5, 4, 3, 2, 1, or less microkelvin. The one or more atoms disposed within the three-dimensional trapping potential may comprise a temperature in a range as defined by any two of the proceeding values. The first optical cavity and the second optical cavity may be disposed within one or more vacuum units configured to maintain the system at a pressure of at least about $10^{-10}$ (1E-10), 1E-9, 1E-8, 1E-7, 1E-6, 1E-5, or more Pascal. The first optical cavity and the second optical cavity may be disposed within one or more vacuum units configured to maintain the system at a pressure of at most about 1E-5, 1E-6, 1E-7, 1E-8, 1E-9, 1E-10, or less Pascal. The first optical cavity and the second optical cavity may be disposed within one or more vacuum units configured to maintain the system at a pressure in a range as defined by any two of the proceeding values.

The three-dimensional trapping potential may comprise a plurality of optical trapping sites. Each optical trapping site of the plurality of optical trapping sites may be spatially different. For example, each optical trapping site can be configured such that the area of a first optical trapping site is not shared with any other optical trapping sites. Each optical trapping site of the plurality of optical trapping sites may be separated from each other optical trapping site by at least about 10, 20, 30, 40, 50, 60, 70, 80, 90, 100, 200, 300, 400, 500, 600, 700, 800, 900, 1,000, or more nanometers. Each optical trapping site of the plurality of optical trapping sites may be separated from each other optical trapping site by at most about 1,000, 900, 800, 700, 600, 500, 400, 300, 200, 100, 90, 80, 70, 60, 50, 40, 30, 20, 10, or fewer nanometers. Each optical trapping site of the plurality of optical trapping sites may be separated from each other optical trapping site by a distance in a range as defined by any two of the proceeding values. Each optical trapping site of the plurality of optical trapping sites may be configured to trap a single atom of the plurality of atoms. For example, the optical trapping site can be configured such that if a plurality of atoms are trapped in a single optical trapping site, the atoms engage in collisions until either a single atom remains or no atoms remain, depending on if the starting plurality was odd or even.

The first optical cavity and the second optical cavity may each comprise one or more cavity mirrors. Each of the cavity mirrors may be mounted within a cavity spacer. The cavity mirrors may comprise one or more of, for example, glass (e.g., glass with a dielectric coating), silver, gold, aluminum, tin, nickel, chromium, alloys thereof, metamaterials (e.g., metamirrors), or the like, or any combination thereof. The mirror may be configured to be optimized for reflection at a predetermined wavelength. For example, the mirror material can be selected to provide a predetermined level of reflection at an operating wavelength of the cavity. The cavity spacer may comprise a metal, a polymer, a glass, or the like, or any combination thereof. The cavity spacer may comprise a low or ultra-low thermal expansion glass. The cavity spacer may comprise glass having a coefficient of thermal expansion of at least about 1, 2, 3, 4, 5, 6, 7, 8, 9, 10, 20, 30, 40, 50, 60, 70, 80, 90, 100, 200, 300, 400, 500, 600, 700, 800, 900, 1,000, or more parts per billion (ppb) per degree Celsius at an operating temperature (e.g., 5 to 35° C.). The cavity spacer may comprise glass having a coefficient of thermal expansion of at most about 1,000, 900, 800, 700, 600, 500, 400, 300, 200, 100, 90, 80, 70, 60, 50, 40, 30, 20, 10, 9, 8, 7, 6, 5, 4, 3, 2, 1, or less parts per billion (ppb) per degree Celsius at an operating temperature (e.g., 5 to 35° C.). The error of the proceeding values may be about 1, 5, 10, 20, 30, 40, 50, 60, 70, 80, 90, 100, or more parts per billion (ppb) per degree Celsius at an operating temperature (e.g., 5 to 35° C.).

In another aspect, the present disclosure provides a method for generating a phase stable cavity. A cavity spacer may comprise one or more mirrors affixed to the cavity spacer may be provided. The one or more mirrors may be oriented to form a three-dimensional trapping potential (e.g., optical trap) within the cavity spacer. The cavity spacer may comprise glass having a coefficient of thermal expansion of at least about 1, 2, 3, 4, 5, 6, 7, 8, 9, 10, 20, 30, 40, 50, 60, 70, 80, 90, 100, 200, 300, 400, 500, 600, 700, 800, 900, 1,000, or more parts per billion (ppb) per degree Celsius at an operating temperature (e.g., 5 to 35° C.). The cavity spacer may comprise glass having a coefficient of thermal expansion of at most about 1,000, 900, 800, 700, 600, 500, 400, 300, 200, 100, 90, 80, 70, 60, 50, 40, 30, 20, 10, 9, 8, 7, 6, 5, 4, 3, 2, 1, or less parts per billion (ppb) per degree Celsius at an operating temperature (e.g., 5 to 35° C.). The error of the proceeding values may be about 1, 5, 10, 20, 30, 40, 50, 60, 70, 80, 90, 100, or more parts per billion (ppb) per degree Celsius at an operating temperature (e.g., 5 to 35° C.).

The one or more mirrors may form a first optical cavity. The first optical cavity may be configured to form a first standing wave pattern. The first standing wave pattern may be one dimensional or two dimensional. The one or more mirrors may form a second optical cavity. The second optical cavity may be configured to form a second standing wave pattern. The one or more atoms may be disposed within the three-dimensional trapping potential formed by at least the first standing wave pattern and the second standing wave pattern. For example, the single cavity spacer can be the single substrate on which the first and second cavity mirrors can be placed. In this example, the first and second cavities can form overlapping potential waves, which in turn can form a plurality of optical traps. The plurality of optical traps can then be used as described elsewhere herein. Using a single spacer for the plurality of cavities can result in increased thermal, and thereby system, stability. In some cases, a plurality of different cavity spacers can be used for the plurality of optical cavities. For example, each optical cavity can be disposed on a different cavity spacer. Using multiple spacers for the plurality of cavities can provide simpler manufacturing and cost savings, but may result in lower thermal stability.

The one or more atoms may comprise one or more qubits as described elsewhere herein. For example, the one or more atoms may be configured to be usable as one or more qubits. The one or more qubits may be configured to perform a non-classical computation (e.g., a non-classical computation as described elsewhere herein). For example, the one or more qubits can be configured to perform a gate-based quantum computation. In another example, the one or more qubits may be configured to perform a quantum computation. The one or more atoms may comprise at least about 1, 2, 3, 4, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 300, 400, 500, or more atoms. The one or more atoms may comprise at most about 500, 400, 300, 200, 190, 180, 170, 160, 150, 140, 130, 120, 110, 100, 95, 90, 85, 80, 75, 70, 65, 60, 55, 50, 45, 40, 35, 30, 25, 20, 15, 10, 5, 4, 3, 2, or fewer atoms. The one or more atoms may comprise a number of atoms as defined by any two of the proceeding values. For example, the one or more atoms may comprise from about 75 to about 150 atoms. The one or more atoms may comprise neutral atoms. For example, the one or more atoms may comprise neutral atoms that are not ionized (e.g., are in a neutral state). Each atom of the one or more atoms may be a neutral atom. For example, each atom of an array of atoms can be not ionized. The one or more atoms may comprise rare earth atoms (e.g., lanthanide series atoms (e.g., ytterbium, neodymium, lanthanum, erbium, etc.), scandium, yttrium, etc.), alkali atoms (e.g., sodium, potassium, etc.), alkali earth atoms (e.g., calcium, strontium (e.g., strontium-87 atoms), etc.), or the like, or any combination thereof.

The first optical cavity may be a folded, standing wave cavity. A folded optical cavity may be configured to have light pass multiple times through the optical cavity, thus increasing the path length to a length larger than the length of the optical cavity. For example, a series of mirrors can be configured to reflect light in the folded cavity, thereby increasing the path length in the cavity by the length of the cavity for each reflection. In this way, optics with larger focal lengths can be fit into smaller footprints. In the case of an optical cavity, the smaller footprint may enable a larger cavity to be formed in a smaller space, improving the amount size of a non-classical computer that can be formed in the cavity. A standing wave cavity may be configured to maintain a standing wave in the cavity. A standing wave may be a wave that does not move in position while oscillating in time. For example, the locations of the maxima and minima of a standing wave may not move, though the amplitudes of the maxima and minima may change with time. The standing wave may be configured to provide a plurality of spatially stable locations for a plurality of optical traps in a plane of the first cavity. For example, an array of two-dimensional traps can be formed using the first optical cavity. In this example, the traps may not be trapping in a third dimension perpendicular to the plane of the two dimensions.

The first optical cavity may comprise two end mirrors and at least two fold mirrors. The at least two fold mirrors may be oriented to for a point of interaction within the first cavity. The two end mirrors may each have a radius of curvature of at least about 20, 25, 30, 35, 40, 41, 42, 43, 44, 45, 46, 47, 48, 49, 50, 51, 52, 53, 54, 55, 56, 57, 58, 59, 60, 65, 70, or more millimeters (mm). The two end mirrors may each have a radius of curvature of at most about 70, 65, 60, 59, 58, 57, 56, 55, 54, 53, 52, 51, 50, 49, 48, 47, 46, 45, 44, 43, 42, 41, 40, 35, 30, 25, 20, or fewer mm. The two end mirrors may each have a radius of curvature in a range as defined by any two of the proceeding values. The at least two fold mirrors may be substantially flat. For example, the at least two fold mirrors may be configured not to have a predetermined radius of curvature (e.g., be configured to be flat within manufacturing tolerances).

The point of interaction may be configured to be usable in the generation of one or more optical traps in the cavity. The point of interaction may be coincident with an imaging axis of an imaging unit configured to obtain one or more images of the one or more atoms. For example, a camera system configured to illuminate and image the one or more atoms can be configured to image the area of the point of interaction.

The second optical cavity may comprise a folded, running wave cavity. The folded cavity may be as described elsewhere herein. The running wave cavity may be configured to provide a running wave (e.g., a wave whose amplitude and peak position both fluctuate with time). The running wave may be configurable to change a trapping configuration in the dimension of the running wave. For example, the running wave can be tuned to provide a first one dimensional array of traps at a first time, and a second one dimensional array of traps at a second time. In this way, the traps provided by the running wave cavity can be adjusted depending on a predetermined configuration of the traps. The running wave cavity can be configured to provide a third dimension of trapping to a two-dimensional trap array provided by a standing wave cavity.

A first and second arm of the folded, running wave cavity may intersect to form an accordion mode. The accordion mode may be configured to provide a plurality of peaks and valleys visually similar to the ribs of an accordion. The accordion mode may be configured to provide a plurality of traps in the cavity. The first and the second arms may intersect at an angle of at least about 5, 10, 15, 20, 25, 30, 35, 40, 45, 50, 55, 60, 65, 70, 75, 80, 85, or more degrees. The first and the second arms may intersect at an angle of at most about 85, 80, 75, 70, 65, 60, 55, 50, 45, 40, 35, 30, 25, 20, 15, 10, 5, or fewer degrees. The first and second arms may intersect at an angle in a range as defined by any two of the proceeding values. The folded, running wave cavity may comprise a point of intersection. The point of intersection may be coincident with an imaging axis of an imaging unit configured to obtain one or more images of the one or more atoms, as described elsewhere herein.

The second optical cavity may be a ring cavity. For example, the cavity may be configured to propagate light in a ring shape (e.g., around a central area). The ring cavity may comprise a bow-tie configuration. For example, the mirrors of the ring cavity can be positioned such that the path of light forms a bow-tie shape. The bow-tie configuration may comprise a point of intersection (e.g., a center point of the bow-tie configuration). The point of intersection may be coincident with an imaging axis of an imaging unit configured to obtain one or more images of the one or more atoms, as described elsewhere herein.

The first standing wave pattern may be within the first optical cavity. For example, the first standing wave pattern can be formed in the area bounded by the first optical cavity. The first optical cavity can be configured to generate the first standing wave pattern (e.g., the optics of the first optical cavity can be positioned to form the first standing wave pattern). The second standing wave pattern may be within the second optical cavity. For example, the second optical cavity can be configured to form the second standing wave pattern within the bounds of the second optical cavity. The first standing wave pattern may be a two-dimensional standing wave pattern. The second standing wave pattern may be within a third dimension which is not parallel to either dimension of the first standing wave pattern. In this way, the first and second standing wave patterns can form at least one trap in three dimensions. For example, a plurality of three-dimensional optical traps can be formed using the first and second standing waves, since the first standing wave pattern can form two dimensions of the optical traps, while the second standing wave pattern can form the third dimension of the optical traps.

A period of the standing wave pattern may be at least about 0.5, 1, 1.5, 2, 2.5, 3, 4, 5, or more times a period of the two-dimensional standing wave pattern. For example, the period of the standing wave pattern can be about twice the period of the two-dimensional standing wave pattern. The first optical cavity or the second optical cavity can be a part of the chamber. For example, portions of the chamber can be fitted with mirrors to form at least portions of the first and/or second optical cavities. In this way, the first or second optical cavities can be formed integral to the chamber.

The device may comprise a third optical cavity configured to form a third standing wave pattern. The third optical cavity may be an optical cavity as described elsewhere herein. The third standing wave pattern may be configured to change and/or enhance the properties of the first and second standing wave patterns. For example, the third standing wave pattern can be configured to enhance certain traps formed by the first and second standing wave patterns.

The one or more atoms disposed within the three-dimensional trapping potential may comprise a temperature of at least about 1, 2, 3, 4, 5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 300, 400, 500, or more microkelvin. The one or more atoms disposed within the three-dimensional trapping potential may comprise a temperature of at most about 500, 400, 300, 200, 190, 180, 170, 160, 150, 140, 130, 120, 110, 100, 95, 90, 85, 80, 75, 70, 65, 60, 55, 50, 45, 40, 35, 30, 25, 20, 15, 10, 5, 4, 3, 2, 1, or less microkelvin. The one or more atoms disposed within the three-dimensional trapping potential may comprise a temperature in a range as defined by any two of the proceeding values. The first optical cavity and the second optical cavity may be disposed within one or more vacuum units configured to maintain the system at a pressure of at least about 10-10 (1E-10), 1E-9, 1E-8, 1E-7, 1E-6, 1E-5, or more Pascal. The first optical cavity and the second optical cavity may be disposed within one or more vacuum units configured to maintain the system at a pressure of at most about 1E-5, 1E-6, 1E-7, 1E-8, 1E-9, 1E-10, or less Pascal. The first optical cavity and the second optical cavity may be disposed within one or more vacuum units configured to maintain the system at a pressure in a range as defined by any two of the proceeding values.

The three-dimensional trapping potential may comprise a plurality of optical trapping sites. Each optical trapping site of the plurality of optical trapping sites may be spatially different. For example, each optical trapping site can be configured such that the area of a first optical trapping site is not shared with any other optical trapping sites. Each optical trapping site of the plurality of optical trapping sites may be separated from each other optical trapping site by at least about 10, 20, 30, 40, 50, 60, 70, 80, 90, 100, 200, 300, 400, 500, 600, 700, 800, 900, 1,000, or more nanometers. Each optical trapping site of the plurality of optical trapping sites may be separated from each other optical trapping site by at most about 1,000, 900, 800, 700, 600, 500, 400, 300, 200, 100, 90, 80, 70, 60, 50, 40, 30, 20, 10, or fewer nanometers. Each optical trapping site of the plurality of optical trapping sites may be separated from each other optical trapping site by a distance in a range as defined by any two of the proceeding values. Each optical trapping site of the plurality of optical trapping sites may be configured to trap a single atom of the plurality of atoms. For example, the optical trapping site can be configured such that if a plurality of atoms are trapped in a single optical trapping site, the atoms engage in collisions until either a single atom remains or no atoms remain, depending on if the starting plurality was odd or even.

The first optical cavity and the second optical cavity may each comprise one or more cavity mirrors. Each of the cavity mirrors may be mounted within a cavity spacer. The cavity mirrors may comprise one or more of, for example, glass (e.g., glass with a dielectric coating), silver, gold, aluminum, tin, nickel, chromium, alloys thereof, metamaterials (e.g., metamirrors), or the like, or any combination thereof. The mirror may be configured to be optimized for reflection at a predetermined wavelength. For example, the mirror material can be selected to provide a predetermined level of reflection at an operating wavelength of the cavity. The cavity spacer may comprise a metal, a polymer, a glass, or the like, or any combination thereof. The cavity spacer may comprise a low or ultra-low thermal expansion glass. The cavity spacer may comprise glass having a coefficient of thermal expansion of at least about 1, 2, 3, 4, 5, 6, 7, 8, 9, 10, 20, 30, 40, 50, 60, 70, 80, 90, 100, 200, 300, 400, 500, 600, 700, 800, 900, 1,000, or more parts per billion (ppb) per degree Celsius at an operating temperature (e.g., 5 to 35° C.). The cavity spacer may comprise glass having a coefficient of thermal expansion of at most about 1,000, 900, 800, 700, 600, 500, 400, 300, 200, 100, 90, 80, 70, 60, 50, 40, 30, 20, 10, 9, 8, 7, 6, 5, 4, 3, 2, 1, or less parts per billion (ppb) per degree Celsius at an operating temperature (e.g., 5 to 35° C.). The error of the proceeding values may be about 1, 5, 10, 20, 30, 40, 50, 60, 70, 80, 90, 100, or more parts per billion (ppb) per degree Celsius at an operating temperature (e.g., 5 to 35° C.).

Example of Parallel Addressing of Multi-Qubit Units

Figure 9:
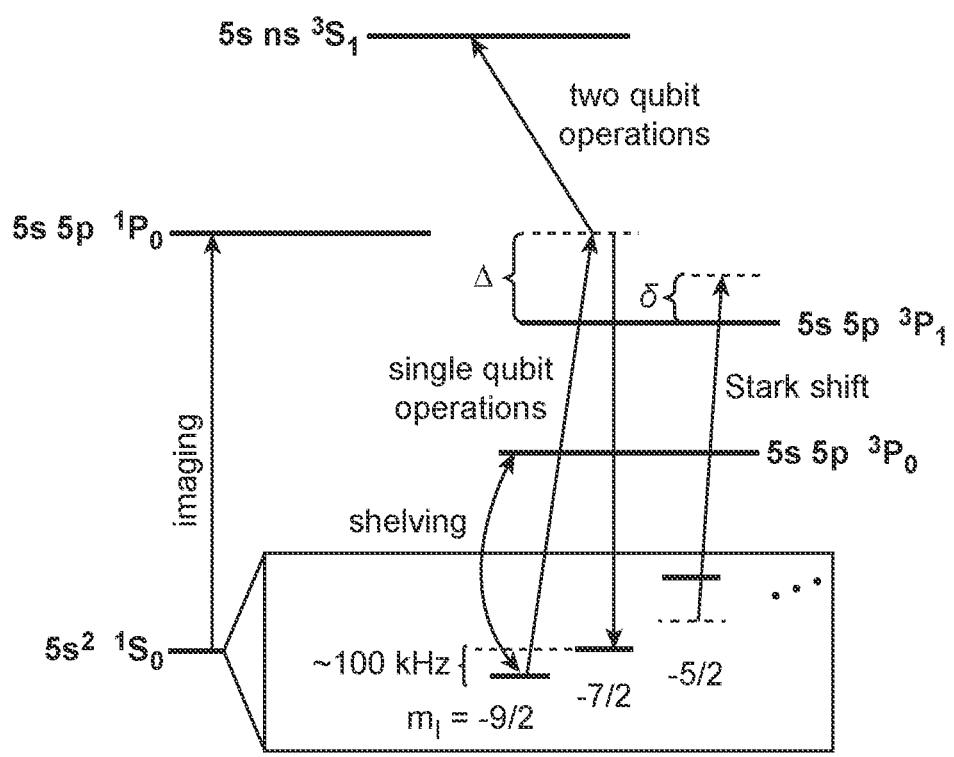
FIG. 9 shows an energy level structure for single-qubit and multi-qubit operations in strontium-87.

Direct excitation of strontium-87 from the ground state to Rydberg levels would require a laser with a wavelength of approximately 218 nm. Alternatively, the Rydberg excitation operation can be performed using two-photon excitation combining 689 nm and 319 nm light, each detuned from the intermediate $^3P_1$ state. The approximately 7 kHz width of the $^3P_1$ state provides an effective balance between the two-photon effective Rabi rate and scattering via spontaneous decay from the $^3P_1$. FIG. 9 shows an energy level structure for single-qubit and multi-qubit operations in strontium-87.

The optical system for single-qubit operations is also designed to work well for multi-qubit gates. One of the single-qubit beams is used as one leg of the two-photon excitation scheme that drives transitions to the Rydberg electronic manifold. To satisfy the spatially-dependent frequency and phase matching condition, AODs are also used for the UV light. Importantly, the optical systems are matched so that the frequency shift of the UV light from one site to another is identical to that of the 689 nm light. The consequence of this constraint is that the performance of state-of-the-art UV AODs dictate the accessible field of view (FOV) for multi-qubit operations. Further, because one of the single-qubit beams is being used for multi-qubit operations (and the two single-qubit beams are matched), the FOV for single-qubit operations will be the same. A figure of merit for UV AODs is the product of the active aperture and the RF bandwidth of the device. For a fixed beam size in the back focal plane of the objective, increasing either of these quantities results in a larger scan angle of the beams, and thus a larger FOV in the plane of the qubit array. An FOV of approximately 100 μm×100 μm was achieved, which is sufficient to address an array of approximately 1,000 atoms with a trapping site spacing of 3 μm.

Example of Optical Cavity Configurations

An optical trap (e.g., an optical trap described elsewhere herein) can be generated in a resonantly enhanced cavity to enhance the depth of the optical trap while not increasing the amount of laser power used to generate the trap. In this way, a relatively small (e.g., hundreds of milliwatt) laser can be used to generate a large number (e.g., thousands) of deep optical traps. The resonantly enhanced cavity can be configured to generate the optical traps in three dimensions.

A plurality of intersecting cavities can be used to generate the plurality of optical traps. For example, a first cavity can be configured to form a two-dimensional array of traps, while a second cavity can be configured to form a one-dimensional array of traps intersecting with the two-dimensional array of traps. Due to the overlap of the arrays, an array of traps with a three-dimensional profile can be generated.

The first and/or second cavity can comprise one or more folded optics. For example, the first cavity can comprise a one-dimensional cavity folded onto itself, thereby generating a two-dimensional cavity. Such a cavity can comprise four mirrors. Two of the mirrors can be curved outer mirrors with a large radius of curvature (e.g., slightly curved mirrors). Using outer mirrors with a large radius of curvature can improve the uniformity of the beam, which in turn can increase the uniformity of the lattice of optical traps. Two of the mirrors can be flat mirrors configured to fold the cavity. Polarization (e.g., linear polarization) of the light in the cavity can result in a four-fold enhancement of the intensity of the light as compared to a one-dimensional lattice.

In this example, the second cavity can comprise a two-dimensional cavity. The second cavity can be configured to generate a one-dimensional or a two-dimensional pattern (e.g., wave pattern). The two-dimensional cavity can be a running wave ring cavity. The cavity can be in a "bow-tie" configuration (e.g., where two arms of the cavity intersect at an oblique angle). This configuration can result in a lattice spacing related to the angle of the cavity. The lattice spacing may be larger than the spacing of the first cavity. This can result in a reduced frequency of atoms being trapped in multiple planes during transfer (e.g., transfer from an array of tweezers configured for use in computation).

Figure 10A:
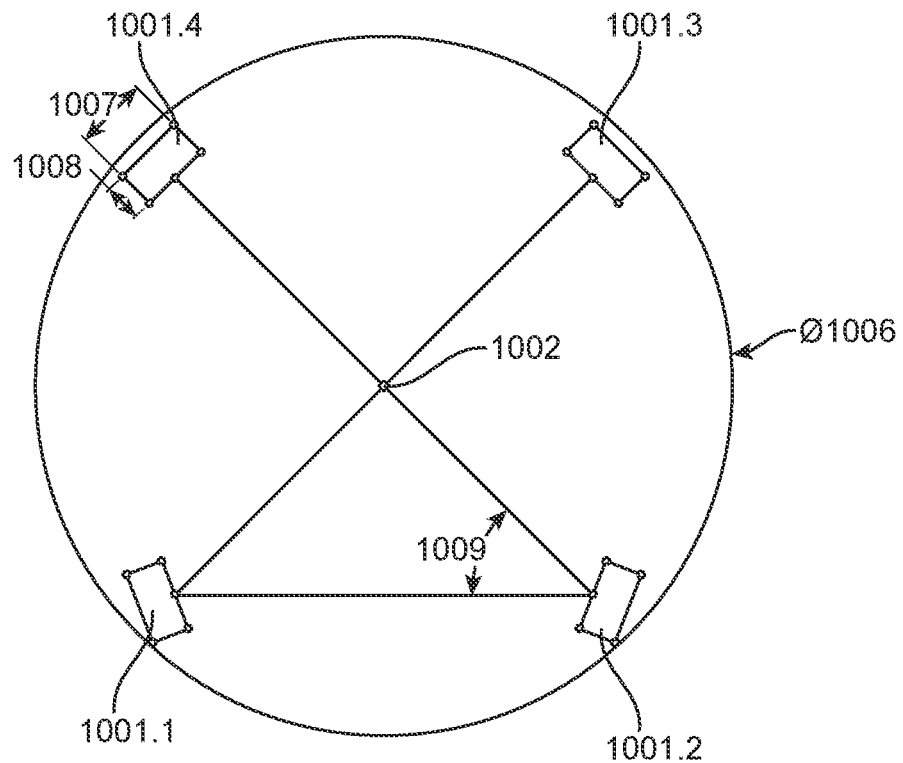
FIGS. 10A and 10B show examples of a standing wave and bow-tie configuration, respectively, according to some embodiments.

FIG. 10A illustrates an example cavity. The example cavity may comprise two end mirrors 1001.3 and 1001.4 and two folding mirrors 1001.1 and 1001.2. The properties of these mirrors may abide by any other description thereof in this specification. In some examples, the two folding mirrors 1001.1 and 1001.2 and two end mirrors 1001.3 and 1001.4 may be utilized to generate a two dimensional grid of optical traps with a point of interaction 1002.

Figure 10B:
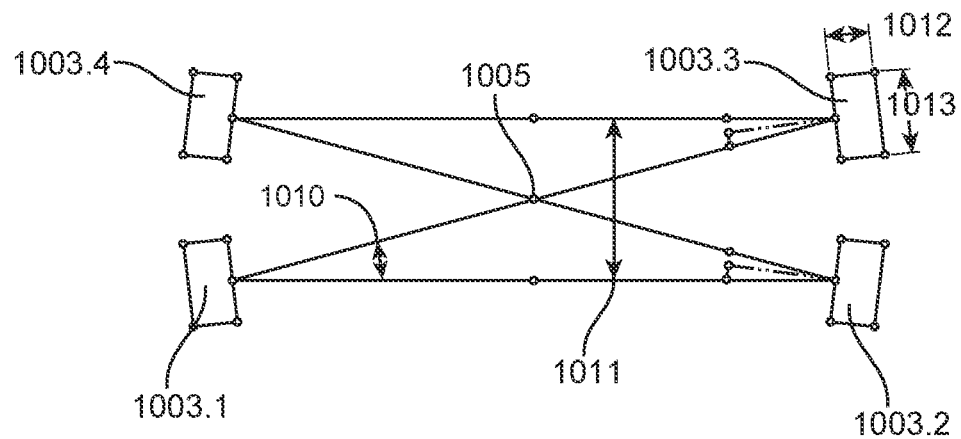

FIG. 10B illustrates an example of a two dimensional grid of optical traps with four folding mirrors 1003.1-1003.4. The point of interaction 1005 of a corresponding cavity may generate a two-dimensional array of optical traps. The point of interaction 1005 at the center of relative angles propagating light within the standing wave cavity passing through the point of interaction 1005 may have a corresponding impact on the arrangement of the generated two-dimensional grid of optical traps.

The relative angles of the propagating light may be altered by placing the plurality of mirrors 1001.1-1001.4 and/or 1003.1-1003.4 at varying relative angles. The varying relative angles may be defined by the angle formed between the center point of a first one of the plurality of mirrors 1001.1-1001.4 and/or 1003.1-1003.4, the point of interaction 1002 and/or 1005, and the center point of a second one of the plurality of mirrors 1001.1-1001.4 and/or 1003.1-1003.4. The relative angles of the plurality of mirrors 1001.1-1001.4 and/or 1003.1-1003.4, in degrees, may be 90, 95, 100, 105, 110, 115, 120, 125, 130, 135, 140, 145, 150, 155, 160, 165, 170, 175, etc. For example, the relative angles of the plurality of mirrors 1001.1-1001.4 may be operable configurations of the standing configurations where each end mirror 1001.3 and 1001.4 is placed at a relative angle of about 180 degrees from one fold mirror 1001.1 and 1001.4. For example, when four mirrors within a standing wave cavity are oriented such that the relative angle between mirror 1001.1 and mirror 1001.2, or equivalently mirror 1001.3 and mirror 1001.4, is about 90 degrees, the two dimensional array of optical traps generated in such a cavity may be arranged such that relative angle between the center axes of three adjacent, non-colinear optical traps is also about 90 degrees. In this example the relative angle of mirror 1001.3 and 1001.1 and the relative angle of mirror 1001.4 and 1001.2 are each about 180 degrees. In another example, if the relative angle between mirror 1001.3 and mirror 1001.1 is about 60 degrees, the relative angle between mirror 1001.4 and mirror 1001.2 may also be about 60 degrees while the relative angles between mirror 1001.3 and mirror 1001.4 and between mirror 1001.1 and mirror 1001.2 may be about 120 degrees, in a supplementary relationship. In this example, the relative angle of mirrors 1001.3 and 1001.1 and the relative angle of mirrors 1001.4 and 1001.2 are each about 180 degrees. In the two dimensional array of optical traps that may generated by such a configuration of mirrors 1001.1-1001.4 the relative angles between the center axes of three adjacent non-colinear optical traps may be either about 60 degrees or about 120 degrees. As the relative angles between the mirrors 1001.1-1001.4 may change, rotation of the mirrors about their center axis orthogonal to the plane of propagating light within the standing wave cavity may also be necessary to maintain the operability of the optical chamber as specified. While the above examples are described with respect to 1001.1-1001.4, the same or similar relationships between angles for the mirrors 1003.1-1003.4 may also be applicable. In some cases, angle 1009 as illustrated in FIG. 10A, may be about 45 degrees. In some cases, the angle 1009 may be about, in degrees, 5, 10, 15, 20, 25, 30, 35, 40, 45, 50, 55, 60, 65, 70, 75, 80, 85, or 90. In some cases, the angle 1009 may be about, in degrees, 95, 100, 105, 110, 115, 120, 125, 130, 135, 140, 145, 150, 155, 160, 165, 170, or 175.

In some cases, a diameter 1006 may be on the order of micrometers to centimeters. For example, the diameter 1006 may be about 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 250 µm, 300 µm, 350 µm, 400 µm, 450 µm, 500 µm, 600 µm, 700 µm, 800 µm, 900 µm, 1000 µm. In another example, the diameter 1006 may be about 3 mm, 5 mm, 10 mm, 20 mm, 30 mm, 40 mm, 50 mm, 60 mm, 70 mm, 80 mm, 90 mm, 100 mm, 110 mm, 120 mm, 130 mm, 140 mm, 150 mm, 160 mm, 170 mm, 180 mm, 190 mm, 200 mm, or any other suitable diameter. In some cases, mirror width 1007 may be on the order of micrometers to centimeters. For example, the mirror width 1007 may be about 1 µm, 3 µm, 5 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 250 µm, 300 µm, 350 µm, 400 µm, 450 µm, 500 µm, 600 µm, 700 µm, 800 µm, 900 µm, 1000 µm. In another example, the mirror width 1007 may be about 3 mm, 5 mm, 10 mm, 20 mm, 30 mm, 40 mm, 50 mm, or any other suitable width. In some cases, mirror thickness 1008 may be on the order of nanometers (nm) to centimeters. For example, the mirror thickness 1008 may be about 10 nm, 20 nm, 30 nm, 50 nm, 100 nm, 200 nm, 300 nm, 500 nm, 700 nm, 1000 nm. In another example, the mirror thickness 1008 may be about 3 µm, 5 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 250 µm, 300 µm, 350 µm, 400 µm, 450 µm, 500 µm, 600 µm, 700 µm, 800 µm, 900 µm, 1000 µm. In another example, the mirror thickness 1008 may be about 3 mm, 5 mm, 10 mm, 20 mm, 30 mm or any other suitable thickness.

The second optical cavity in this example may comprise a running wave cavity. FIG. 10B illustrates an example running wave cavity. The example running wave cavity may comprise mirrors 1003.1-1003.4 arranged in a bow-tie configuration. The properties of these mirrors may abide by any other description thereof in this specification. In some examples, the mirrors 1003.1-1003.4 may be utilized to generate a one dimensional array of optical traps.

In some examples, FIG. 10A and FIG. 10B illustrate examples of standing and running wave cavities, respectively. Each of these cavities contain a plurality of mirrors. The plurality of mirrors in either FIG. 10A or FIG. 10B may be arranged such that the center point of each mirror is equidistant from the point of interaction 1002 and 1005, respectively. For example, a standing or running cavity may each be comprised of the plurality of mirrors 1001.1-1001.4 and/or 1003.1-1003.4 that may be located, e.g., a distance on the order of micrometers to centimeters (e.g., about 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 250 µm, 300 µm, 350 µm, 400 µm, 450 µm, 500 µm, 600 µm, 700 µm, 800 µm, 900 µm, 1000 µm, 3 mm, 5 mm, 10 mm, 20 mm, 30 mm, 40 mm, 50 mm, 60 mm, 70 mm, 80 mm, 90 mm, 100 mm, 110 mm, 120 mm, 130 mm, 140 mm, 150 mm, 160 mm, 170 mm, 180 mm, 190 mm, 200 mm, etc.), from the point of interaction 1002 or 1005. The distance(s) of any one mirror(s) to the point of interaction 1002 or 1005 may be e.g., a distance on the order of micrometers to centimeters (e.g., about 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 250 µm, 300 µm, 350 µm, 400 µm, 450 µm, 500 µm, 600 µm, 700 µm, 800 µm, 900 µm, 1000 µm, 3 mm, 5 mm, 10 mm, 20 mm, 30 mm, 40 mm, 50 mm, 60 mm, 70 mm, 80 mm, 90 mm, 100 mm, 110 mm, 120 mm, 130 mm, 140 mm, 150 mm, 160 mm, 170 mm, 180 mm, 190 mm, 200 mm, etc.). In some cases, the plurality of mirrors 1001.1-1001.4 and/or 1003.1-1003.4 may be arranged in configurations where the distances between the point of interaction 1002 and/or 1005 and the center points of each mirror among the plurality may be wholly or partially different within the plurality of such distances as defined by the location of each of said mirrors in a configuration where the plurality of distances center points of the mirrors to the point of interaction 1002 and/or 1005 are not equal. In some cases, for any one mirror among the plurality of mirrors 1001.1-1001.4 and/or 1003.1-1003.4, about 5, 10, 15, 20, 25, 30, 35, 40, 45, 50, 55, 60, 65, 70, 75, 80, 85, 90 or more percent largest distance may exist between any one mirror and the point of interaction 1002 and/or 1005. As the relative distances of any mirror within any configuration of the mirrors 1001.1-1001.4 and/or 1003.1-1003.4 to the point of interaction 1002 and/or 1005 may change, rotation of the mirrors about their center axis orthogonal to the plane of propagating light within the optical cavity they comprise may also be performed to maintain the operability chamber as specified. In some cases, angle 1010 as illustrated in FIG. 10B, may be about 15 degrees. In some cases, the angle 1010 may be about, in degrees, 5, 10, 15, 20, 25, 30, 35, 40, 45, 50, 55, 60, 65, 70, 75, 80, 85, or 90. In some cases, the angle 1010 may be about, in degrees, 95, 100, 105, 110, 115, 120, 125, 130, 135, 140, 145, 150, 155, 160, 165, 170, or 175.

In some cases, a distance 1011 may be on the order of micrometers to centimeters. For example, the distance 1011 may be about 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 250 µm, 300 µm, 350 µm, 400 µm, 450 µm, 500 µm, 600 µm, 700 µm, 800 µm, 900 µm, 1000 µm. In another example, the distance 1011 may be about 3 mm, 5 mm, 10 mm, 20 mm, 30 mm, 40 mm, 50 mm, 60 mm, 70 mm, 80 mm, 90 mm, 100 mm, 110 mm, 120 mm, 130 mm, 140 mm, 150 mm, 160 mm, 170 mm, 180 mm, 190 mm, 200 mm, or any other suitable diameter. In some cases, mirror width 1013 may be on the order of micrometers to centimeters. For example, the mirror width 1013 may be about 1 µm, 3 µm, 5 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 250 µm, 300 µm, 350 µm, 400 µm, 450 µm, 500 µm, 600 µm, 700 µm, 800 µm, 900 µm, 1000 µm. In another example, the mirror width 1013 may be about 3 mm, 5 mm, 10 mm, 20 mm, 30 mm, 40 mm, 50 mm, or any other suitable width. In some cases, mirror thickness 1012 may be on the order of nanometers (nm) to centimeters. For example, the mirror thickness 1012 may be about 10 nm, 20 nm, 30 nm, 50 nm, 100 nm, 200 nm, 300 nm, 500 nm, 700 nm, 1000 nm. In another example, the mirror thickness 1012 may be about 3 µm, 5 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 250 µm, 300 µm, 350 µm, 400 µm, 450 µm, 500 µm, 600 µm, 700 µm, 800 µm, 900 µm, 1000

μm. In another example, the mirror thickness 1012 may be about 3 mm, 5 mm, 10 mm, 20 mm, 30 mm or any other suitable thickness.

Example of Optical Potentials

Figure 11A:
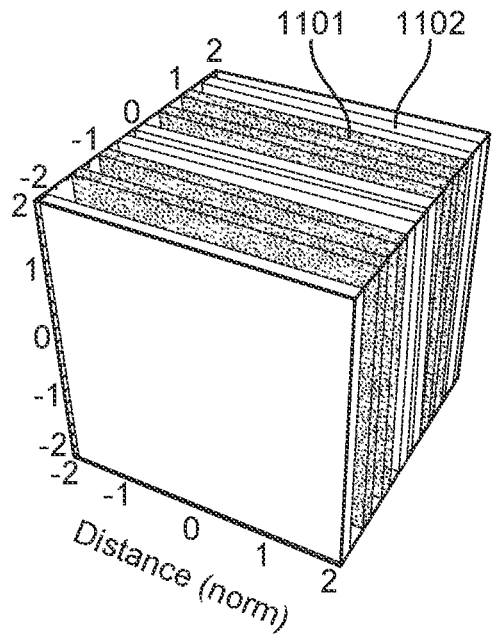
FIGS. 11A, 11B, and 11C show examples of optical potentials, according to some embodiments.
Figure 11B:
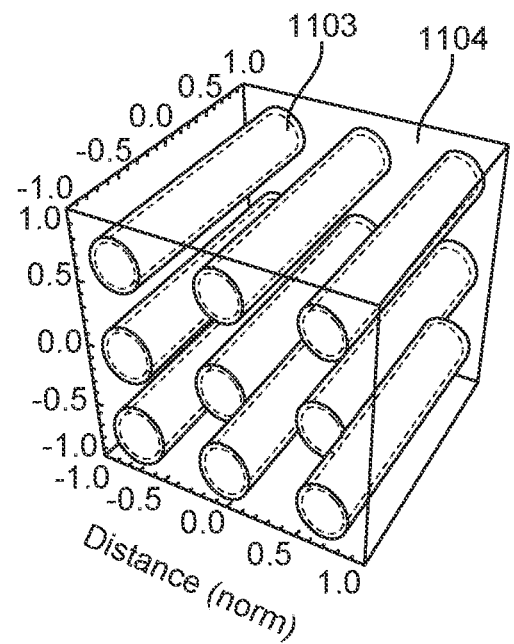
Figure 11C:
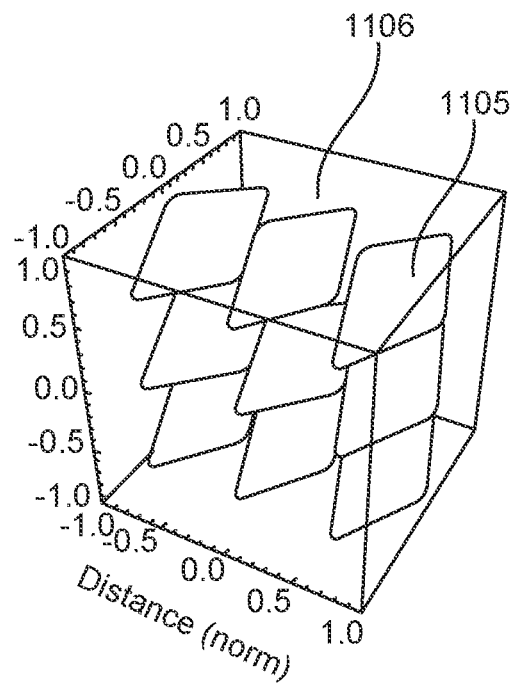

FIG. 11A, FIG. 11B, and FIG. 11C show examples of optical potentials or optical traps. FIG. 11A illustrates an example of a one-dimensional array of optical traps that may be generated by a 1-dimensional cavity that has been folded onto itself, resulting in a 2-dimensional cavity comprising four mirrors. FIG. 11B illustrates an example of a two-dimensional array of optical traps that may be generated by a 2-dimensional, running-wave ring cavity in the "bow-tie" configuration, in which two arms of the cavity mode intersect at an oblique angle. FIG. 11C illustrates the three dimensional shape of the optical traps 1105 that may be generated by interaction between the one dimensional optical trap of FIG. 11A and the two dimensional optical trap of FIG. 11B.

FIG. 11A illustrates an example of a one dimensional array of optical traps and their corresponding peaks 1101 (maxima) and valleys 1102 (minima). The relative orientations of the plurality of mirrors (e.g., the plurality of mirrors 1001.1-1001.4 or 1003.1-1003.4 of FIG. 10A or 10B, respectively) may be such that the propagating light within the running wave cavity forms a point of interaction (e.g., the point of interaction 1002 or 1005 of FIG. 10A or 10B, respectively). The one dimensional array of optical traps generated by such an arrangement of mirrors within such an optical cavity may be oriented along the axis passing through the point of intersection, orthogonal to the plane of the propagating light within the running wave spacings between the peaks 1101 of the one dimensional array of optical traps may be altered by a number of variables, which may include the relative angle between the plurality of mirrors, as defined by the center point of one of the plurality of mirrors, the point of interaction, and the center point of a second mirror of the plurality of mirrors. The relative angles of the plurality of mirrors may be, in degrees, 90, 95, 100, 105, 110, 115, 120, 125, 130, 135, 140, 145, 150, 155, 160, 165, 170, 175, etc. The relative angles of the plurality of mirrors may increase or decrease relative to affect an increase or decrease in the spacing between the peaks 1101 in the dimensional array of optical traps. Operable bow-tie configurations of the plurality of mirrors may place one mirror at a relative angle of about 180 degrees to a second mirror, and place a third and fourth mirror at supplementary relative angles with respect to the first mirror with consideration to maintaining a relative angle between the third and fourth mirror of about 180 degrees. In an example, if the angle between the mirrors 1001.1 and 1001.3 of FIG. 10A is about 30 degrees, then the relative angle between mirrors 1001.3 and 1001.4 may be about 150 degrees, provided that the relative angles between the mirrors 1001.3 and 1001.1 and the mirrors 1001.4 and 1001.2 are each about 180 degrees. Changing the relative angles between the plurality of mirrors may include rotation of the mirrors about their center axis orthogonal to the plane of propagating light within the cavity.

In some examples, FIG. 11C illustrates nine optical traps 1105 (maxima) in a 3 by 3 by 1 array with valleys 1106 (minima). Interaction of the one dimensional and two dimensional arrays (e.g., of FIGS. 10A and 10B, respectively) may also generate larger or smaller three dimensional arrays of optical traps 1105 extending in any dimension. The spacing between the peaks 1101 of the one dimensional array of optical traps may be proportional to the spacing between optical traps 1105 along the same dimension within a three dimensional array that may be generated in part from said one dimensional array (e.g., of FIG. 10A). The spacing between the center axes of the optical traps within a two dimensional array (e.g., of FIG. 10B) may be proportional to the spacing in the same two dimensions between optical traps 1105 in a three dimensional array that may be generated in part from said two dimensional array. The relative angles between the center axes of three non-colinear optical traps in a two dimensional array may correspond to the relative angles between the center points of three non-colinear optical traps 1105 within the same two dimensions of a three dimensional array that may be generated in part from said two dimensional array (e.g., of FIG. 10B). The three dimensional shape of the optical traps 1105 within a three dimensional array may be affected by the relative spacings and angles between peaks 1101 or center axes of optical traps in the one dimensional array and/or two dimensional array that may be used to generate said three dimensional array in part or in whole.

In some examples, FIG. 11A, FIG. 11B, and FIG. 11C show examples of optical potentials, according to some embodiments. FIG. 11A shows an example of a one-dimensional wave (e.g., the maxima 1101 and minima 1102 vary in a single dimension), according to some embodiments. Such a wave may be referred to as a one dimensional wave pattern. FIG. 11B shows an example of a two-dimensional wave (e.g., a two-dimensional standing wave pattern), according to some embodiments. In a two-dimensional wave, the intensity of the light may be controlled in two dimensions with maxima 1103 and minima 1104. FIG. 11C shows an example of a combined wave pattern, according to some embodiments. The combined wave pattern may be generated by a superposition of the waves from FIG. 11A and FIG. 11B. The combined wave pattern may comprise a plurality of optical traps 1105 of FIG. 11C. The plurality of optical traps may be used as described elsewhere herein (e.g., used to trap a plurality of atoms).

Example of Cavity Spacers

Figures 12A, 12B:
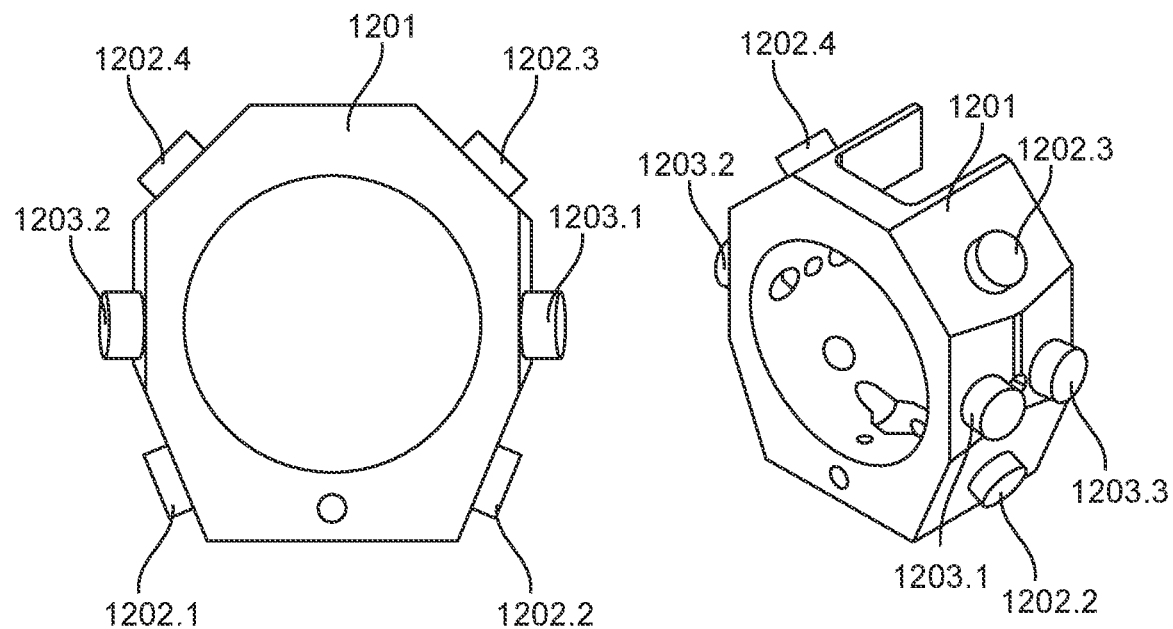
FIGS. 12A, 12B, and 12C show different views of a plurality of mirrors configured to provide a plurality of optical cavities, according to some embodiments.
Figure 12C:
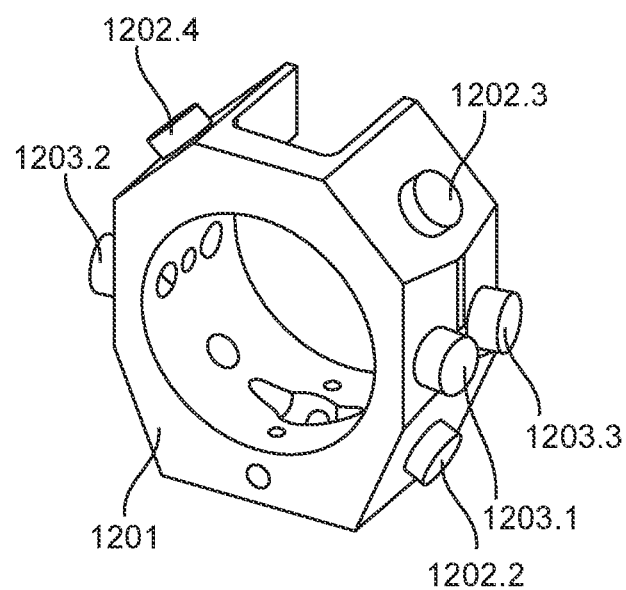

FIGS. 12A-12C show different views of a plurality of mirrors to provide a plurality of optical cavities, according to some embodiments. The plurality of mirrors (e.g., the plurality of mirrors 1001.1-1001.4 or 1003.1-1003.4 of FIG. 10A or 10B, respectively) may be contained or held in place within a cavity spacer 1201. The cavity spacer 1201 may be constructed such that the plurality of mirrors may be oriented in one operable configuration. The cavity spacer 1201 may be constructed such that the plurality of mirrors may be oriented in at least two or more operable configurations. In some cases, the plurality of mirrors may comprise fold end mirrors 1202.1 and 1202.2 and two end mirrors 1202.3 and 1202.4 of a standing wave cavity. A plurality of mirrors 1203.1 and 1203.2 may be in an operable configuration to enable the generation of a three optical trap interaction propagating within the standing wave cavity and light propagating within the running wave cavity at interaction that may lie at the center of the cavity or cavity spacer.

In some examples, FIGS. 12A-12C show different views of a plurality of mirrors configured to provide a plurality of optical cavities, according to some embodiments. A cavity spacer 1201 may be configured to hold a plurality of mirrors 1202.1-1202.4 and 1203.1-1203.3. The cavity spacer can be a low thermal expansion glass, thereby maintaining the configuration of the mirrors. The mirrors 1202.1-1202.4 can be configured to provide a first standing wave pattern (e.g., the mirrors can be configured to form a cavity configured to form a first standing wave pattern). The mirrors 1203.1-1203.3 can be configured to provide a second standing wave pattern. While not shown, there may be a forth mirror of the mirrors 1203.1-1203.3 that is opposite the mirror 1203.3. The combination of the mirrors 1202.1-1202.4 and 1203.1-1203.3 can provide a plurality of optical traps as described elsewhere herein.

As described previously, FIG. 10A and FIG. 10B illustrate examples of standing and running wave cavities, respectively. Each of these cavities contain a plurality of mirrors. FIGS. 12A-12C show different views of a plurality of mirrors to provide a plurality of optical cavities, according to some embodiments. Any mirror among a plurality of mirrors may independently comprise an optical substrate. Any mirror among a plurality of mirrors may independently comprise an optical substrate and a coating. Optical substrates may include but are not limited to α-BBO, barium fluoride, calcite, calcium fluoride, F2, germanium, magnesium fluoride, N-BK7, N-F2, N-SF11, potassium bromide, PTFE, rutile, sapphire, silicon, UV fused silica, YVO$_4$, ZERODUR®, zinc selenide, or any combination thereof. Optical substrates may comprise a crystalline component. Optical substrates may comprise an amorphous component. Optical coatings may include but are not limited to glass (e.g., glass with a dielectric coating), silver, aluminum, gold, nickel, anti-reflective coatings, dielectric coatings, highly reflective coatings and any combination thereof. Optical coatings may comprise a crystalline component. Optical coatings may comprise an amorphous component. The selection of optical substrate and optical coating may consider the wavelength of light to be utilized. The selection of optical substrate and optical coating may consider the operating temperature or operating pressure of a mirror or optical cavity that they may comprise. An optical substrate may be selected for having a low coefficient of thermal expansion. An optical coating may be selected for having a low coefficient of thermal expansion.

In some cases, FIGS. 12A-12C show different views of a plurality of mirrors to provide a plurality of optical cavities, according to some embodiments. The plurality of mirrors may be contained or held in place within a cavity spacer 1201. The cavity spacer 1201 may comprise a single piece of material. The cavity spacer 1201 may comprise two or more pieces of material. The material used to construct the cavity spacer 1201 may include but is not limited to glass, borosilicate glass, ultra low expansion glass, silicon, germanium, ZERODUR®, silicon carbide, silicon nitride, diamond, or any combination thereof. The selection of a material to construct a cavity spacer 1201 may consider the operating temperature or operating pressure of a device that the cavity spacer may comprise. A material to construct a cavity spacer 1201 may be selected for having a low coefficient of thermal expansion.

The physical size of the cavity spacer 1201 may be on the order of millimeters, in some examples. For example, the footprint of the cavity spacer 1201 may be approximated as about a 10 mm cube, about a 20 mm cube, about a 30 mm cube, about a 40 mm cube, about a 50 mm cube, about a 60 mm cube, about a 70 mm cube, about an 80 mm cube, about a 90 mm cube, about a 100 mm cube, etc. For example, the cavity spacer 1201 may be about 65×58×30 mm (thickness). The mirrors 1202.1-1202.4 and 1203.1-1203.3 may also be on the order of millimeters, in some examples. For example, the mirrors 1202.1-1202.4 and 1203.1-1203.3 may be about 4 mm thick with about 10 mm diameter. The mirrors 1202.1-1202.4 and 1203.1-1203.3 may be optically bonded on the outer surface of the cavity spacer 1201, such that the overall cavity profile becomes larger in the transverse plane. In some examples, the exact dimensions of the cavity spacer 1201 or the mirrors 1202.1-1202.4 and 1203.1-1203.3 may be dictated by other apparatuses, such as the size of the vacuum chamber in which the cavity spacer 1201 is installed. In some examples, once the cavity lengths have been designed (e.g., based on the available space), the cavity spacer 1201 dimensions may be designed and implemented to be quite accurate, e.g., including both the surface-normal and the angular tolerances of the surfaces, since light bounces off these mirrors and the slightest offset can deflect the light elsewhere. In some cases, machining tolerance for the surface-normals may be a few microns and 20 arcseconds for more stringent angular tolerances. In some examples, flatness for the mirrors 1202.1-1202.4 and 1203.1-1203.3 may be specified to $\lambda/10$. In some examples, surface quality of the mirrors may be specified to a couple angstroms.

Example of Beam Waist Size

Figure 13:
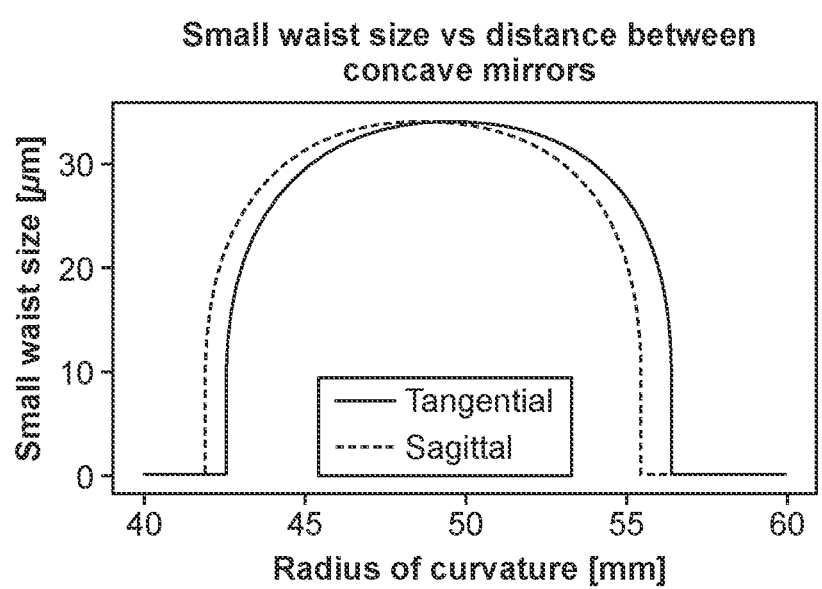
FIG. 13 shows a plot of the beam waist size achieved for a given mirror radius of curvature, according to some embodiments.

FIG. 13 shows a plot of the beam waist size achieved for a given mirror radius of curvature, according to some embodiments. The plot may show two different waist size vs. radius of curvature plots for two orthogonal axes, the tangential and sagittal axes. The predetermined waist size can be tuned by the radius of curvature that is used for the curved mirrors, permitting selection of the property in the design of the device. The mode size of zero may mean the cavity is no longer stable. By definition, both the tangential and the sagittal mode sizes have to be non-zero in order for the cavity to be stable. Thus, the lower limit, as illustrated, may be ROC ~42.5 mm and the upper limit, as illustrated, may be ROC 55.5 mm.

While illustrated with certain values, in some examples, the ROC of the mirrors are designed to be bigger than the length of the cavity (e.g., about 50 mm, about 100 mm, about 150 mm, about 200 mm, about 250 mm, about 300 mm, etc.) for the atom plane cavity. For example, if the cavity length is about 168 mm, the ROC of the mirrors may be designed as about 1000 mm. In some examples, there may be no upper limit on the ROC of the mirrors.

In some examples, the accordion cavity, may have certain differences compared with the atom plane cavity, e.g., on account of the accordion cavity being a running-wave cavity. For example, there may be both upper limits and lower limits on the ROC of the mirrors. In another example, the mode is an oval shape as opposed to circular, due to, for example, astigmatism, and so the mode may be described by both its X-size (tangential) and its Y-size (sagittal).

As previously described, in some examples, both the tangential and the sagittal mode sizes are non-zero in order for the cavity to be stable. There may be two ways in which the cavity has to be stable—"internal stability" and "external stability." In some examples, a cavity may include two "cavities" whose modes overlap, and the region of overlap may coincide with the location of the science array of qubits (e.g., neutral atoms). Therefore, during an experimental cycle, internal stability may mean the modes stay overlapped with each other, and external stability may mean the absolute position of the overlap remains still relative to the qubits. The internal stability may be assisted by the two cavities being physically made of the same monolithic spacer (e.g., ultra-low-expansion glass) with their respective cavity-forming mirrors optically bonded to the cavity spacer. The external stability may be caused when a subsequent cavity lattice, formed by the two intersecting modes, remains overlapped with the science array that holds the qubits. In some examples, there are two possible perturbations: vibrations and drift due to temperature. As mentioned before, the cavity itself is may be made of, e.g., monolithic glass, which may help to mitigate both effects. However, in some examples, vibrations may come into the system through the cavity mount that holds the cavity against the vacuum chamber. In increasing rigidity of this mount, vibrations that appear on the cavity side may actually appear on the science array side (namely, the microscope objective) in the same way, thus canceling themselves out. In some examples, one way to measure temperature drift is to divide a common laser into two branches and lock each branch to each of the two cavities. If the laser is more stable than the cavity to begin with (e.g., via locking the laser to the optical frequency comb), then each lock may give information about each cavity, while the relative drift may give information about the relative temperature drift. For example, with a temperature drift of about 0.5° C. fluctuations, which may be considered large, the calculated absolute drift in the cavity frequency may about 10 MHz for both cavities. For example, with a 784 nm wavelength, this corresponds to about $3\times10^{-8}$ fractional drift, which in turn corresponds to about 0.003 fractional drift in the position of the antinode.

Example of Systems for Performing a Non-Classical Computation

Figure 2:
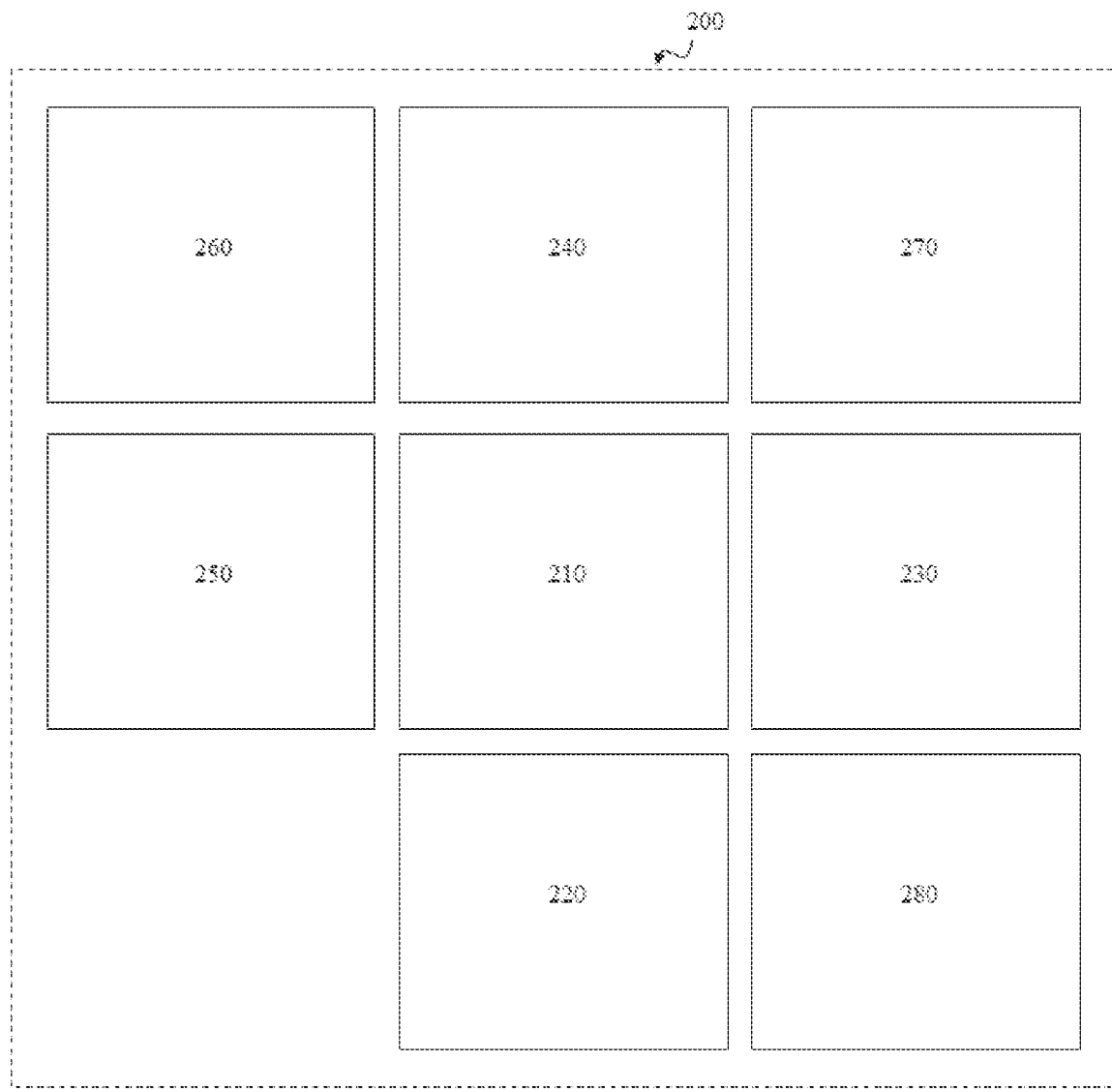
FIG. 2 shows an example of a system for performing a non-classical computation.

FIG. 2 shows an example of a system 200 for performing a non-classical computation. The non-classical computation may comprise a quantum computation. The quantum computation may comprise a gate-model quantum computation.

The system 200 may comprise one or more trapping units 210. The trapping units may comprise one or more optical trapping units. The optical trapping units may comprise any optical trapping unit described herein, such as an optical trapping unit described herein with respect to FIG. 3A. The optical trapping units may be configured to generate a plurality of optical trapping sites. The optical trapping units may be configured to generate a plurality of spatially distinct optical trapping sites. For instance, the optical trapping units may be configured to generate at least about 10, 20, 30, 40, 50, 60, 70, 80, 90, 100, 200, 300, 400, 500, 600, 700, 800, 900, 1,000, 2,000, 3,000, 4,000, 5,000, 6,000, 7,000, 8,000, 9,000, 10,000, 20,000, 30,000, 40,000, 50,000, 60,000, 70,000, 80,000, 90,000, 100,000, 200,000, 300,000, 400,000, 500,000, 600,000, 700,000, 800,000, 900,000, 1,000,000, or more optical trapping sites. The optical trapping units may be configured to generate at most about 1,000,000, 900,000, 800,000, 700,000, 600,000, 500,000, 400,000, 300,000, 200,000, 100,000, 90,000, 80,000, 70,000, 60,000, 50,000, 40,000, 30,000, 20,000, 10,000, 9,000, 8,000, 7,000, 6,000, 5,000, 4,000, 3,000, 2,000, 1,000, 900, 800, 700, 600, 500, 400, 300, 200, 100, 90, 80, 70, 60, 50, 40, 30, 20, 10, or fewer optical trapping sites. The optical trapping units may be configured to trap a number of optical trapping sites that is within a range defined by any two of the preceding values.

The optical trapping units may be configured to trap a plurality of atoms. For instance, the optical trapping units may be configured to trap at least about 10, 20, 30, 40, 50, 60, 70, 80, 90, 100, 200, 300, 400, 500, 600, 700, 800, 900, 1,000, 2,000, 3,000, 4,000, 5,000, 6,000, 7,000, 8,000, 9,000, 10,000, 20,000, 30,000, 40,000, 50,000, 60,000, 70,000, 80,000, 90,000, 100,000, 200,000, 300,000, 400,000, 500,000, 600,000, 700,000, 800,000, 900,000, 1,000,000, or more atoms. The optical trapping units may be configured to trap at most about 1,000,000, 900,000, 800,000, 700,000, 600,000, 500,000, 400,000, 300,000, 200,000, 100,000, 90,000, 80,000, 70,000, 60,000, 50,000, 40,000, 30,000, 20,000, 10,000, 9,000, 8,000, 7,000, 6,000, 5,000, 4,000, 3,000, 2,000, 1,000, 900, 800, 700, 600, 500, 400, 300, 200, 100, 90, 80, 70, 60, 50, 40, 30, 20, 10, or fewer atoms. The optical trapping units may be configured to trap a number of atoms that is within a range defined by any two of the preceding values.

Each optical trapping site of the optical trapping units may be configured to trap at least about 1, 2, 3, 4, 5, 6, 7, 8, 9, 10, or more atoms. Each optical trapping site may be configured to trap at most about 10, 9, 8, 7, 6, 5, 4, 3, 2, 1, or fewer atoms. Each optical trapping site may be configured to trap a number of atoms that is within a range defined by any two of the preceding values. Each optical trapping site may be configured to trap a single atom.

Figure 4:
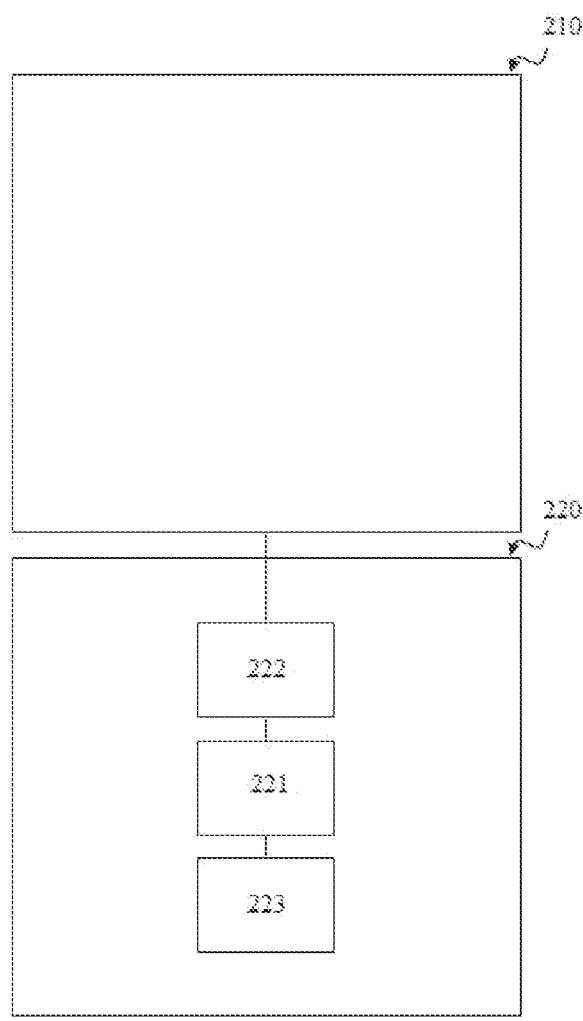
FIG. 4 shows an example of an electromagnetic delivery unit.

One or more atoms of the plurality of atoms may comprise qubits, as described herein (for instance, with respect to FIG. 4). Two or more atoms may be quantum mechanically entangled. Two or more atoms may be quantum mechanically entangled with a coherence lifetime of at least about 1 microsecond ($\mu s$), 2 $\mu s$, 3 $\mu s$, 4 $\mu s$, 5 $\mu s$, 6 $\mu s$, 7 $\mu s$, 8 $\mu s$, 9 $\mu s$, 10 $\mu s$, 20 $\mu s$, 30 $\mu s$, 40 $\mu s$, 50 $\mu s$, 60 $\mu s$, 70 $\mu s$, 80 $\mu s$, 90 $\mu s$, 100 $\mu s$, 200 $\mu s$, 300 $\mu s$, 400 $\mu s$, 500 $\mu s$, 600 $\mu s$, 700 $\mu s$, 800 $\mu s$, 900 $\mu s$, 1 millisecond (ms), 2 ms, 3 ms, 4 ms, 5 ms, 6 ms, 7 ms, 8 ms, 9 ms, 10 ms, 20 ms, 30 ms, 40 ms, 50 ms, 60 ms, 70 ms, 80 ms, 90 ms, 100 ms, 200 ms, 300 ms, 400 ms, 500 ms, 600 ms, 700 ms, 800 ms, 900 ms, 1 second (s), 2 s, 3 s, 4 s, 5 s, 6 s, 7 s, 8 s, 9 s, 10 s, or more. Two or more atoms may be quantum mechanically entangled with a coherence lifetime of at most about 10 s, 9 s, 8 s, 7 s, 6 s, 5 s, 4 s, 3 s, 2 s, 1 s, 900 ms, 800 ms, 700 ms, 600 ms, 500 ms, 400 ms, 300 ms, 200 ms, 100 ms, 90 ms, 80 ms, 70 ms, 60 ms, 50 ms, 40 ms, 30 ms, 20 ms, 10 ms, 9 ms, 8 ms, 7 ms, 6 ms, 5 ms, 4 ms, 3 ms, 2 ms, 1 ms, 900 $\mu s$, 800 $\mu s$, 700 $\mu s$, 600 $\mu s$, 500 $\mu s$, 400 $\mu s$, 300 $\mu s$, 200 $\mu s$, 100 $\mu s$, 90 $\mu s$, 80 $\mu s$, 70 $\mu s$, 60 $\mu s$, 50 $\mu s$, 40 $\mu s$, 30 $\mu s$, 20 $\mu s$, 10 $\mu s$, 9 $\mu s$, 8 $\mu s$, 7 $\mu s$, 6 $\mu s$, 5 $\mu s$, 4 $\mu s$, 3 $\mu s$, 2 $\mu s$, 1 $\mu s$, or less. Two or more atoms may be quantum mechanically entangled with a coherence lifetime that is within a range defined by any two of the preceding values. One or more atoms may comprise neutral atoms. One or more atoms may comprise uncharged atoms.

One or more atoms may comprise alkali atoms. One or more atoms may comprise lithium (Li) atoms, sodium (Na) atoms, potassium (K) atoms, rubidium (Rb) atoms, or cesium (Cs) atoms. One or more atoms may comprise lithium-6 atoms, lithium-7 atoms, sodium-23 atoms, potassium-39 atoms, potassium-40 atoms, potassium-41 atoms, rubidium-85 atoms, rubidium-87 atoms, or caesium-133 atoms. One or more atoms may comprise alkaline earth atoms. One or more atoms may comprise beryllium (Be) atoms, magnesium (Mg) atoms, calcium (Ca) atoms, strontium (Sr) atoms, or barium (Ba) atoms. One or more atoms may comprise beryllium-9 atoms, magnesium-24 atoms, magnesium-25 atoms, magnesium-26 atoms, calcium-40 atoms, calcium-42 atoms, calcium-43 atoms, calcium-44 atoms, calcium-46 atoms, calcium-48 atoms, strontium-84 atoms, strontium-86 atoms, strontium-87 atoms, strontium-88 atoms, barium-130 atoms, barium-132 atoms, barium-133 atoms, barium-134 atoms, barium-135 atoms, barium-136 atoms, barium-137 atoms, or barium-138 atoms. One or more atoms may comprise rare earth atoms. One or more atoms may comprise scandium (Sc) atoms, yttrium (Y) atoms, lanthanum (La) atoms, cerium (Ce) atoms, praseodymium (Pr) atoms, neodymium (Nd) atoms, samarium (Sm) atoms, europium (Eu) atoms, gadolinium (Gd) atoms, terbium (Tb) atoms, dysprosium (Dy) atoms, holmium (Ho) atoms, erbium (Er) atoms, thulium (Tm) atoms, ytterbium (Yb) atoms, or lutetium (Lu) atoms. One or more atoms may comprise scandium-45 atoms, yttrium-89 atoms, lanthanum-139 atoms, cerium-136 atoms, cerium-138 atoms, cerium- 140 atoms, cerium-142 atoms, praseodymium-141 atoms, neodymium-142 atoms, neodymium-143 atoms, neodymium-145 atoms, neodymium-146 atoms, neodymium-148 atoms, samarium-144 atoms, samarium-149 atoms, samarium-150 atoms, samarium-152 atoms, samarium-154 atoms, europium-151 atoms, europium-153 atoms, gadolinium-154 atoms, gadolinium-155 atoms, gadolinium-156 atoms, gadolinium-157 atoms, gadolinium-158 atoms, gadolinium-160 atoms, terbium-159 atoms, dysprosium-156 atoms, dysprosium-158 atoms, dysprosium-160 atoms, dysprosium-161 atoms, dysprosium-162 atoms, dysprosium-163 atoms, dysprosium-164 atoms, erbium-162 atoms, erbium-164 atoms, erbium-166 atoms, erbium-167 atoms, erbium-168 atoms, erbium-170 atoms, holmium-165 atoms, thulium-169 atoms, ytterbium-168 atoms, ytterbium-170 atoms, ytterbium-171 atoms, ytterbium-172 atoms, ytterbium-173 atoms, ytterbium-174 atoms, ytterbium-176 atoms, lutetium-175 atoms, or lutetium-176 atoms.

The plurality of atoms may comprise a single element selected from the group consisting of Li, Na, K, Rb, Cs, Be, Mg, Ca, Sr, and Ba. The plurality of atoms may comprise a mixture of elements selected from the group consisting of Li, Na, K, Rb, Cs, Be, Mg, Ca, Sr, and Ba. The plurality of atoms may comprise a natural isotopic mixture of one or more elements selected from the group consisting of Li, Na, K, Rb, Cs, Be, Mg, Ca, Sr, and Ba. The plurality of atoms may comprise an isotopically enriched mixture of one or more elements selected from the group consisting of Li, Na, K, Rb, Cs, Be, Mg, Ca, Sr, and Ba. The plurality of atoms may comprise a natural isotopic mixture of one or more elements selected from the group consisting of Sc, Y, La, Ce, Pr, Nd, Sm, Eu, Gd, Tb, Dy, Ho, Er, Tm, Yb, and Lu. The plurality of atoms may comprise an isotopically enriched mixture of one or more elements selected from the group consisting of Sc, Y, La, Ce, Pr, Nd, Sm, Eu, Gd, Tb, Dy, Ho, Er, Tm, Yb, and Lu. atoms may comprise rare earth atoms. For instance, the plurality of atoms may comprise lithium-6 atoms, lithium-7 atoms, sodium-23 atoms, potassium-39 atoms, potassium-40 atoms, potassium-41 atoms, rubidium-85 atoms, rubidium-87 atoms, caesium-133 atoms, beryllium-9 atoms, magnesium-24 atoms, magnesium-25 atoms, magnesium-26 atoms, calcium-40 atoms, calcium-42 atoms, calcium-43 atoms, calcium-44 atoms, calcium-46 atoms, calcium-48 atoms, strontium-84 atoms, strontium-86 atoms, strontium-87 atoms, strontium-88 atoms, barium-130 atoms, barium-132 atoms, barium-133 atoms, barium-134 atoms, barium-135 atoms, barium-136 atoms, barium-137 atoms, barium-138 atoms, scandium-45 atoms, yttrium-89 atoms, lanthanum-139 atoms, cerium-136 atoms, cerium-138 atoms, cerium-140 atoms, cerium-142 atoms, praseodymium-141 atoms, neodymium-142 atoms, neodymium-143 atoms, neodymium-145 atoms, neodymium-146 atoms, neodymium-148 atoms, samarium-144 atoms, samarium-149 atoms, samarium-150 atoms, samarium-152 atoms, samarium-154 atoms, europium-151 atoms, europium-153 atoms, gadolinium-154 atoms, gadolinium-155 atoms, gadolinium-156 atoms, gadolinium-157 atoms, gadolinium-158 atoms, gadolinium-160 atoms, terbium-159 atoms, dysprosium-156 atoms, dysprosium-158 atoms, dysprosium-160 atoms, dysprosium-161 atoms, dysprosium-162 atoms, dysprosium-163 atoms, dysprosium-164 atoms, erbium-162 atoms, erbium-164 atoms, erbium-166 atoms, erbium-167 atoms, erbium-168 atoms, erbium-170 atoms, holmium-165 atoms, thulium-169 atoms, ytterbium-168 atoms, ytterbium-170 atoms, ytterbium-171 atoms, ytterbium-172 atoms, ytterbium-173 atoms, ytterbium-174 atoms, ytterbium-176 atoms, lutetium-175 atoms, or lutetium-176 atoms enriched to an isotopic abundance of at least about 50%, 60%, 70%, 80%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, or more. The plurality of atoms may comprise lithium-6 atoms, lithium-7 atoms, sodium-23 atoms, potassium-39 atoms, potassium-40 atoms, potassium-41 atoms, rubidium-85 atoms, rubidium-87 atoms, caesium-133 atoms, beryllium-9 atoms, magnesium-24 atoms, magnesium-25 atoms, magnesium-26 atoms, calcium-40 atoms, calcium-42 atoms, calcium-43 atoms, calcium-44 atoms, calcium-46 atoms, calcium-48 atoms, strontium-84 atoms, strontium-86 atoms, strontium-87 atoms, strontium-88 atoms, barium-130 atoms, barium-132 atoms, barium-133 atoms, barium-134 atoms, barium-135 atoms, barium-136 atoms, barium-137 atoms, barium-138 atoms, scandium-45 atoms, yttrium-89 atoms, lanthanum-139 atoms, cerium-136 atoms, cerium-138 atoms, cerium-140 atoms, cerium-142 atoms, praseodymium-141 atoms, neodymium-142 atoms, neodymium-143 atoms, neodymium-145 atoms, neodymium-146 atoms, neodymium-148 atoms, samarium-144 atoms, samarium-149 atoms, samarium-150 atoms, samarium-152 atoms, samarium-154 atoms, europium-151 atoms, europium-153 atoms, gadolinium-154 atoms, gadolinium-155 atoms, gadolinium-156 atoms, gadolinium-157 atoms, gadolinium-158 atoms, gadolinium-160 atoms, terbium-159 atoms, dysprosium-156 atoms, dysprosium-158 atoms, dysprosium-160 atoms, dysprosium-161 atoms, dysprosium-162 atoms, dysprosium-163 atoms, dysprosium-164 atoms, erbium-162 atoms, erbium-164 atoms, erbium-166 atoms, erbium-167 atoms, erbium-168 atoms, erbium-170 atoms, holmium-165 atoms, thulium-169 atoms, ytterbium-168 atoms, ytterbium-170 atoms, ytterbium-171 atoms, ytterbium-172 atoms, ytterbium-173 atoms, ytterbium-174 atoms, ytterbium-176 atoms, lutetium-175 atoms, or lutetium-176 atoms enriched to an isotopic abundance of at most about 99.99%, 99.98%, 99.97%, 99.96%, 99.95%, 99.94%, 99.93%, 99.92%, 99.91%, 99.9%, 99.8%, 99.7%, 99.6%, 99.5%, 99.4%, 99.3%, 99.2%, 99.1%, 99%, 98%, 97%, 96%, 95%, 94%, 93%, 92%, 91%, 90%, 80%, 70%, 60%, 50%, or less. The plurality of atoms may comprise lithium-6 atoms, lithium-7 atoms, sodium-23 atoms, potassium-39 atoms, potassium-40 atoms, potassium-41 atoms, rubidium-85 atoms, rubidium-87 atoms, caesium-133 atoms, beryllium-9 atoms, magnesium-24 atoms, magnesium-25 atoms, magnesium-26 atoms, calcium-40 atoms, calcium-42 atoms, calcium-43 atoms, calcium-44 atoms, calcium-46 atoms, calcium-48 atoms, strontium-84 atoms, strontium-86 atoms, strontium-87 atoms, strontium-88 atoms, barium-130 atoms, barium-132 atoms, barium-133 atoms, barium-134 atoms, barium-135 atoms, barium-136 atoms, barium-137 atoms, barium-138 atoms, scandium-45 atoms, yttrium-89 atoms, lanthanum-139 atoms, cerium-136 atoms, cerium-138 atoms, cerium-140 atoms, cerium-142 atoms, praseodymium-141 atoms, neodymium-142 atoms, neodymium-143 atoms, neodymium-145 atoms, neodymium-146 atoms, neodymium-148 atoms, samarium-144 atoms, samarium-149 atoms, samarium-150 atoms, samarium-152 atoms, samarium-154 atoms, europium-151 atoms, europium-153 atoms, gadolinium-154 atoms, gadolinium-155 atoms, gadolinium-156 atoms, gadolinium-157 atoms, gadolinium-158 atoms, gadolinium-160 atoms, terbium-159 atoms, dysprosium-156 atoms, dysprosium-158 atoms, dysprosium-160 atoms, dysprosium-161 atoms, dysprosium-162 atoms, dysprosium-163 atoms, dysprosium-164 atoms, erbium-162 atoms, erbium-164 atoms, erbium-166 atoms, erbium-167 atoms, erbium-168 atoms, erbium-170 atoms, holmium-165 atoms, thulium-169 atoms, ytterbium-168 atoms, ytterbium-170 atoms, ytterbium-171 atoms, ytterbium-172 atoms, ytterbium-173 atoms, ytterbium-174 atoms, ytterbium-176 atoms, lutetium-175 atoms, or lutetium-176 atoms enriched to an isotopic abundance that is within a range defined by any two of the preceding values.

The system 200 may comprise one or more first electromagnetic delivery units 220. The first electromagnetic delivery units may comprise any electromagnetic delivery unit described herein, such as an electromagnetic delivery unit described herein with respect to FIG. 4. The first electromagnetic delivery units may be configured to apply first electromagnetic energy to one or more atoms of the plurality of atoms. Applying the first electromagnetic energy may induce the atoms to adopt one or more superposition states of a first atomic state and a second atomic state that is different from the first atomic state.

The first atomic state may comprise a first single-qubit state. The second atomic state may comprise a second single-qubit state. The first atomic state or second atomic state may be elevated in energy with respect to a ground atomic state of the atoms. The first atomic state or second atomic state may be equal in energy with respect to the ground atomic state of the atoms.

The first atomic state may comprise a first hyperfine electronic state and the second atomic state may comprise a second hyperfine electronic state that is different from the first hyperfine electronic state. For instance, the first and second atomic states may comprise first and second hyperfine states on a multiplet manifold, such as a triplet manifold. The first and second atomic states may comprise first and second hyperfine states, respectively, on a $^3P_1$ or $^3P_2$ manifold. The first and second atomic states may comprise first and second hyperfine states, respectively, on a $^3P_1$ or $^3P_2$ manifold of any atom described herein, such as a strontium-87 $^3P_1$ manifold or a strontium-87 $^3P_2$ manifold.

In some cases, the first and second atomic states are first and second hyperfine states of a first electronic state. Optical excitation may be applied between a first electronic state and a second electronic state. The optical excitation may excite the first hyperfine state and/or the second hyperfine state to the second electronic state. A single-qubit transition may comprise a two-photon transition between two hyperfine states within the first electronic state using a second electronic state as an intermediate state. To drive a single-qubit transition, a pair of frequencies, each detuned from a single-photon transition to the intermediate state, may be applied to drive a two-photon transition. In some cases, the first and second hyperfine states are hyperfine states of the ground electronic state. The ground electronic state may not decay by spontaneous or stimulated emission to a lower electronic state. The hyperfine states may comprise nuclear spin states.

In some cases, the hyperfine states comprise nuclear spin states of a strontium-87 $^1S_0$ manifold and the qubit transition drives one or both of two nuclear spin states of strontium-87 $^1S_0$ to a state detuned from or within the $^3P_2$ or $^3P_1$ manifold. In some cases, the one-qubit transition is a two photon Raman transition between nuclear spin states of strontium-87 $^1S_0$ via a state detuned from or within the $^3P_2$ or $^3P_1$ manifold. In some cases, the nuclear spin states may be Stark shifted nuclear spin states. A Stark shift may be driven optically. An optical Stark shift may be driven off resonance with any, all, or a combination of a single-qubit transition, a two-qubit transition, a shelving transition, an imaging transition, etc.

In some cases, the hyperfine states comprise nuclear spin states of a ytterbium

The first atomic state may comprise a first nuclear spin state and the second atomic state may comprise a second nuclear spin state that is different from the first nuclear spin state. The first and second atomic states may comprise first and second nuclear spin states, respectively, of a quadrupolar nucleus. The first and second atomic states may comprise first and second nuclear spin states, respectively, of a spin-1, spin-3/2, spin-2, spin-5/2, spin-3, spin-7/2, spin-4, or spin-9/2 nucleus. The first and second atomic states may comprise first and second nuclear spin states, respectively, of any atom described herein, such as first and second spin states of strontium-87.

For first and second nuclear spin states associated with a nucleus comprising a spin greater than 1/2 (such as a spin-1, spin-3/2, spin-2, spin-5/2, spin-3, spin-7/2, spin-4, or spin-9/2 nucleus), transitions between the first and second nuclear spin states may be accompanied by transitions between other spin states on the nuclear spin manifold. For instance, for a spin-9/2 nucleus in the presence of a uniform magnetic field, all of the nuclear spin levels may be separated by equal energy. Thus, a transition (such as a Raman transition) designed to transfer atoms from, for instance, an $m_N$=9/2 spin state to an $m_N$=7/2 spin state, may also drive $m_N$=7/2 to $m_N$=5/2, $m_N$=5/2 to $m_N$=3/2, $m_N$=3/2 to $m_N$=1/2, $m_N$=1/2 to $m_N$=-1/2, $m_N$=-1/2 to $m_N$=-3/2, $m_N$=-3/2 to $m_N$=-5/2, $m_N$=-5/2 to $m_N$=-7/2, and $m_N$=-7/2 to $m_N$=-9/2, where $m_N$ is the nuclear spin state. Similarly, a transition (such as a Raman transition) designed to transfer atoms from, for instance, an $m_N$=9/2 spin state to an $m_N$=5/2 spin state, may also drive $m_N$=7/2 to $m_N$=3/2, $m_N$=5/2 to $m_N$=1/2, $m_N$=3/2 to $m_N$=-1/2, $m_N$=1/2 to $m_N$=-3/2, $m_N$=-1/2 to $m_N$=-5/2, $m_N$=-3/2 to $m_N$=-7/2, and $m_N$=-5/2 to $m_N$=-9/2. Such a transition may thus not be selective for inducing transitions between particular spin states on the nuclear spin manifold.

It may be desirable to instead implement selective transitions between particular first and second spins states on the nuclear spin manifold. This may be accomplished by providing light from a light source that provides an AC Stark shift and pushes neighboring nuclear spin states out of resonance with a transition between the desired transition between the first and second nuclear spin states. For instance, if a transition from first and second nuclear spin states having $m_N$=-9/2 and $m_N$=-7/2 is desired, the light may provide an AC Stark shift to the $m_N$=-5/2 spin state, thereby greatly reducing transitions between the $m_N$=-7/2 and $m_N$=-5/2 states. Similarly, if a transition from first and second nuclear spin states having $m_N$=-9/2 and $m_N$=-5/2 is desired, the light may provide an AC Stark shift to the $m_N$=-1/2 spin state, thereby greatly reducing transitions between the $m_N$=-5/2 and $m_N$=-1/2 states. This may effectively create a two-level subsystem within the nuclear spin manifold that is decoupled from the remainder of the nuclear spin manifold, greatly simplifying the dynamics of the qubit systems. It may be advantageous to use nuclear spin states near the edge of the nuclear spin manifold (e.g., $m_N$=-9/2 and $m_N$=-7/2, $m_N$=7/2 and $m_N$=9/2, $m_N$=-9/2 and $m_N$=-5/2, or $m_N$=5/2 and $m_N$=9/2 for a spin-9/2 nucleus) such that only one AC Stark shift is required. Alternatively, nuclear spin states farther from the edge of the nuclear spin manifold (e.g., $m_N$=-5/2 and $m_N$=-3/2 or $m_N$=-5/2 and $m_N$=-1/2) may be used and two AC Stark shifts may be implemented (e.g., at $m_N$=-7/2 and $m_N$=-1/2 or $m_N$=-9/2 and $m_N$=3/2).

Stark shifting of the nuclear spin manifold may shift neighboring nuclear spin states out of resonance with the desired transition between the first and second nuclear spin states and a second electronic state or a state detuned therefrom. Stark shifting may decrease leakage from the first and second nuclear spin state to other states in the nuclear spin manifold. Starks shifts may be achievable up to 100s of kHz for less than 10 mW beam powers. Upper state frequency selectivity may decrease scattering from imperfect polarization control. Separation of different angular momentum states in the $^3P_1$ manifold may be many gigahertz from the single and two-qubit gate light. Leakage to other states in the nuclear spin manifold may lead to decoherence. The Rabi frequency for two-qubit transitions (e.g., how quickly the transition can be driven) may be faster than the decoherence rate. Scattering from the intermediate state in the two-qubit transition may be a source of decoherence. Detuning from the intermediate state may improve fidelity of two-qubit transitions.

Qubits based on nuclear spin states in the electronic ground state may allow exploitation of long-lived metastable excited electronic states (such as a $^3P_0$ state in strontium-87) for qubit storage. Atoms may be selectively transferred into such a state to reduce cross-talk or to improve gate or detection fidelity. Such a storage or shelving process may be atom-selective using the SLMs or AODs described herein. A shelving transition may comprise a transition between the $^1S_0$ state in strontium-87 to the $^3P_0$ or $^3P_2$ state in strontium-87.

The clock transition (also a "shelving transition" or a "storage transition" herein) may be qubit-state selective. The upper state of the clock transition may have a very long natural lifetime, e.g., greater than 1 second. The linewidth of the clock transition may be much narrower than the qubit energy spacing. This may allow direct spectral resolution. Population may be transferred from one of the qubit states into the clock state. This may allow individual qubit states to be read out separately, by first transferring population from one qubit state into the clock state, performing imaging on the qubits, then transferring the population back into the ground state from the clock state and imaging again. In some cases, a magic wavelength transition is used to drive the clock transition.

The clock light for shelving can be atom-selective or not atom-selective. In some cases, the clock transition is globally applied (e.g., not atom selective). A globally applied clock transition may include directing the light without passing through a microscope objective or structuring the light. In some cases, the clock transition is atom-selective. Clock transition which are atom-selective may potentially allow us to improve gate fidelities by minimizing cross-talk. For example, to reduce cross talk in an atom, the atom may be shelved in the clock state where it may not be affected by the light. This may reduce cross-talk between neighboring qubits undergoing transitions. To implement atom-selective clock transitions, the light may pass through one or more microscope objectives and/or may be structured on one or more of a spatial light modulator, digital micromirror device, crossed acousto-optic deflectors, etc.

The system 200 may comprise one or more readout units 230. The readout units may comprise one or more readout optical units. The readout optical units may be configured to perform one or more measurements of the one or more superposition states to obtain the non-classical computation. The readout optical units may comprise one or more optical detectors. The detectors may comprise one or more photomultiplier tubes (PMTs), photodiodes, avalanche diodes, single-photon avalanche diodes, single-photon avalanche diode arrays, phototransistors, reverse-biased light emitting diodes (LEDs), charge coupled devices (CCDs), or complementary metal oxide semiconductor (CMOS) cameras. The optical detectors may comprise one or more fluorescence detectors. The readout optical unit may comprise one or more objectives, such as one or more objective having a numerical aperture (NA) of at least about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, or more. The objective may have an NA of at most about 1, 0.95, 0.9, 0.85, 0.8, 0.75, 0.7, 0.65, 0.6, 0.55, 0.5, 0.45, 0.4, 0.35, 0.3, 0.25, 0.2, 0.15, 0.1, or less. The objective may have an NA that is within a range defined by any two of the preceding values.

The one or more readout optical units 230 may make measurements, such as projective measurements, by applying light resonant with an imaging transition. The imaging transition may cause fluorescence. An imaging transition may comprise a transition between the $^1S_0$ state in strontium-87 to the $^1P_1$ state in strontium-87. The $^1P_1$ state in strontium-87 may fluoresce. The lower state of the qubit transition may comprise two nuclear spin states in the $^1S_0$ manifold. The one or more states may be resonant with the imaging transition. A measurement may comprise two excitations. In a first excitation, one of the two lower states may be excited to the shelving state (e.g., $^3P_0$ state in strontium-87). In a second excitation, the imaging transition may be excited. The first transition may reduce cross-talk between neighboring atoms during computation. Fluorescence generated from the imaging transition may be collected on one or more readout optical units 230.

The imaging units may be used to determine if one or more atoms were lost from the trap. The imaging units may be used to observe the arrangement of atoms in the trap.

The system 200 may comprise one or more vacuum units 240. The one or more vacuum units may comprise one or more vacuum pumps. The vacuum units may comprise one or more roughing vacuum pumps, such as one or more rotary pumps, rotary vane pumps, rotary piston pumps, diaphragm pumps, piston pumps, reciprocating piston pumps, scroll pumps, or screw pumps. The one or more roughing vacuum pumps may comprise one or more wet (for instance, oil-sealed) or dry roughing vacuum pumps. The vacuum units may comprise one or more high-vacuum pumps, such as one or more cryosorption pumps, diffusion pumps, turbomolecular pumps, molecular drag pumps, turbo-drag hybrid pumps, cryogenic pumps, ions pumps, or getter pumps.

The vacuum units may comprise any combination of vacuum pumps described herein. For instance, the vacuum units may comprise one or more roughing pumps (such as a scroll pump) configured to provide a first stage of rough vacuum pumping. The roughing vacuum pumps may be configured to pump gases out of the system 200 to achieve a low vacuum pressure condition. For instance, the roughing pumps may be configured to pump gases out of the system 200 to achieve a low vacuum pressure of at most about 103 Pascals (Pa). The vacuum units may further comprise one or more high-vacuum pumps (such as one or more ion pumps, getter pumps, or both) configured to provide a second stage of high vacuum pumping or ultra-high vacuum pumping. The high-vacuum pumps may be configured to pump gases out of the system 200 to achieve a high vacuum pressure of at most about $10^{-3}$ Pa or an ultra-high vacuum pressure of at most about $10^{-6}$ Pa once the system 200 has reached the low vacuum pressure condition provided by the one or more roughing pumps.

The vacuum units may be configured to maintain the system 200 at a pressure of at most about $10^{-6}$ Pa, $9\times10^{-7}$ Pa, $8\times10^{-7}$ Pa, $7\times10^{-7}$ Pa, $6\times10^{-7}$ Pa, $5\times10^{-7}$ Pa, $4\times10^{-7}$ Pa, $3\times10^{-7}$ Pa, $2\times10^{-7}$ Pa, $10^{-7}$ Pa, $9\times10^{-8}$ Pa, $8\times10^{-8}$ Pa, $7\times10^{-8}$ Pa, $6\times10^{-8}$ Pa, $5\times10^{-8}$ Pa, $4\times10^{-8}$ Pa, $3\times10^{-8}$ Pa, $2\times10^{-8}$ Pa, $10^{-8}$ Pa, $9\times10^{-9}$ Pa, $8\times10^{-9}$ Pa, $7\times10^{-9}$ Pa, $6\times10^{-9}$ Pa, $5\times10^{-9}$ Pa, $4\times10^{-9}$ Pa, $3\times10^{-9}$ Pa, $2\times10^{-9}$ Pa, $10^{-9}$ Pa, $9\times10^{-10}$ Pa, $8\times10^{-10}$ Pa, $7\times10^{-10}$ Pa, $6\times10^{-10}$ Pa, $5\times10^{-10}$ Pa, $4\times10^{-10}$ Pa, $3\times10^{-10}$ Pa, $2\times10^{-10}$ Pa, $10^{-10}$ Pa, $9\times10^{-11}$ Pa, $8\times10^{-11}$ Pa, $7\times10^{-11}$ Pa, $6\times10^{-11}$ Pa, $5\times10^{-11}$ Pa, $4\times10^{-11}$ Pa, $3\times10^{-11}$ Pa, $2\times10^{-11}$ Pa, $10^{-11}$ Pa, $9\times10^{-12}$ Pa, $8\times10^{-12}$ Pa, $7\times10^{-12}$ Pa, $6\times10^{-12}$ Pa, $5\times10^{-12}$ Pa, $4\times10^{-12}$ Pa, $3\times10^{-12}$ Pa, $2\times10^{-12}$ Pa, $10^{-12}$ Pa, or lower. The vacuum units may be configured to maintain the system 200 at a pressure of at least about $10^{-12}$ Pa, $2\times10^{-12}$ Pa, $3\times10^{-12}$ Pa, $4\times10^{-12}$ Pa, $5\times10^{-12}$ Pa, $6\times10^{-12}$ Pa, $7\times10^{-12}$ Pa, $8\times10^{-12}$ Pa, $9\times10^{-12}$ Pa, $10^{-11}$ Pa, $2\times10^{-11}$ Pa, $3\times10^{-11}$ Pa, $4\times10^{-11}$ Pa, $5\times10^{-11}$ Pa, $6\times10^{-11}$ Pa, $7\times10^{-11}$ Pa, $8\times10^{-11}$ Pa, $9\times10^{-11}$ Pa, $10^{-10}$ Pa, $2\times10^{-10}$ Pa, $3\times10^{-10}$ Pa, $4\times10^{-10}$ Pa, $5\times10^{-10}$ Pa, $6\times10^{-10}$ Pa, $7\times10^{-10}$ Pa, $8\times10^{-10}$ Pa, $9\times10^{-10}$ Pa, $10^{-9}$ Pa, $2\times10^{-9}$ Pa, $3\times10^{-9}$ Pa, $4\times10^{-9}$ Pa, $5\times10^{-9}$ Pa, $6\times10^{-9}$ Pa, $7\times10^{-9}$ Pa, $8\times10^{-9}$ Pa, $9\times10^{-9}$ Pa, $10^{-8}$ Pa, $2\times10^{-8}$ Pa, $3\times10^{-8}$ Pa, $4\times10^{-8}$ Pa, $5\times10^{-8}$ Pa, $6\times10^{-8}$ Pa, $7\times10^{-8}$ Pa, $8\times10^{-8}$ Pa, $9\times10^{-8}$ Pa, $10^{-7}$ Pa, $2\times10^{-7}$ Pa, $3\times10^{-7}$ Pa, $4\times10^{-7}$ Pa, $5\times10^{-7}$ Pa, $6\times10^{-7}$ Pa, $7\times10^{-7}$ Pa, $8\times10^{-7}$ Pa, $9\times10^{-7}$ Pa, $10^{-6}$ Pa, or higher. The vacuum units may be configured to maintain the system 200 at a pressure that is within a range defined by any two of the preceding values.

The system 200 may comprise one or more state preparation units 250. The state preparation units may comprise any state preparation unit described herein, such as a state preparation unit described herein with respect to FIG. 5. The state preparation units may be configured to prepare a state of the plurality of atoms.

The system 200 may comprise one or more atom reservoirs 260. The atom reservoirs may be configured to supply one or more replacement atoms to replace one or more atoms at one or more optical trapping sites upon loss of the atoms from the optical trapping sites. The atom reservoirs may be spatially separated from the optical trapping units. For instance, the atom reservoirs may be located at a distance from the optical trapping units.

Alternatively or in addition, the atom reservoirs may comprise a portion of the optical trapping sites of the optical trapping units. A first subset of the optical trapping sites may be utilized for performing quantum computations and may be referred to as a set of computationally-active optical trapping sites, while a second subset of the optical trapping sites may serve as an atom reservoir. For instance, the first subset of optical trapping sites may comprise an interior array of optical trapping sites, while the second subset of optical trapping sites comprises an exterior array of optical trapping sites surrounding the interior array. The interior array may comprise a rectangular, square, rectangular prism, or cubic array of optical trapping sites.

The system 200 may comprise one or more atom movement units 270. The atom movement units may be configured to move the one or more replacement atoms from the one or more atoms reservoirs to the one or more optical trapping sites. For instance, the one or more atom movement units may comprise one or more electrically tunable lenses, acousto-optic deflectors (AODs), or spatial light modulators (SLMs).

The system 200 may comprise one or more entanglement units 280. The entanglement units may be configured to quantum mechanically entangle at least a first atom of the plurality of atoms with at least a second atom of the plurality of atoms. The first or second atom may be in a superposition state at the time of quantum mechanical entanglement. Alternatively or in addition, the first or second atom may not be in a superposition state at the time of quantum mechanical entanglement. The first atom and the second atom may be quantum mechanically entangled through one or more magnetic dipole interactions, induced magnetic dipole interactions, electric dipole interactions, or induced electric dipole interactions. The entanglement units may be configured to quantum mechanically entangle any number of atoms described herein.

The entanglement units may also be configured to quantum mechanically entangle at least a subset of the atoms with at least another atom to form one or more multi-qubit units. The multi-qubit units may comprise two-qubit units, three-qubit units, four-qubit units, or n-qubit units, where n may be 5, 6, 7, 8, 9, 10, or more. For instance, a two-qubit unit may comprise a first atom quantum mechanically entangled with a second atom, a three-qubit unit may comprise a first atom quantum mechanically entangled with a second and third atom, a four-qubit unit may comprise a first atom quantum mechanically entangled with a second, third, and fourth atom, and so forth. The first, second, third, or fourth atom may be in a superposition state at the time of quantum mechanical entanglement. Alternatively or in addition, the first, second, third, or fourth atom may not be in a superposition state at the time of quantum mechanical entanglement. The first, second, third, and fourth atom may be quantum mechanically entangled through one or more magnetic dipole interactions, induced magnetic dipole interactions, electric dipole interactions, or induced electric dipole interactions.

The entanglement units may comprise one or more Rydberg units. The Rydberg units may be configured to electronically excite the at least first atom to a Rydberg state or to a superposition of a Rydberg state and a lower-energy atomic state, thereby forming one or more Rydberg atoms or dressed Rydberg atoms. The Rydberg units may be configured to induce one or more quantum mechanical entanglements between the Rydberg atoms or dressed Rydberg atoms and the at least second atom. The second atom may be located at a distance of at least about 200 nanometers (nm), 300 nm, 400 nm, 500 nm, 600 nm, 700 nm, 800 nm, 900 nm, 1 micrometer (μm), 2 μm, 3 μm, 4 μm, 5 μm, 6 μm, 7 μm, 8 μm, 9 μm, 10 μm, or more from the Rydberg atoms or dressed Rydberg atoms. The second atom may be located at a distance of at most about 10 μm, 9 μm, 8 μm, 7 μm, 6 μm, 5 μm, 4 μm, 3 μm, 2 μm, 1 μm, 900 nm, 800 nm, 700 nm, 600 nm, 500 nm, 400 nm, 300 nm, 200 nm, or less from the Rydberg atoms or dressed Rydberg atoms. The second atom may be located at a distance from the Rydberg atoms or dressed Rydberg atoms that is within a range defined by any two of the preceding values. The Rydberg units may be configured to allow the Rydberg atoms or dressed Rydberg atoms to relax to a lower-energy atomic state, thereby forming one or more two-qubit units. The Rydberg units may be configured to induce the Rydberg atoms or dressed Rydberg atoms to relax to a lower-energy atomic state. The Rydberg units may be configured to drive the Rydberg atoms or dressed Rydberg atoms to a lower-energy atomic state. For instance, the Rydberg units may be configured to apply electromagnetic radiation (such as RF radiation or optical radiation) to drive the Rydberg atoms or dressed Rydberg atoms to a lower-energy atomic state. The Rydberg units may be configured to induce any number of quantum mechanical entanglements between any number of atoms of the plurality of atoms.

The Rydberg units may comprise one or more light sources (such as any light source described herein) configured to emit light having one or more ultraviolet (UV) wavelengths. The UV wavelengths may be selected to correspond to a wavelength that forms the Rydberg atoms or dressed Rydberg atoms. For instance, the light may comprise one or more wavelengths of at least about 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, or more. The light may comprise one or more wavelengths of at most about 400 nm, 390 nm, 380 nm, 370 nm, 360 nm, 350 nm, 340 nm, 330 nm, 320 nm, 310 nm, 300 nm, 290 nm, 280 nm, 270 nm, 260 nm, 250 nm, 240 nm, 230 nm, 220 nm, 210 nm, 200 nm, or less. The light may comprise one or more wavelengths that are within a range defined by any two of the preceding values. For instance, the light may comprise one or more wavelengths that are within a range from 300 nm to 400 nm.

The Rydberg units may be configured to induce a two-photon transition to generate an entanglement. The Rydberg units may be configured to induce a two-photon transition to generate an entanglement between two atoms. The Rydberg units may be configured to selectively induce a two-photon transition to selectively generate an entanglement between two atoms. For instance, the Rydberg units may be configured to direct electromagnetic energy (such as optical energy) to particular optical trapping sites to selectively induce a two-photon transition to selectively generate the entanglement between the two atoms. The two atoms may be trapped in nearby optical trapping sites. For instance, the two atoms may be trapped in adjacent optical trapping sites. The two-photon transition may be induced using first and second light from first and second light sources, respectively. The first and second light sources may each comprise any light source described herein (such as any laser described herein). The first light source may be the same or similar to a light source used to perform a single-qubit operation described herein. Alternatively, different light sources may be used to perform a single-qubit operation and to induce a two-photon transition to generate an entanglement. The first light source may emit light comprising one or more wavelengths in the visible region of the optical spectrum (e.g., within a range from 400 nm to 800 nm or from 650 nm to 700 nm). The second light source may emit light comprising one or more wavelengths in the ultraviolet region of the optical spectrum (e.g., within a range from 200 nm to 400 nm or from 300 nm to 350 nm). The first and second light sources may emit light having substantially equal and opposite spatially-dependent frequency shifts.

The Rydberg atoms or dressed Rydberg atoms may comprise a Rydberg state that may have sufficiently strong interatomic interactions with nearby atoms (such as nearby atoms trapped in nearby optical trapping sites) to enable the implementation of multi-qubit operations. The Rydberg states may comprise a principal quantum number of at least about 50, 60, 70, 80, 90, 100, or more. The Rydberg states may comprise a principal quantum number of at most about 100, 90, 80, 70, 60, 50, or less. The Rydberg states may comprise a principal quantum number that is within a range defined by any two of the preceding values. The Rydberg states may interact with nearby atoms through van der Waals interactions. The van der Waals interactions may shift atomic energy levels of the atoms.

State selective excitation of atoms to Rydberg levels may enable the implementation of multi-qubit operations. The multi-qubit operations may comprise two-qubit operations, three-qubit operations, or n-qubit operations, where n is 4, 5, 6, 7, 8, 9, 10, or more. Two-photon transitions may be used to excite atoms from a ground state (such as a $^1S_0$ ground state) to a Rydberg state (such as an $n^3S_1$ state, wherein n is a principal quantum number described herein). State selectivity may be accomplished by a combination of laser polarization and spectral selectivity. The two-photon transitions may be implemented using first and second laser sources, as described herein. The first laser source may emit pi-polarized light, which may not change the projection of atomic angular momentum along a magnetic field. The second laser may emit circularly polarized light, which may change the projection of atomic angular momentum along the magnetic field by one unit. The first and second qubit levels may be excited to Rydberg level using this polarization. However, the Rydberg levels may be more sensitive to magnetic fields than the ground state so that large splittings (for instance, on the order of 100s of MHz) may be readily obtained. This spectral selectivity may allow state selective excitation to Rydberg levels.

Multi-qubit operations (such as two-qubit operations, three-qubit operations, four-qubit operations, and so forth) may rely on energy shifts of levels due to van der Waals interactions described herein. Such shifts may either prevent the excitation of one atom conditional on the state of the other or change the coherent dynamics of excitation of the two-atom system to enact a two-qubit operation. In some cases, "dressed states" may be generated under continuous driving to enact two-qubit operations without requiring full excitation to a Rydberg level (for instance, as described in www.arxiv.org/abs/1605.05207, which is incorporated herein by reference in its entirety for all purposes).

The system 200 may comprise one or more second electromagnetic delivery units (not shown in FIG. 2). The second electromagnetic delivery units may comprise any electromagnetic delivery unit described herein, such as an electromagnetic delivery unit described herein with respect to FIG. 4. The first and second electromagnetic delivery units may be the same. The first and second electromagnetic delivery units may be different. The second electromagnetic delivery units may be configured to apply second electromagnetic energy to the one or more multi-qubit units. The second electromagnetic energy may comprise one or more pulse sequences. The first electromagnetic energy may precede, be simultaneous with, or follow the second electromagnetic energy.

The pulse sequences may comprise any number of pulses. For instance, the pulse sequences may comprise at least about 1, 2, 3, 4, 5, 6, 7, 8, 9, 10, 20, 30, 40, 50, 60, 70, 80, 90, 100, 200, 300, 400, 500, 600, 700, 800, 900, 1,000, or more pulses. The pulse sequences may comprise at most about 1,000, 900, 800, 700, 600, 500, 400, 300, 200, 100, 90, 80, 70, 60, 50, 40, 30, 20, 10, 9, 8, 7, 6, 5, 4, 3, 2, or 1 pulses. The pulse sequences may comprise a number of pulses that is within a range defined by any two of the preceding values. Each pulse of the pulse sequence may comprise any pulse shape, such as any pulse shape described herein.

The pulse sequences may be configured to decrease the duration of time required to implement multi-qubit operations, as described herein (for instance, with respect to Example 3). For instance, the pulse sequences may comprise a duration of at least about 10 nanoseconds (ns), 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 microsecond (µs), 2 µs, 3 µs, 4 µs, 5 µs, 6 µs, 7 µs, 8 µs, 9 µs, 10 µs, 20 µs, 30 µs, 40 µs, 50 µs, 60 µs, 70 µs, 80 µs, 90 µs, 100 µs, or more. The pulse sequences may comprise a duration of at most about 100 µs, 90 µs, 80 µs, 70 µs, 60 µs, 50 µs, 40 µs, 30 µs, 20 µs, 10 µs, 9 µs, 8 µs, 7 µs, 6 µs, 5 µs, 4 µs, 3 µs, 2 µs, 1 µs, 900 ns, 800 ns, 700 ns, 600 ns, 500 ns, 400 ns, 300 ns, 200 ns, 100 ns, 90 ns, 80 ns, 70 ns, 60 ns, 50 ns, 40 ns, 30 ns, 20 ns, 10 ns, or less. The pulse sequences may comprise a duration that is within a range defined by any two of the preceding values.

The pulse sequences may be configured to increase the fidelity of multi-qubit operations, as described herein. For instance, the pulse sequences may enable multi-qubit operations with a fidelity of at least about 0.5, 0.6, 0.7, 0.8, 0.9, 0.91, 0.92, 0.93, 0.94, 0.95, 0.96, 0.97, 0.98, 0.99, 0.991, 0.992, 0.993, 0.994, 0.995, 0.996, 0.997, 0.998, 0.999, 0.9991, 0.9992, 0.9993, 0.9994, 0.9995, 0.9996, 0.9997, 0.9998, 0.9999, 0.99991, 0.99992, 0.99993, 0.99994, 0.99995, 0.99996, 0.99997, 0.99998, 0.99999, 0.999991, 0.999992, 0.999993, 0.999994, 0.999995, 0.999996, 0.999997, 0.999998, 0.999999, or more. The pulse sequences may enable multi-qubit operations with a fidelity of at most about 0.999999, 0.999998, 0.999997, 0.999996, 0.999995, 0.999994, 0.999993, 0.999992, 0.999991, 0.99999, 0.99998, 0.99997, 0.99996, 0.99995, 0.99994, 0.99993, 0.99992, 0.99991, 0.9999, 0.9998, 0.9997, 0.9996, 0.9995, 0.9994, 0.9993, 0.9992, 0.9991, 0.999, 0.998, 0.997, 0.996, 0.995, 0.994, 0.993, 0.992, 0.991, 0.99, 0.98, 0.97, 0.96, 0.95, 0.94, 0.93, 0.92, 0.91, 0.9, 0.8, 0.7, 0.6, 0.5, or less. The pulse sequences may enable multi-qubit operations with a fidelity that is within a range defined by any two of the preceding values.

The pulse sequences may enable the implementation of multi-qubit operations on non-adiabatic timescales while maintaining effectively adiabatic dynamics. For instance, the pulse sequences may comprise one or more of shortcut to adiabaticity (STA) pulse sequences, transitionless quantum driving (TQD) pulse sequences, superadiabatic pulse sequences, counterdiabatic driving pulse sequences, derivative removal by adiabatic gate (DRAG) pulse sequences, and weak anharmonicity with average Hamiltonian (Wah Wah) pulse sequences. For instance, the pulse sequences may be similar to those described in M. V. Berry, "Transitionless Quantum Driving," *Journal of Physics A: Mathematical and Theoretical* 42(36), 365303 (2009), www-.doi.org/10.1088/1751-8113/42/36/365303; Y.-Y. Jau et al., "Entangling Atomic Spins with a Strong Rydberg-Dressed Interaction," *Nature Physics* 12(1), 71-74 (2016); T. Keating et al., "Robust Quantum Logic in Neutral Atoms via Adiabatic Rydberg Dressing," *Physical Review A* 91, 012337 (2015); A. Mitra et al., "Robust Mölmer-Sorenson Gate for Neutral Atoms Using Rapid Adiabatic Rydberg Dressing," www.arxiv.org/abs/1911.04045 (2019); or L. S. Theis et al., "Counteracting Systems of Diabaticities Using DRAG Controls: The Status after 10 Years," *Europhysics Letters* 123(6), 60001 (2018), each of which is incorporated herein by reference in its entirety for all purposes.

The pulse sequences may further comprise one or more optimal control pulse sequences. The optimal control pulse sequences may be derived from one or more procedures, including gradient ascent pulse engineering (GRAPE) methods, Krotov's method, chopped basis methods, chopped random basis (CRAB) methods, Nelder-Mead methods, gradient optimization using parametrization (GROUP) methods, genetic algorithm methods, and gradient optimization of analytic controls (GOAT) methods. For instance, the pulse sequences may be similar to those described in N. Khaneja et al., "Optimal Control of Coupled Spin Dynamics: Design of NMR Pulse Sequences by Gradient Ascent Algorithms," *Journal of Magnetic Resonance* 172(2), 296-305 (2005); or J. T. Merrill et al., "Progress in Compensating Pulse Sequences for Quantum Computation," *Advances in Chemical Physics* 154, 241-294 (2014), each of which is incorporated by reference in its entirety for all purposes.

Example of Cloud Computing

The system 200 may be operatively coupled to a digital computer described herein (such as a digital computer described herein with respect to FIG. 1) over a network described herein (such as a network described herein with respect to FIG. 1). The network may comprise a cloud computing network.

Example of Optical Trapping Units

Figure 3A:
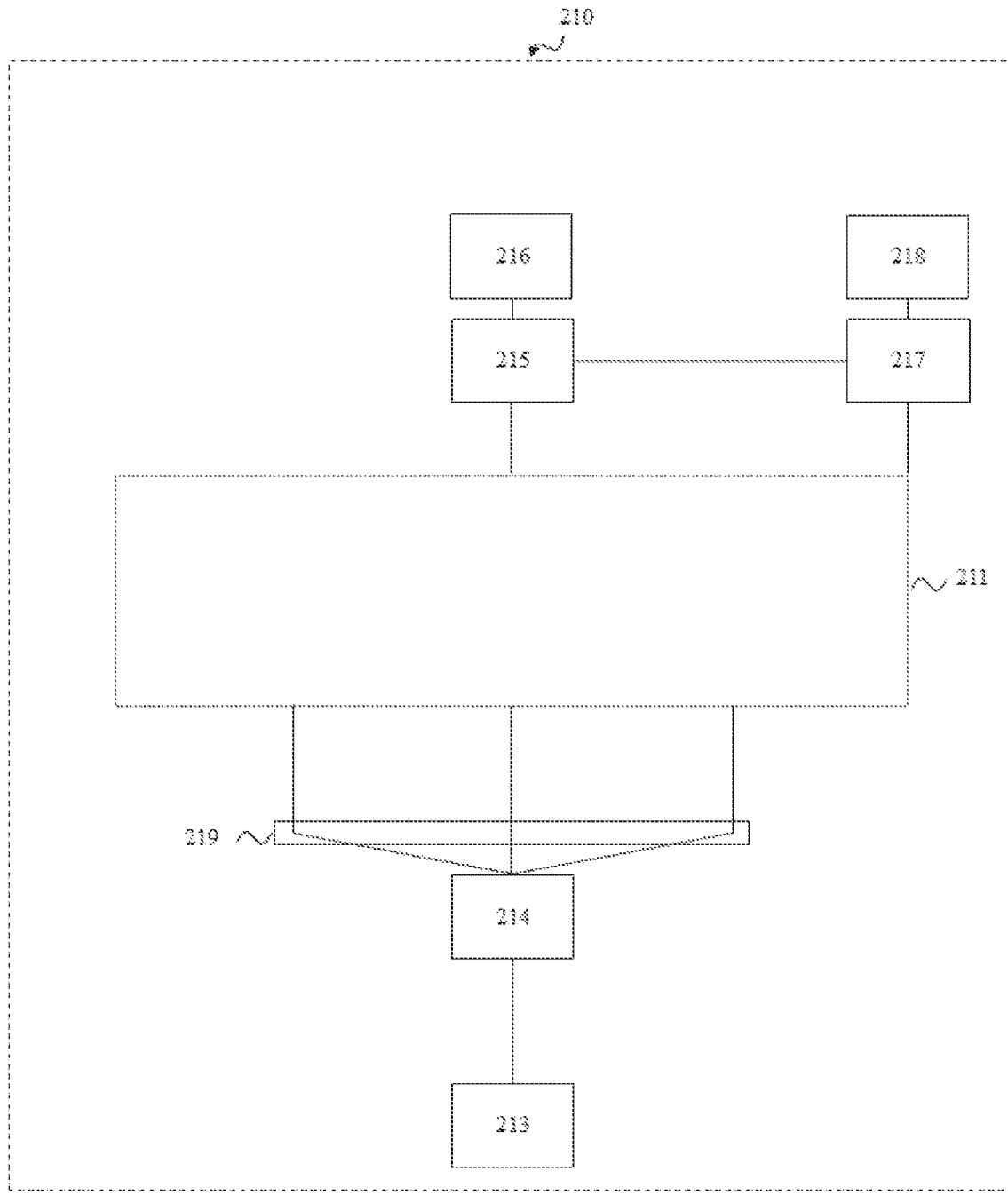
FIG. 3A shows an example of an optical trapping unit.
Figure 3B:
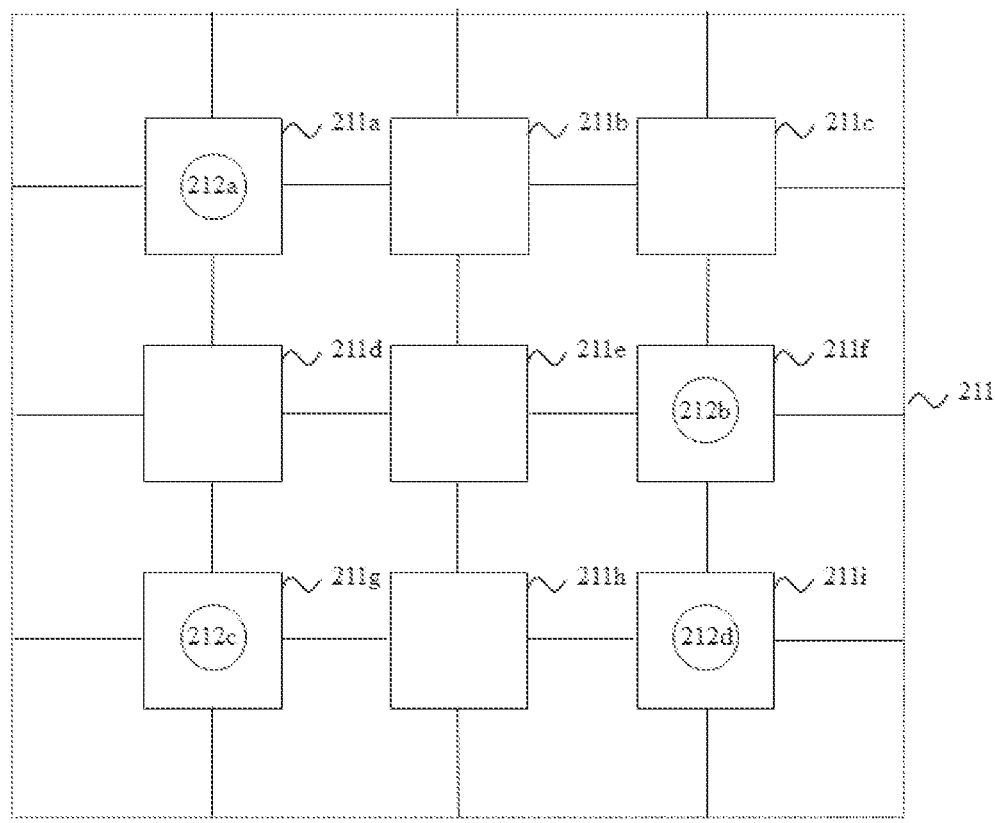
FIG. 3B shows an example of a plurality of optical trapping sites.

FIG. 3A shows an example of an optical trapping unit 210. The optical trapping unit may be configured to generate a plurality 211 of spatially distinct optical trapping sites, as described herein. For instance, as shown in FIG. 3B, the optical trapping unit may be configured to generate a first optical trapping site 211a, second optical trapping site 211b, third optical trapping site 211c, fourth optical trapping site 211d, fifth optical trapping site 211e, sixth optical trapping site 211f, seventh optical trapping site 211g, eighth optical trapping site 211h, and ninth optical trapping site 211i, as depicted in FIG. 3A. The plurality of spatially distinct optical trapping sites may be configured to trap a plurality of atoms, such as first atom 212a, second atom 212b, third atom 212c, and fourth atom 212d, as depicted in FIG. 3A. As depicted in FIG. 3B, each optical trapping site may be configured to trap a single atom. As depicted in FIG. 3B, some of the optical trapping sites may be empty (i.e., not trap an atom).

As shown in FIG. 3B, the plurality of optical trapping sites may comprise a two-dimensional (2D) array. The 2D array may be perpendicular to the optical axis of optical components of the optical trapping unit depicted in FIG. 3A. Alternatively, the plurality of optical trapping sites may comprise a one-dimensional (1D) array or a three-dimensional (3D) array.

Although depicted as comprising nine optical trapping sites filled by four atoms in FIG. 3B, the optical trapping unit 210 may be configured to generate any number of spatially distinct optical trapping sites described herein and may be configured to trap any number of atoms described herein.

Each optical trapping site of the plurality of optical trapping sites may be spatially separated from each other optical trapping site by a distance of at least about 200 nm, 300 nm, 400 nm, 500 nm, 600 nm, 700 nm, 800 nm, 900 nm, 1 µm, 2 µm, 3 µm, 4 µm, 5 µm, 6 µm, 7 µm, 8 µm, 9 µm, 10 µm, or more. Each optical trapping site may be spatially separated from each other optical trapping site by a distance of at most about 10 µm, 9 µm, 8 µm, 7 µm, 6 µm, 5 µm, 4 µm, 3 µm, 2 µm, 1 µm, 900 nm, 800 nm, 700 nm, 600 nm, 500 nm, 400 nm, 300 nm, 200 nm, or less. Each optical trapping site maybe spatially separated from each other optical trapping site by a distance that is within a range defined by any two of the preceding values.

The optical trapping sites may comprise one or more optical tweezers. Optical tweezers may comprise one or more focused laser beams to provide an attractive or repulsive force to hold or move the one or more atoms. The beam waist of the focused laser beams may comprise a strong electric field gradient. The atoms may be attracted or repelled along the electric field gradient to the center of the laser beam, which may contain the strongest electric field. The optical trapping sites may comprise one or more optical lattice sites of one or more optical lattices. The optical trapping sites may comprise one or more optical lattice sites of one or more one-dimensional (1D) optical lattices, two-dimensional (2D) optical lattices, or three-dimensional (3D) optical lattices. For instance, the optical trapping sites may comprise one or more optical lattice sites of a 2D optical lattice, as depicted in FIG. 3B.

The optical lattices may be generated by interfering counter-propagating light (such as counter-propagating laser light) to generate a standing wave pattern having a periodic succession of intensity minima and maxima along a particular direction. A 1D optical lattice may be generated by interfering a single pair of counter-propagating light beams. A 2D optical lattice may be generated by interfering two pairs of counter-propagating light beams. A 3D optical lattice may be generated by interfering three pairs of counter-propagating lights beams. The light beams may be generated by different light sources or by the same light source. Therefore, an optical lattice may be generated by at least about 1, 2, 3, 4, 5, 6, or more light sources or at most about 6, 5, 4, 3, 2, or 1 light sources.

Returning to the description of FIG. 3A, the optical trapping unit may comprise one or more light sources configured to emit light to generate the plurality of optical trapping sites as described herein. For instance, the optical trapping unit may comprise a single light source 213, as depicted in FIG. 3A. Though depicted as comprising a single light source in FIG. 3A, the optical trapping unit may comprise any number of light sources, such as at least about 1, 2, 3, 4, 5, 6, 7, 8, 9, 10, or more light sources or at most about 10, 9, 8, 7, 6, 5, 4, 3, 2, or 1 light sources. The light sources may comprise one or more lasers. The lasers may be configured to operate at a resolution limit of the lasers. For example, the lasers can be configured to provide diffraction limited spot sizes for optical trapping.

The lasers may comprise one or more continuous wave lasers. The lasers may comprise one or more pulsed lasers. The lasers may comprise one or more gas lasers, such as one or more helium-neon (HeNe) lasers, argon (Ar) lasers, krypton (Kr) lasers, xenon (Xe) ion lasers, nitrogen ($N_2$) lasers, carbon dioxide ($CO_2$) lasers, carbon monoxide (CO) lasers, transversely excited atmospheric (TEA) lasers, or excimer lasers. For instance, the lasers may comprise one or more argon dimer ($Ar_2$) excimer lasers, krypton dimer ($Kr_2$) excimer lasers, fluorine dimer ($F_2$) excimer lasers, xenon dimer ($Xe_2$) excimer lasers, argon fluoride (ArF) excimer lasers, krypton chloride (KrCl) excimer lasers, krypton fluoride (KrF) excimer lasers, xenon bromide (XeBr) excimer lasers, xenon chloride (XeCl) excimer lasers, or xenon fluoride (XeF) excimer lasers. The laser may comprise one or more dye lasers.

The lasers may comprise one or more metal-vapor lasers, such as one or more helium-cadmium (HeCd) metal-vapor lasers, helium-mercury (HeHg) metal-vapor lasers, helium-selenium (HeSe) metal-vapor lasers, helium-silver (HeAg) metal-vapor lasers, strontium (Sr) metal-vapor lasers, neon-copper (NeCu) metal-vapor lasers, copper (Cu) metal-vapor lasers, gold (Au) metal-vapor lasers, manganese (Mn) metal-vapor laser, or manganese chloride ($MnCl_2$) metal-vapor lasers.

The lasers may comprise one or more solid-state lasers, such as one or more ruby lasers, metal-doped crystal lasers, or metal-doped fiber lasers. For instance, the lasers may comprise one or more neodymium-doped yttrium aluminum garnet (Nd:YAG) lasers, neodymium/chromium doped yttrium aluminum garnet (Nd/Cr:YAG) lasers, erbium-doped yttrium aluminum garnet (Er:YAG) lasers, neodymium-doped yttrium lithium fluoride (Nd:YLF) lasers, neodymium-doped yttrium orthovanadate (ND:$YVO_4$) lasers, neodymium-doped yttrium calcium oxoborate (Nd:YCOB) lasers, neodymium glass (Nd:glass) lasers, titanium sapphire (Ti:sapphire) lasers, thulium-doped ytrium aluminum garnet (Tm:YAG) lasers, ytterbium-doped ytrrium aluminum garnet (Yb:YAG) lasers, ytterbium-doped glass (Yt:glass) lasers, holmium ytrrium aluminum garnet (Ho:YAG) lasers, chromium-doped zinc selenide (Cr:ZnSe) lasers, cerium-doped lithium strontium aluminum fluoride (Ce:LiSAF) lasers, cerium-doped lithium calcium aluminum fluoride (Ce:LiCAF) lasers, erbium-doped glass (Er:glass) lasers, erbium-ytterbium-codoped glass (Er/Yt:glass) lasers, uranium-doped calcium fluoride (U:$CaF_2$) lasers, or samarium-doped calcium fluoride (Sm:$CaF_2$) lasers.

The lasers may comprise one or more semiconductor lasers or diode lasers, such as one or more gallium nitride (GaN) lasers, indium gallium nitride (InGaN) lasers, aluminum gallium indium phosphide (AlGaInP) lasers, aluminum gallium arsenide (AlGaAs) lasers, indium gallium arsenic phosphide (InGaAsP) lasers, vertical cavity surface emitting lasers (VCSELs), or quantum cascade lasers.

The lasers may emit continuous wave laser light. The lasers may emit pulsed laser light. The lasers may have a pulse length of at least about 1 femtoseconds (fs), 2 fs, 3 fs, 4 fs, 5 fs, 6 fs, 7 fs, 8 fs, 9 fs, 10 fs, 20 fs, 30 fs, 40 fs, 50 fs, 60 fs, 70 fs, 80 fs, 90 fs, 100 fs, 200 fs, 300 fs, 400 fs, 500 fs, 600 fs, 700 fs, 800 fs, 900 fs, 1 picosecond (ps), 2 ps, 3 ps, 4 ps, 5 ps, 6 ps, 7 ps, 8 ps, 9 ps, 10 ps, 20 ps, 30 ps, 40 ps, 50 ps, 60 ps, 70 ps, 80 ps, 90 ps, 100 ps, 200 ps, 300 ps, 400 ps, 500 ps, 600 ps, 700 ps, 800 ps, 900 ps, 1 nanosecond (ns), 2 ns, 3 ns, 4 ns, 5 ns, 6 ns, 7 ns, 8 ns, 9 ns, 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1,000 ns, or more. The lasers may have a pulse length of at most about 1,000 ns, 900 ns, 800 ns, 700 ns, 600 ns, 500 ns, 400 ns, 300 ns, 200 ns, 100 ns, 90 ns, 80 ns, 70 ns, 60 ns, 50 ns, 40 ns, 30 ns, 20 ns, 10 ns, 9 ns, 8 ns, 7 ns, 6 ns, 5 ns, 4 ns, 3 ns, 2 ns, 1 ns, 900 ps, 800 ps, 700 ps, 600 ps, 500 ps, 400 ps, 300 ps, 200 ps, 100 ps, 90 ps, 80 ps, 70 ps, 60 ps, 50 ps, 40 ps, 30 ps, 20 ps, 10 ps, 9 ps, 8 ps, 7 ps, 6 ps, 5 ps, 4 ps, 3 ps, 2 ps, 1 ps, 900 fs, 800 fs, 700 fs, 600 fs, 500 fs, 400 fs, 300 fs, 200 fs, 100 fs, 90 fs, 80 fs, 70 fs, 60 fs, 50 fs, 40 fs, 30 fs, 20 fs, 10 fs, 9 fs, 8 fs, 7 fs, 6 fs, 5 fs, 4 fs, 3 fs, 2 fs, 1 fs, or less. The lasers may have a pulse length that is within a range defined by any two of the preceding values.

The lasers may have a repetition rate of at least about 1 hertz (Hz), 2 Hz, 3 Hz, 4 Hz, 5 Hz, 6 Hz, 7 Hz, 8 Hz, 9 Hz, 10 Hz, 20 Hz, 30 Hz, 40 Hz, 50 Hz, 60 Hz, 70 Hz, 80 Hz, 90 Hz, 100 Hz, 200 Hz, 300 Hz, 400 Hz, 500 Hz, 600 Hz, 700 Hz, 800 Hz, 900 Hz, 1 kilohertz (kHz), 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1 megahertz (MHz), 2 MHz, 3 MHz, 4 MHz, 5 MHz, 6 MHz, 7 MHz, 8 MHz, 9 MHz, 10 MHz, 20 MHz, 30 MHz, 40 MHz, 50 MHz, 60 MHz, 70 MHz, 80 MHz, 90 MHz, 100 MHz, 200 MHz, 300 MHz, 400 MHz, 500 MHz, 600 MHz, 700 MHz, 800 MHz, 900 MHz, 1,000 MHz, or more. The lasers may have a repetition rate of at most about 1,000 MHz, 900 MHz, 800 MHz, 700 MHz, 600 MHz, 500 MHz, 400 MHz, 300 MHz, 200 MHz, 100 MHz, 90 MHz, 80 MHz, 70 MHz, 60 MHz, 50 MHz, 40 MHz, 30 MHz, 20 MHz, 10 MHz, 9 MHz, 8 MHz, 7 MHz, 6 MHz, 5 MHz, 4 MHz, 3 MHz, 2 MHz, 1 MHz, 900 kHz, 800 kHz, 700 kHz, 600 kHz, 500 kHz, 400 kHz, 300 kHz, 200 kHz, 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, 900 Hz, 800 Hz, 700 Hz, 600 Hz, 500 Hz, 400 Hz, 300 Hz, 200 Hz, 100 Hz, 90 Hz, 80 Hz, 70 Hz, 60 Hz, 50 Hz, 40 Hz, 30 Hz, 20 Hz, 10 Hz, 9 Hz, 8 Hz, 7 Hz, 6 Hz, 5 Hz, 4 Hz, 3 Hz, 2 Hz, 1

Hz, or less. The lasers may have a repetition rate that is within a range defined by any two of the preceding values.

The lasers may emit light having a pulse energy of at least about 1 nanojoule (nJ), 2 nJ, 3 nJ, 4 nJ, 5 nJ, 6 nJ, 7 nJ, 8 nJ, 9 nJ, 10 nJ, 20 nJ, 30 nJ, 40 nJ, 50 nJ, 60 nJ, 70 nJ, 80 nJ, 90 nJ, 100 nJ, 200 nJ, 300 nJ, 400 nJ, 500 nJ, 600 nJ, 700 nJ, 800 nJ, 900 nJ, 1 microjoule (µJ), 20, 3 µJ, 4 µJ, 5 µJ, 6 µJ, 70, 80, 9 µJ, 10 µJ, 200, 300, 40 µJ, 50 µJ, 600, 700, 80 µJ, 900, 1000, 200 µJ, 300 µJ, 400 µJ, 5000, 6000, 700 µJ, 800 µJ, 9000, a least 1 millijoule (mJ), 2 mJ, 3 mJ, 4 mJ, 5 mJ, 6 mJ, 7 mJ, 8 mJ, 9 mJ, 10 mJ, 20 mJ, 30 mJ, 40 mJ, 50 mJ, 60 mJ, 70 mJ, 80 mJ, 90 mJ, 100 mJ, 200 mJ, 300 mJ, 400 mJ, 500 mJ, 600 mJ, 700 mJ, 800 mJ, 900 mJ, a least 1 Joule (J), or more. The lasers may emit light having a pulse energy of at most about 1 J, 900 mJ, 800 mJ, 700 mJ, 600 mJ, 500 mJ, 400 mJ, 300 mJ, 200 mJ, 100 mJ, 90 mJ, 80 mJ, 70 mJ, 60 mJ, 50 mJ, 40 mJ, 30 mJ, 20 mJ, 10 mJ, 9 mJ, 8 mJ, 7 mJ, 6 mJ, 5 mJ, 4 mJ, 3 mJ, 2 mJ, 1 mJ, 900 µJ, 8000, 7000, 6000, 5000, 400 µJ, 300 µJ, 2000, 1000, 90 µJ, 80 µJ, 700, 600, 50 µJ, 400, 300, 20 µJ, 10 µJ, 90, 80, 7 µJ, 6 µJ, 50, 40, 3 µJ, 2 µJ, 10, 900 nJ, 800 nJ, 700 nJ, 600 nJ, 500 nJ, 400 nJ, 300 nJ, 200 nJ, 100 nJ, 90 nJ, 80 nJ, 70 nJ, 60 nJ, 50 nJ, 40 nJ, 30 nJ, 20 nJ, 10 nJ, 9 nJ, 8 nJ, 7 nJ, 6 nJ, 5 nJ, 4 nJ, 3 nJ, 2 nJ, 1 nJ, or less. The lasers may emit light having a pulse energy that is within a range defined by any two of the preceding values.

The lasers may emit light having an average power of at least about 1 microwatt (µV), 2 µW, 3 µW, 4 µW, 5 µW, 6 µW, 7 µW, 8 µW, 9 µW, 10 µW, 20 µW, 30 µW, 40 µW, 50 µW, 60 µW, 70 µW, 80 µW, 90 µW, 100 µW, 200 µW, 300 µW, 400 µW, 500 µW, 600 µW, 700 µW, 800 µW, 900 µW, 1 milliwatt (mW), 2 mW, 3 mW, 4 mW, 5 mW, 6 mW, 7 mW, 8 mW, 9 mW, 10 mW, 20 mW, 30 mW, 40 mW, 50 mW, 60 mW, 70 mW, 80 mW, 90 mW, 100 mW, 200 mW, 300 mW, 400 mW, 500 mW, 600 mW, 700 mW, 800 mW, 900 mW, 1 watt (W), 2 W, 3 W, 4 W, 5 W, 6 W, 7 W, 8 W, 9 W, 10 W, 20 W, 30 W, 40 W, 50 W, 60 W, 70 W, 80 W, 90 W, 100 W, 200 W, 300 W, 400 W, 500 W, 600 W, 700 W, 800 W, 900 W, 1,000 W, or more. The lasers may emit light having an average power of at most about 1,000 W, 900 W, 800 W, 700 W, 600 W, 500 W, 400 W, 300 W, 200 W, 100 W, 90 W, 80 W, 70 W, 60 W, 50 W, 40 W, 30 W, 20 W, 10 W, 9 W, 8 W, 7 W, 6 W, 5 W, 4 W, 3 W, 2 W, 1 W, 900 mW, 800 mW, 700 mW, 600 mW, 500 mW, 400 mW, 300 mW, 200 mW, 100 mW, 90 mW, 80 mW, 70 mW, 60 mW, 50 mW, 40 mW, 30 mW, 20 mW, 10 mW, 9 mW, 8 mW, 7 mW, 6 mW, 5 mW, 4 mW, 3 mW, 2 mW, 1 mW, 900 µW, 800 µW, 700 µW, 600 µW, 500 µW, 400 µW, 300 µW, 200 µW, 100 µW, 90 µW, 80 µW, 70 µW, 60 µW, 50 µW, 40 µW, 30 µW, 20 µW, 10 µW, 9 µW, 8 µW, 7 µW, 6 µW, 5 µW, 4 µW, 3 µW, 2 µW, 1 µW, or more. The lasers may emit light having a power that is within a range defined by any two of the preceding values.

The lasers may emit light comprising one or more wavelengths in the ultraviolet (UV), visible, or infrared (IR) portions of the electromagnetic spectrum. The lasers may emit light comprising one or more wavelengths of at least about 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, 1,010 nm, 1,020 nm, 1,030 nm, 1,040 nm, 1,050 nm, 1,060 nm, 1,070 nm, 1,080 nm, 1,090 nm, 1,100 nm, 1,110 nm, 1,120 nm, 1,130 nm, 1,140 nm, 1,150 nm, 1,160 nm, 1,170 nm, 1,180 nm, 1,190 nm, 1,200 nm, 1,210 nm, 1,220 nm, 1,230 nm, 1,240 nm, 1,250 nm, 1,260 nm, 1,270 nm, 1,280 nm, 1,290 nm, 1,300 nm, 1,310 nm, 1,320 nm, 1,330 nm, 1,340 nm, 1,350 nm, 1,360 nm, 1,370 nm, 1,380 nm, 1,390 nm, 1,400 nm, or more. The lasers may emit light comprising one or more wavelengths of at most about 1,400 nm, 1,390 nm, 1,380 nm, 1,370 n, 1,360 nm, 1,350 nm, 1,340 nm, 1,330 nm, 1,320 nm, 1,310 nm, 1,300 nm, 1,290 nm, 1,280 nm, 1,270 n, 1,260 nm, 1,250 nm, 1,240 nm, 1,230 nm, 1,220 nm, 1,210 nm, 1,200 nm, 1,190 nm, 1,180 nm, 1,170 n, 1,160 nm, 1,150 nm, 1,140 nm, 1,130 nm, 1,120 nm, 1,110 nm, 1,100 nm, 1,090 nm, 1,080 nm, 1,070 n, 1,060 nm, 1,050 nm, 1,040 nm, 1,030 nm, 1,020 nm, 1,010 nm, 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, 390 nm, 380 nm, 370 nm, 360 nm, 350 nm, 340 nm, 330 nm, 320 nm, 310 nm, 300 nm, 290 nm, 280 nm, 270 nm, 260 nm, 250 nm, 240 nm, 230 nm, 220 nm, 210 nm, 200 nm. The lasers may emit light comprising one or more wavelengths that are within a range defined by any two of the preceding values.

The lasers may emit light having a bandwidth of at least about $1\times10^{-15}$ nm, $2\times10^{-15}$ nm, $3\times10^{-15}$ nm, $4\times10^{-15}$ nm, $5\times10^{-15}$ nm, $6\times10^{-15}$ nm, $7\times10^{-15}$ nm, $8\times10^{-15}$ nm, $9\times10^{-15}$ nm, $1\times10^{-14}$ nm, $2\times10^{-14}$ nm, $3\times10^{-14}$ nm, $4\times10^{-14}$ nm, $5\times10^{-14}$ nm, $6\times10^{-14}$ nm, $7\times10^{-14}$ nm, $8\times10^{-14}$ nm, $9\times10^{-14}$ nm, $1\times10^{-13}$ nm, $2\times10^{-13}$ nm, $3\times10^{-13}$ nm, $4\times10^{-13}$ nm, $5\times10^{-13}$ nm, $6\times10^{-13}$ nm, $7\times10^{-13}$ nm, $8\times10^{-13}$ nm, $9\times10^{-13}$ nm, $1\times10^{-12}$ nm, $2\times10^{-12}$ nm, $3\times10^{-12}$ nm, $4\times10^{-12}$ nm, $5\times10^{-12}$ nm, $6\times10^{-12}$ nm, $7\times10^{-12}$ nm, $8\times10^{-12}$ nm, $9\times10^{-12}$ nm, $1\times10^{-11}$ nm, $2\times10^{-11}$ nm, $3\times10^{-11}$ nm, $4\times10^{-11}$ nm, $5\times10^{-11}$ nm, $6\times10^{-11}$ nm, $7\times10^{-11}$ nm, $8\times10^{-11}$ nm, $9\times10^{-11}$ nm, $1\times10^{-10}$ nm, $2\times10^{-10}$ nm, $3\times10^{-10}$ nm, $4\times10^{-10}$ nm, $5\times10^{-10}$ nm, $6\times10^{-10}$ nm, $7\times10^{-10}$ nm, $8\times10^{-10}$ nm, $9\times10^{-10}$ nm, $1\times10^{-9}$ nm, $2\times10^{-9}$ nm, $3\times10^{-9}$ nm, $4\times10^{-9}$ nm, $5\times10^{-9}$ nm, $6\times10^{-9}$ nm, $7\times10^{-9}$ nm, $8\times10^{-9}$ nm, $9\times10^{-9}$ nm, $1\times10^{-8}$ nm, $2\times10^{-8}$ nm, $3\times10^{-8}$ nm, $4\times10^{-8}$ nm, $5\times10^{-8}$ nm, $6\times10^{-8}$ nm, $7\times10^{-8}$ nm, $8\times10^{-8}$ nm, $9\times10^{-8}$ nm, $1\times10^{-7}$ nm, $2\times10^{-7}$ nm, $3\times10^{-7}$ nm, $4\times10^{-7}$ nm, $5\times10^{-7}$ nm, $6\times10^{-7}$ nm, $7\times10^{-7}$ nm, $8\times10^{-7}$ nm, $9\times10^{-7}$ nm, $1\times10^{-6}$ nm, $2\times10^{-6}$ nm, $3\times10^{-6}$ nm, $4\times10^{-6}$ nm, $5\times10^{-6}$ nm, $6\times10^{-6}$ nm, $7\times10^{-6}$ nm, $8\times10^{-6}$ nm, $9\times10^{-6}$ nm, $1\times10^{-5}$ nm, $2\times10^{-5}$ nm, $3\times10^{-5}$ nm, $4\times10^{-5}$ nm, $5\times10^{-5}$ nm, $6\times10^{-5}$ nm, $7\times10^{-5}$ nm, $8\times10^{-5}$ nm, $9\times10^{-5}$ nm, $1\times10^{-4}$ nm, $2\times10^{-4}$ nm, $3\times10^{-4}$ nm, $4\times10^{-4}$ nm, $5\times10^{-4}$ nm, $6\times10^{-4}$ nm, $7\times10^{-4}$ nm, $8\times10^{-4}$ nm, $9\times10^{-4}$ nm, $1\times10^{-3}$ nm, or more. The lasers may emit light having a bandwidth of at most about $1\times10^{-3}$ nm, $9\times10^{-4}$ nm, $8\times10^{-4}$ nm, $7\times10^{-4}$ nm, $6\times10^{-4}$ nm, $5\times10^{-4}$ nm, $4\times10^{-4}$ nm, $3\times10^{-4}$ nm, $2\times10^{-4}$ nm, $1\times10^{-4}$ nm, $9\times10^{-5}$ nm, $8\times10^{-5}$ nm, $7\times10^{-5}$ nm, $6\times10^{-5}$ nm, $5\times10^{-5}$ nm, $4\times10^{-5}$ nm, $3\times10^{-5}$ nm, $2\times10^{-5}$ nm, $1\times10^{-5}$ nm, $9\times10^{-6}$ nm, $8\times10^{-6}$ nm, $7\times10^{-6}$ nm, $6\times10^{-6}$ nm, $5\times10^{-6}$ nm, $4\times10^{-6}$ nm, $3\times10^{-6}$ nm, $2\times10^{-6}$ nm, $1\times10^{-6}$ nm, $9\times10^{-7}$ nm, $8\times10^{-7}$ nm, $7\times10^{-7}$ nm, $6\times10^{-7}$ nm, $5\times10^{-7}$ nm, $4\times10^{-7}$ nm, $3\times10^{-7}$ nm, $2\times10^{-7}$ nm, $1\times10^{-7}$ nm, $9\times10^{-8}$ nm, $8\times10^{-8}$ nm, $7\times10^{-8}$ nm, $6\times10^{-8}$ nm, $5\times10^{-8}$ nm, $4\times10^{-8}$ nm, $3\times10^{-8}$ nm, $2\times10^{-8}$ nm, $1\times10^{-8}$ nm, $9\times10^{-9}$ nm, $8\times10^{-9}$ nm, $7\times10^{-9}$ nm, $6\times10^{-9}$ nm, $5\times10^{-9}$ nm, $4\times10^{-9}$ nm, $3\times10^{-9}$ nm, $2\times10^{-9}$ nm, $1\times10^{-9}$ nm, $9\times10^{-10}$ nm, $8\times10^{-10}$ nm, $7\times10^{-10}$ nm, $6\times10^{-10}$ nm, $5\times10^{-10}$ nm, $4\times10^{-10}$ nm, $3\times10^{-10}$ nm, $2\times10^{-10}$ nm, $1\times10^{-10}$ nm, $9\times10^{-11}$ nm, $8\times10^{-11}$ nm, $7\times10^{-11}$ nm, $6\times10^{-11}$ nm, $5\times10^{-11}$ nm, $4\times10^{-11}$ nm, $3\times10^{-11}$ nm, $2\times10^{-11}$ nm, $1\times10^{-11}$ nm, $9\times10^{-12}$ nm, $8\times10^{-12}$ nm, $7\times10^{-12}$ nm, $6\times10^{-12}$ nm, $5\times10^{-12}$ nm, $4\times10^{-12}$ nm, $3\times10^{-12}$ nm, $2\times10^{-12}$ nm, $1\times10^{-13}$ nm, $9\times10^{-13}$ nm, $8\times10^{-13}$ nm, $7\times10^{-13}$ nm, $6\times10^{-13}$ nm, $5\times10^{-13}$ nm, $4\times10^{-13}$ nm, $3\times10^{-13}$ nm, $2\times10^{-13}$ nm, $1\times10^{-13}$ nm, $9\times10^{-14}$ nm, $8\times10^{-14}$ nm, $7\times10^{-14}$ nm, $6\times10^{-14}$ nm, $5\times10^{-14}$ nm, $4\times10^{-14}$ nm, $3\times10^{-14}$ nm, $2\times10^{-14}$ nm, $1\times10^{-14}$ nm, $9\times10^{-15}$ nm, $8\times10^{-15}$ nm, $7\times10^{-15}$ nm, $6\times10^{-15}$ nm, $5\times10^{-15}$ nm, $4\times10^{-15}$ nm, $3\times10^{-15}$ nm, $2\times10^{-15}$ nm, $1\times10^{-15}$ nm, or less. The lasers may emit light having a bandwidth that is within a range defined by any two of the preceding values.

The light sources may be configured to emit light tuned to one or more magic wavelengths corresponding to the plurality of atoms. A magic wavelength corresponding to an atom may comprise any wavelength of light that gives rise to equal or nearly equal polarizabilities of the first and second atomic states. The magic wavelengths for a transition between the first and second atomic states may be determined by calculating the wavelength-dependent polarizabilities of the first and second atomic states and finding crossing points. Light tuned to such a magic wavelength may give rise to equal or nearly equal differential light shifts in the first and second atomic states, regardless of the intensity of the light emitted by the light sources. This may effectively decouple the first and second atomic states from motion of the atoms. The magic wavelengths may utilize one or more scalar or tensor light shifts. The scalar or tensor light shifts may depend on magnetic sublevels within the first and second atomic states.

For instance, group III atoms and metastable states of alkaline earth or alkaline earth-like atoms may possess relatively large tensor shifts whose angle relative to an applied magnetic field may be tuned to cause a situation in which scalar and tensor shifts balance and give a zero or near zero differential light shift between the first and second atomic states. The angle θ may be tuned by selecting the polarization of the emitted light. For instance, when the emitted light is linearly polarized, the total polarizability a may be written as a sum of the scalar component $\alpha_{scalar}$ and the tensor component $\alpha_{tensor}$:

$$\alpha=\alpha_{scalar}+(3\cos\theta^2-1)\alpha_{tensor}$$

By choosing θ appropriately, the polarizability of the first and second atomic states may be chosen to be equal or nearly equal, corresponding to a zero or near zero differential light shift and the motion of the atoms may be decoupled.

The light sources may be configured to direct light to one or more optical modulators (OMs) configured to generate the plurality of optical trapping sites. For instance, the optical trapping unit may comprise an OM 214 configured to generate the plurality of optical trapping sites. Although depicted as comprising one OM in FIG. 3A, the optical trapping unit may comprise any number of OMs, such as at least about 1, 2, 3, 4, 5, 6, 7, 8, 9, 10, or more OMs or at most about 10, 9, 8, 7, 6, 5, 4, 3, 2, or 1 OMs. The OMs may comprise one or more digital micromirror devices (DMDs). The OMs may comprise one or more liquid crystal devices, such as one or more liquid crystal on silicon (LCoS) devices. The OMs may comprise one or more spatial light modulators (SLMs). The OMs may comprise one or more acousto-optic deflectors (AODs) or acousto-optic modulators (AOMs). The OMs may comprise one or more electro-optic deflectors (EODs) or electro-optic modulators (EOMs).

The OM may be optically coupled to one or more optical element to generate a regular array of optical trapping sites. For instance, the OM may be optically coupled to optical element 219, as shown in FIG. 3A. The optical elements may comprise lenses or microscope objectives configured to re-direct light from the OMs to form a regular rectangular grid of optical trapping sites.

For instance, as shown in FIG. 3A, the OM may comprise an SLM, DMD, or LCoS device. The SLM, DMD, or LCoS device may be imaged onto the back focal plane of the microscope objectives. This may allow for the generation of an arbitrary configuration of optical trapping sites in two or three dimensions.

Alternatively or in addition, the OMs may comprise first and second AODs. The active regions of the first and second AODs may be imaged onto the back focal plane of the microscope objectives. The output of the first AOD may be optically coupled to the input of the second AOD. In this manner, the second AOD may make a copy of the optical output of the first AOD. This may allow for the generation of optical trapping sites in two or three dimensions.

Alternatively or in addition, the OMs may comprise static optical elements, such as one or more microlens arrays or holographic optical elements. The static optical elements may be imaged onto the back focal plane of the microscope objectives. This may allow for the generation of an arbitrary configuration of optical trapping sites in two or three dimensions.

The optical trapping unit may comprise one or more imaging units configured to obtain one or more images of a spatial configuration of the plurality of atoms trapped within the optical trapping sites. For instance, the optical trapping unit may comprise imaging unit 215. Although depicted as comprising a single imaging unit in FIG. 3A, the optical trapping unit may comprise any number of imaging units, such as at least about 1, 2, 3, 4, 5, 6, 7, 8, 9, 10, or more imaging units or at most about 10, 9, 8, 7, 6, 5, 4, 3, 2, or 1 imaging units. The imaging units may comprise one or more lens or objectives. The imaging units may comprise one or more PMTs, photodiodes, avalanche photodiodes, phototransistors, reverse-biased LEDs, CCDs, or CMOS cameras. The imaging unit may comprise one or more fluorescence detectors. The images may comprise one or more fluorescence images, single-atom fluorescence images, absorption images, single-atom absorption images, phase contrast images, or single-atom phase contrast images.

The optical trapping unit may comprise one or more spatial configuration artificial intelligence (AI) units configured to perform one or more AI operations to determine the spatial configuration of the plurality of atoms trapped within the optical trapping sites based on the images obtained by the imaging unit. For instance, the optical trapping unit may comprise spatial configuration AI unit 216. Although depicted as comprising a single spatial configuration AI unit in FIG. 3A, the optical trapping unit may comprise any number of spatial configuration AI units, such as at least about 1, 2, 3, 4, 5, 6, 7, 8, 9, 10, or more spatial configuration AI units or at most about 10, 9, 8, 7, 6, 5, 4, 3, 2, or 1 spatial configuration AI units. The AI operations may comprise any machine learning (ML) or reinforcement learning (RL) operations described herein.

The optical trapping unit may comprise one or more atom rearrangement units configured to impart an altered spatial arrangement of the plurality of atoms trapped with the optical trapping sites based on the one or more images obtained by the imaging unit. For instance, the optical trapping unit may comprise atom rearrangement unit 217. Although depicted as comprising a single atom rearrangement unit in FIG. 3A, the optical trapping unit may comprise any number of atom rearrangement units, such as at least about 1, 2, 3, 4, 5, 6, 7, 8, 9, 10, or more atom rearrangement units or at most about 10, 9, 8, 7, 6, 5, 4, 3, 2, or 1 atom rearrangement units.

The optical trapping unit may comprise one or more spatial arrangement artificial intelligence (AI) units configured to perform one or more AI operations to determine the altered spatial arrangement of the plurality of atoms trapped within the optical trapping sites based on the images obtained by the imaging unit. For instance, the optical trapping unit may comprise spatial arrangement AI unit 218. Although depicted as comprising a single spatial arrangement AI unit in FIG. 3A, the optical trapping unit may comprise any number of spatial arrangement AI units, such as at least about 1, 2, 3, 4, 5, 6, 7, 8, 9, 10, or more spatial arrangement AI units or at most about 10, 9, 8, 7, 6, 5, 4, 3, 2, or 1 spatial arrangement AI units. The AI operations may comprise any machine learning (ML) or reinforcement learning (RL) operations described herein.

In some cases, the spatial configuration AI units and the spatial arrangement AI units may be integrated into an integrated AI unit. The optical trapping unit may comprise any number of integrated AI units, such as at least about 1, 2, 3, 4, 5, 6, 7, 8, 9, 10, or more integrated AI units, or at most about 10, 9, 8, 7, 6, 5, 4, 3, 2, or 1 integrated AI units.

The atom rearrangement unit may be configured to alter the spatial arrangement in order to obtain an increase in a filling factor of the plurality of optical trapping sites. A filling factor may be defined as a ratio of the number of computationally active optical trapping sites occupied by one or more atoms to the total number of computationally active optical trapping sites available in the optical trapping unit or in a portion of the optical trapping unit. For instance, initial loading of atoms within the computationally active optical trapping sites may give rise to a filling factor of less than 100%, 90%, 80%, 70%, 60%, 50%, or less, such that atoms occupy fewer than 100%, 90%, 70%, 60%, 50%, or less of the available computationally active optical trapping sites, respectively. It may be desirable to rearrange the atoms to achieve a filling factor of at least about 50%, 60%, 70%, 80%, 90%, or 100%. By analyzing the imaging information obtained by the imaging unit, the atom rearrangement unit may attain a filling factor of at least about 50%, 60%, 70%, 80%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, or more. The atom rearrangement unit may attain a filling factor of at most about 99.99%, 99.98%, 99.97%, 99.96%, 99.95%, 99.94%, 99.93%, 99.92%, 99.91%, 99.9%, 99.8%, 99.7%, 99.6%, 99.5%, 99.4%, 99.3%, 99.2%, 99.1%, 99%, 98%, 97%, 96%, 95%, 94%, 93%, 92%, 91%, 90%, 80%, 70%, 60%, 50%, or less. The atom rearrangement unit may attain a filling factor that is within a range defined by any two of the preceding values.

Figure 3C:
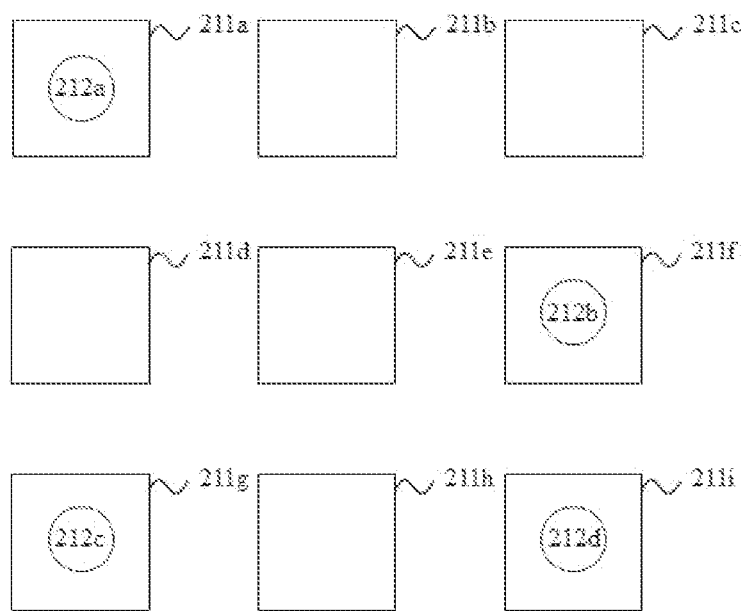
FIG. 3C shows an example of an optical trapping unit that is partially filled with atoms.

By way of example, FIG. 3C shows an example of an optical trapping unit that is partially filled with atoms. As depicted in FIG. 3C, initial loading of atoms within the optical trapping sites may give rise to a filling factor of 44.4% (4 atoms filling 9 available optical trapping sites). By moving atoms from different regions of the optical trapping unit (not shown in FIG. 3C) to unoccupied optical trapping sites or by moving atoms from an atom reservoir described herein, a much higher filling factor may be obtained, as shown in FIG. 3D.

Figure 3D:
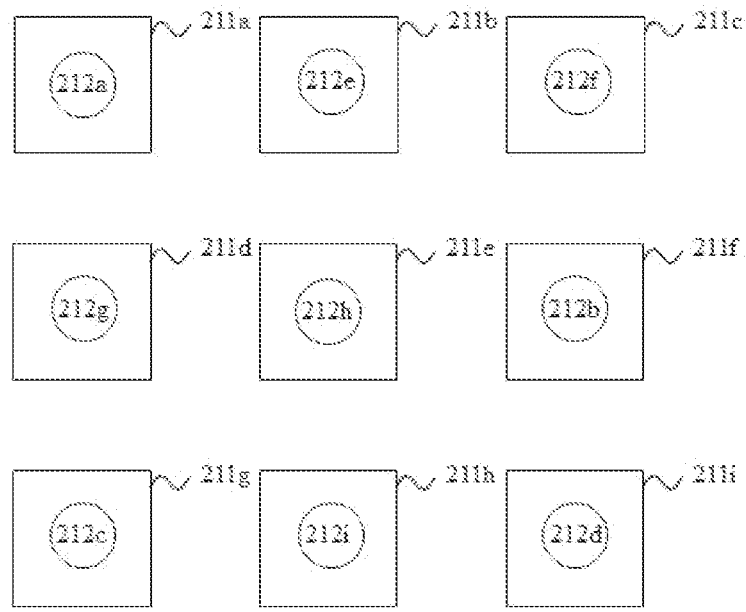
FIG. 3D shows an example of an optical trapping unit that is completely filled with atoms.

FIG. 3D shows an example of an optical trapping unit that is completely filled with atoms. As depicted in FIG. 3D, fifth atom 212e, sixth atom 212f, seventh atom 212g, eighth atom 212h, and ninth atom 212i may be moved to fill unoccupied optical trapping sites. The fifth, sixth, seventh, eighth, and ninth atoms may be moved from different regions of the optical trapping unit (not shown in FIG. 3C) or by moving atoms from an atom reservoir described herein. Thus, the filling factor may be substantially improved following rearrangement of atoms within the optical trapping sites. For instance, a filling factor of up to 100% (such 9 atoms filling 9 available optical trapping sites, as shown in FIG. 3D) may be attained.

Atom rearrangement may be performed by (i) acquiring an image of the optical trapping unit, identifying filled and unfilled optical trapping sites, (ii) determining a set of moves to bring atoms from filled optical trapping sites to unfilled optical trapping sites, and (iii) moving the atoms from filled optical trapping sites to unfilled optical trapping sites. Operations (i), (ii), and (iii) may be performed iteratively until a large filling factor is achieved. Operation (iii) may comprise translating the moves identified in operation (ii) to waveforms that may be sent to an arbitrary waveform generator (AWG) and using the AWG to drive AODs to move the atoms. The set of moves may be determined using the Hungarian algorithm described in W. Lee et al, "Defect-Free Atomic Array Formation Using Hungarian Rearrangement Algorithm," *Physical Review A* 95, 053424 (2017), which is incorporated herein by reference in its entirety for all purposes.

Example of Electromagnetic Delivery Units

FIG. 4 shows an example of an electromagnetic delivery unit 220. The electromagnetic delivery unit may be configured to apply electromagnetic energy to one or more atoms of the plurality of atoms, as described herein. The electromagnetic delivery unit may comprise one or more light sources, such as any light source described herein. The electromagnetic energy may comprise optical energy. The optical energy may comprise any repetition rate, pulse energy, average power, wavelength, or bandwidth described herein.

The electromagnetic delivery unit may comprise one or more microwave or radio-frequency (RF) energy sources, such as one or more magnetrons, klystrons, traveling-wave tubes, gyrotrons, field-effect transistors (FETs), tunnel diodes, Gunn diodes, impact ionization avalanche transit-time (IMPATT) diodes, or masers. The electromagnetic energy may comprise microwave energy or RF energy. The RF energy may comprise one or more wavelengths of at least about 1 millimeter (mm), 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, 1 meter (m), 2 m, 3 m, 4 m, 5 m, 6 m, 7 m, 8 m, 9 m, 10 m, 20 m, 30 m, 40 m, 50 m, 60 m, 70 m, 80 m, 90 m, 100 m, 200 m, 300 m, 400 m, 500 m, 600 m, 700 m, 800 m, 900 m, 1 kilometer (km), 2 km, 3 km, 4 km, 5 km, 6 km, 7 km, 8 km, 9 km, 10 km, or more. The RF energy may comprise one or more wavelengths of at most about 10 km, 9 km, 8 km, 7 km, 6 km, 5 km, 4 km, 3 km, 2 km, 1 km, 900 m, 800 m, 700 m, 600 m, 500 m, 400 m, 300 m, 200 m, 100 m, 90 m, 80 m, 70 m, 60 m, 50 m, 40 m, 30 m, 20 m, 10 m, 9 m, 8 m, 7 m, 6 m, 5 m, 4 m, 3 m, 2 m, 1 m, 900 mm, 800 mm, 700 mm, 600 mm, 500 mm, 400 mm, 300 mm, 200 mm, 100 mm, 90 mm, 80 mm, 70 mm, 60 mm, 50 mm, 40 mm, 30 mm, 20 mm, 10 mm, 9 mm, 8 mm, 7 mm, 6 mm, 5 mm, 4 mm, 3 mm, 2 mm, 1 mm, or less. The RF energy may comprise one or more wavelengths that are within a range defined by any two of the preceding values.

The RF energy may comprise an average power of at least about 1 microwatt (µW), 2 µW, 3 µW, 4 µW, 5 µW, 6 µW, 7 µW, 8 µW, 9 µW, 10 µW, 20 µW, 30 µW, 40 µW, 50 µW, 60 µW, 70 µW, 80 µW, 90 µW, 100 µW, 200 µW, 300 µW, 400 µW, 500 µW, 600 µW, 700 µW, 800 µW, 900 µW, 1 milliwatt (mW), 2 mW, 3 mW, 4 mW, 5 mW, 6 mW, 7 mW, 8 mW, 9 mW, 10 mW, 20 mW, 30 mW, 40 mW, 50 mW, 60 mW, 70 mW, 80 mW, 90 mW, 100 mW, 200 mW, 300 mW, 400 mW, 500 mW, 600 mW, 700 mW, 800 mW, 900 mW, 1 Watt (W), 2 W, 3 W, 4 W, 5 W, 6 W, 7 W, 8 W, 9 W, 10 W, 20 W, 30 W, 40 W, 50 W, 60 W, 70 W, 80 W, 90 W, 100 W, 200 W, 300 W, 400 W, 500 W, 600 W, 700 W, 800 W, 900 W, 1,000 W, or more. The RF energy may comprise an average power of at most about 1,000 W, 900 W, 800 W, 700 W, 600 W, 500 W, 400 W, 300 W, 200 W, 100 W, 90 W, 80 W, 70 W, 60 W, 50 W, 40 W, 30 W, 20 W, 10 W, 9 W, 8 W, 7 W, 6 W, 5 W, 4 W, 3 W, 2 W, 1 W, 900 mW, 800 mW, 700 mW, 600 mW, 500 mW, 400 mW, 300 mW, 200 mW, 100 mW, 90 mW, 80 mW, 70 mW, 60 mW, 50 mW, 40 mW, 30 mW, 20 mW, 10 mW, 9 mW, 8 mW, 7 mW, 6 mW, 5 mW, 4 mW, 3 mW, 2 mW, 1 mW, 900 µW, 800 µW, 700 µW, 600 µW, 500 µW, 400 µW, 300 µW, 200 µW, 100 µW, 90 µW, 80 µW, 70 µW, 60 µW, 50 µW, 40 µW, 30 µW, 20 µW, 10 µW, 9 µW, 8 µW, 7 µW, 6 µW, 5 µW, 4 µW, 3 µW, 2 µW, 1 µW, or less. The RF energy may comprise an average power that is within a range defined by any two of the preceding values.

The electromagnetic delivery unit may comprise one or more light sources, such as any light source described herein. For instance, the electromagnetic delivery unit may comprise light source 221. Although depicted as comprising a single light source in FIG. 4, the electromagnetic delivery unit may comprise any number of light sources, such as at least about 1, 2, 3, 4, 5, 6, 7, 8, 9, 10, or more light sources or at most about 10, 9, 8, 7, 6, 5, 4, 3, 2, or 1 light sources.

The light sources may be configured to direct light to one or more OMs configured to selectively apply the electromagnetic energy to one or more atoms of the plurality of atoms. For instance, the electromagnetic delivery unit may comprise OM 222. Although depicted as comprising a single OM in FIG. 4, the electromagnetic delivery unit may comprise any number of OMs, such as at least about 1, 2, 3, 4, 5, 6, 7, 8, 9, 10, or more OMs or at most about 10, 9, 8, 7, 6, 5, 4, 3, 2, or 1 OMs. The OMs may comprise one or more SLMs, AODs, or AOMs. The OMs may comprise one or more DMDs. The OMs may comprise one or more liquid crystal devices, such as one or more LCoS devices.

The electromagnetic delivery unit may comprise one or more electromagnetic energy artificial intelligence (AI) units configured to perform one or more AI operations to selectively apply the electromagnetic energy to the atoms. For instance, the electromagnetic delivery unit may comprise AI unit 223. Although depicted as comprising a single AI unit in FIG. 4, the electromagnetic delivery unit may comprise any number of AI units, such as at least about 1, 2, 3, 4, 5, 6, 7, 8, 9, 10, or more AI units or at most about 10, 9, 8, 7, 6, 5, 4, 3, 2, or 1 AI units. The AI operations may comprise any machine learning (ML) or reinforcement learning (RL) operations described herein.

The electromagnetic delivery unit may be configured to apply one or more single-qubit operations (such as one or more single-qubit gate operations) on the qubits described herein. The electromagnetic delivery unit may be configured to apply one or more two-qubit operations (such as one or more two-qubit gate operations) on the two-qubit units described herein. Each single-qubit or two-qubit operation may comprise a duration of at least about 10 nanoseconds (ns), 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 microsecond (µs), 2 µs, 3 µs, 4 µs, 5 µs, 6 µs, 7 µs, 8 µs, 9 µs, 10 µs, 20 µs, 30 µs, 40 µs, 50 µs, 60 µs, 70 µs, 80 µs, 90 µs, 100 µs, or more. Each single-qubit or two-qubit operation may comprise a duration of at most about 100 µs, 90 µs, 80 µs, 70 µs, 60 µs, 50 µs, 40 µs, 30 µs, 20 µs, 10 µs, 9 µs, 8 µs, 7 µs, 6 µs, 5 µs, 4 µs, 3 µs, 2 µs, 1 µs, 900 ns, 800 ns, 700 ns, 600 ns, 500 ns, 400 ns, 300 ns, 200 ns, 100 ns, 90 ns, 80 ns, 70 ns, 60 ns, 50 ns, 40 ns, 30 ns, 20 ns, 10 ns, or less. Each single-qubit or two-qubit operation may comprise a duration that is within a range defined by any two of the preceding values. The single-qubit or two-qubit operations may be applied with a repetition frequency of at least 1 kilohertz (kHz), 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1,000 kHz, or more. The single-qubit or two-qubit operations may be applied with a repetition frequency of at most 1,000 kHz, 900 kHz, 800 kHz, 700 kHz, 600 kHz, 500 kHz, 400 kHz, 300 kHz, 200 kHz, 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, or less. The single-qubit or two-qubit operations may be applied with a repetition frequency that is within a range defined by any two of the preceding values.

The electromagnetic delivery unit may be configured to apply one or more single-qubit operations by inducing one or more Raman transitions between a first qubit state and a second qubit state described herein. The Raman transitions may be detuned from a $^3P_0$ or $^3P_1$ line described herein. For instance, the Raman transitions may be detuned by at least about 1 kHz, 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1 MHz, 2 MHz, 3 MHz, 4 MHz, 5 MHz, 6 MHz, 7 MHz, 8 MHz, 9 MHz, 10 MHz, 20 MHz, 30 MHz, 40 MHz, 50 MHz, 60 MHz, 70 MHz, 80 MHz, 90 MHz, 100 MHz, 200 MHz, 300 MHz, 400 MHz, 500 MHz, 600 MHz, 700 MHz, 800 MHz, 900 MHz, 1 GHz, or more. The Raman transitions may be detuned by at most about 1 GHz, 900 MHz, 800 MHz, 700 MHz, 600 MHz, 500 MHz, 400 MHz, 300 MHz, 200 MHz, 100 MHz, 90 MHz, 80 MHz, 70 MHz, 60 MHz, 50 MHz, 40 MHz, 30 MHz, 20 MHz, 10 MHz, 9 MHz, 8 MHz, 7 MHz, 6 MHz, 5 MHz, 4 MHz, 3 MHz, 2 MHz, 1 MHz, 900 kHz, 800 kHz, 700 kHz, 600 kHz, 500 kHz, 400 kHz, 300 kHz, 200 kHz, 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, or less. The Raman transitions may be detuned by a value that is within a range defined by any two of the preceding values.

Raman transitions may be induced on individually selected atoms using one or more spatial light modulators (SLMs) or acousto-optic deflectors (AODs) to impart a deflection angle and/or a frequency shift to a light beam based on an applied radio-frequency (RF) signal. The SLM or AOD may be combined with an optical conditioning system that images the SLM or AOD active region onto the back focal plane of a microscope objective. The microscope objective may perform a spatial Fourier transform on the optical field at the position of the SLM or AOD. As such, angle (which may be proportional to RF frequency) may be converted into position. For example, applying a comb of radio frequencies to an AOD may generate a linear array of spots at a focal plane of the objective, with each spot having a finite extent determined by the characteristics of the optical conditioning system (such as the point spread function of the optical conditioning system).

To perform a Raman transition on a single atom with a single SLM or AOD, a pair of frequencies may be applied to the SLM or AOD simultaneously. The two frequencies of the pair may have a frequency difference that matches or nearly matches the splitting energy between the first and second qubit states. For instance, the frequency difference may differ from the splitting energy by at most about 1 MHz, 900 kHz, 800 kHz, 700 kHz, 600 kHz, 500 kHz, 400 kHz, 300 kHz, 200 kHz, 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, 900 Hz, 800 Hz, 700 Hz, 600 Hz, 500 Hz, 400 Hz, 300 Hz, 200 Hz, 100 Hz, 90 Hz, 80 Hz, 70 Hz, 60 Hz, 50 Hz, 40 Hz, 30 Hz, 20 Hz, 10 Hz, 9 Hz, 8 Hz, 7 Hz, 6 Hz, 5 Hz, 4 Hz, 3 Hz, 2 Hz, 1 Hz, or less. The frequency difference may differ from the splitting energy by at least about 1 Hz, 2 Hz, 3 Hz, 4 Hz, 5 Hz, 6 Hz, 7 Hz, 8 Hz, 9 Hz, 10 Hz, 20 Hz, 30 Hz, 40 Hz, 50 Hz, 60 Hz, 70 Hz, 80 Hz, 90 Hz, 100 Hz, 200 Hz, 300 Hz, 400 Hz, 500 Hz, 600 Hz, 700 Hz, 800 Hz, 900 Hz, 1 kHz, 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1 MHz, or more. The frequency difference may differ from the splitting energy by about 0 Hz. The frequency difference may differ from the splitting energy by a value that is within a range defined by any two of the preceding values. The optical system may be configured such that the position spacing corresponding to the frequency difference is not resolved and such that light at both of the two frequencies interacts with a single atom.

The electromagnetic delivery units may be configured to provide a beam with a characteristic dimension of at least about 10 nm, 50 nm, 75 nm, 100 nm, 125 nm, 150 nm, 175 nm, 200 nm, 225 nm, 250 nm, 275 nm, 300 nm, 325 nm, 350 nm, 375 nm, 400 nm, 425 nm, 450 nm, 475 nm, 500 nm, 525 nm, 550 nm, 575 nm, 600 nm, 625 nm, 650 nm, 675 nm, 700 nm, 725 nm, 750 nm, 775 nm, 800 nm, 825 nm, 850 nm, 875 nm, 900 nm, 925 nm, 950 nm, 975 nm, 1 micrometer (µm), 1.5 µm, 2 µm, 2.5 µm 3 µm, 3.5 µm, 4 µm, 4.5 µm, 5 µm, 5.5 µm, 6 µm, 6.5 µm, 7 µm, 7.5 µm, 8 µm, 8.5 µm, 9 µm, 9.5 µm, 10 µm, or more. The electromagnetic delivery units may be configured to provide a beam with a characteristic dimension of at most about 10 µm, 9.5 µm, 9 µm, 8.5 µm, 8 µm, 7.5 µm, 7 µm, 6.5 µm, 6 µm, 5.5 µm, 5 µm, 4.5 µm, 4 µm, 3.5 µm, 3 µm, 2.5 µm, 2 µm, 1.5 µm, 1 µm, 975 nm, 950 nm, 925 nm, 900 nm, 875 nm, 850 nm, 825 nm, 800 nm, 775 nm, 750 nm, 725 nm, 700 nm, 675 nm, 650 nm, 625 nm, 600 nm, 575 nm, 550 nm, 525 nm, 500 nm, 475 nm, 450 nm, 425 nm, 400 nm, 375 nm, 350 nm, 325 nm, 300 nm, 275 nm, 250 nm, 225 nm, 200 nm, 175 nm, 150 nm, 125 nm, 100 nm, 75 nm, 25 nm, 10 nm, or less. The electromagnetic delivery units may be configured to provide a beam with a characteristic dimension as defined by any two of the proceeding values. For example, the beam can have a characteristic dimension of about 1.5 micrometers to about 2.5 micrometers. Examples of characteristic dimensions include, but are not limited to, a Gaussian beam waist, the full width at half maximum (FWHM) of the beam size, the beam diameter, the $1/e^2$ width, the D4σ width, the D86 width, and the like. For example, the beam may have a Gaussian beam waist of at least about 1.5 micrometers.

The characteristic dimension of the beam may be bounded at the low end by the size of the atomic wavepacket of an optical trapping site. For example, the beam can be formed such that the intensity variation of the beam over the trapping site is sufficiently small as to be substantially homogeneous over the trapping site. In this example, the beam homogeneity can improve the fidelity of a qubit in the trapping site. The characteristic dimension of the beam may be bounded at the high end by the spacing between trapping sites. For example, a beam can be formed such that it is small enough that the effect of the beam on a neighboring trapping site/atom is negligible. In this example, the effect may be negligible if the effect can be minimized by techniques such as, for example, composite pulse engineering. The characteristic dimension may be different from a maximum achievable resolution of the system. For example, a system can have a maximum resolution of 700 nm, but the system may be operated at 1.5 micrometers. In this example, the value of the characteristic dimension may be selected to optimize the performance of the system in view of the considerations described elsewhere herein. The characteristic dimension may be invariant for different maximally achievable resolutions. For example, a system with a maximum resolution of 500 nm and a system with a maximum resolution of 2 micrometers may both be configured to operate at a characteristic dimension of 2 micrometers. In this example, 2 micrometers may be the optimal resolution based on the size of the trapping sites.

Example of Integrated Optical Trapping Units and Electromagnetic Delivery Units

The optical trapping units and electromagnetic delivery units described herein may be integrated into a single optical system. A microscope objective may be used to deliver electromagnetic radiation generated by an electromagnetic delivery unit described herein and to deliver light for trapping atoms generated by an optical trapping unit described herein. Alternatively or in addition, different objectives may be used to deliver electromagnetic radiation generated by an electromagnetic delivery unit and to deliver light from trapping atoms generated by an optical trapping unit.

A single SLM or AOD may allow the implementation of qubit operations (such as any single-qubit or two-qubit operations described herein) on a linear array of atoms. Alternatively or in addition, two separate SLMs or AODs may be configured to each handle light with orthogonal polarizations. The light with orthogonal polarizations may be overlapped before the microscope objective. In such a scheme, each photon used in a two-photon transition described herein may be passed to the objective by a separate SLM or AOD, which may allow for increased polarization control. Qubit operations may be performed on a two-dimensional arrangement of atoms by bringing light from a first SLM or AOD into a second SLM or AOD that is oriented substantially orthogonally to the first SLM or AOD via an optical relay. Alternatively or in addition, qubit operations may be performed on a two-dimensional arrangement of atoms by using a one-dimensional array of SLMs or AODs.

The stability of qubit gate fidelity may be improved by maintaining overlap of light from the various light sources described herein (such as light sources associated with the optical trapping units or electromagnetic delivery units described herein). Such overlap may be maintained by an optical subsystem that measures the direction of light emitted by the various light sources, allowing closed-loop control of the direction of light emission. The optical subsystem may comprise a pickoff mirror located before the microscope objective. The pickoff mirror may be configured to direct a small amount of light to a lens, which may focus a collimated beam and convert angular deviation into position deviation. A position-sensitive optical detector, such as a lateral-effect position sensor or quadrant photodiode, may convert the position deviation into an electronic signal and information about the deviation may be fed into a compensation optic, such as an active mirror.

The stability of qubit gate manipulation may be improved by controlling the intensity of light from the various light sources described herein (such as light sources associated with the optical trapping units or electromagnetic delivery units described herein). Such intensity control may be maintained by an optical subsystem that measures the intensity of light emitted by the various light sources, allowing closed-loop control of the intensity. Each light source may be coupled to an intensity actuator, such as an intensity servo control. The actuator may comprise an acousto-optic modulator (AOM) or electro-optic modulator (EOM). The intensity may be measured using an optical detector, such as a photodiode or any other optical detector described herein. Information about the intensity may be integrated into a feedback loop to stabilize the intensity.

Example of State Preparation Units

Figure 5:
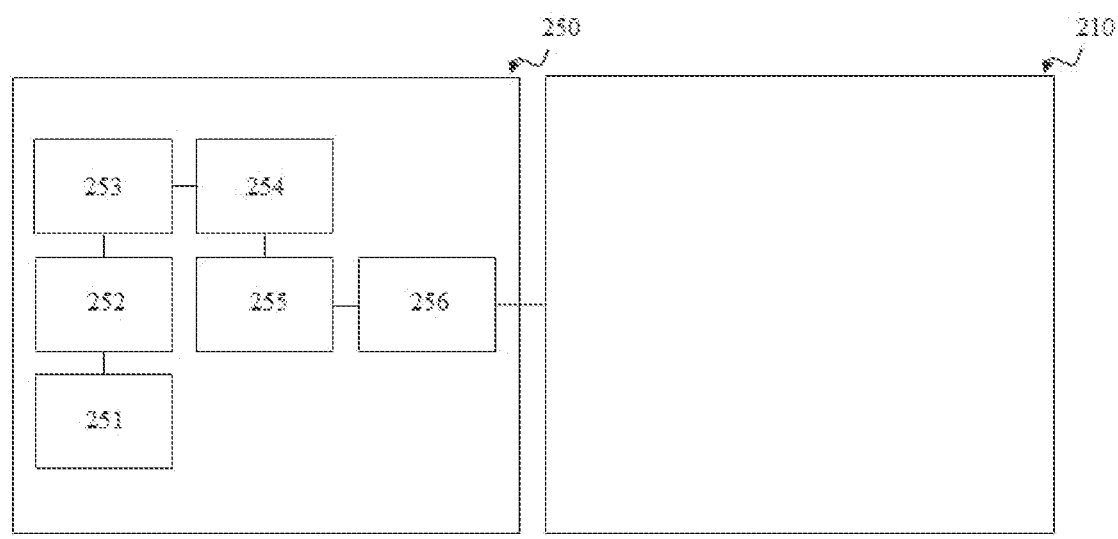
FIG. 5 shows an example of a state preparation unit.

FIG. 5 shows an example of a state preparation unit 250. The state preparation unit may be configured to prepare a state of the plurality of atoms, as described herein. The state preparation unit may be coupled to the optical trapping unit and may direct atoms that have been prepared by the state preparation unit to the optical trapping unit. The state preparation unit may be configured to cool the plurality of atoms. The state preparation unit may be configured to cool the plurality of atoms prior to trapping the plurality of atoms at the plurality of optical trapping sites.

The state preparation unit may comprise one or more Zeeman slowers. For instance, the state preparation unit may comprise a Zeeman slower 251. Although depicted as comprising a single Zeeman slower in FIG. 5, the state preparation may comprise any number of Zeeman slowers, such as at least about 1, 2, 3, 4, 5, 6, 7, 8, 9, 10, or more Zeeman slowers or at most about 10, 9, 8, 7, 6, 5, 4, 3, 2, or 1 Zeeman slowers. The Zeeman slowers may be configured to cool one or more atoms of the plurality of atoms from a first velocity or distribution of velocities (such an emission velocity from an of an atom source, room temperature, liquid nitrogen temperature, or any other temperature) to a second velocity that is lower than the first velocity or distribution of velocities.

The first velocity or distribution of velocities may be associated with a temperature of at least about 50 Kelvin (K), 60 K, 70 K, 80 K, 90 K, 100 K, 200 K, 300 K, 400 K, 500 K, 600 K, 700 K, 800 K, 900 K, 1,000 K, or more. The first velocity or distribution of velocities may be associated with a temperature of at most about 1,000 K, 900 K, 800 K, 700 K, 600 K, 500 K, 400 K, 300 K, 200 K, 100 K, 90 K, 80 K, 70 K, 60 K, 50 K, or less. The first velocity or distribution of velocities may be associated with a temperature that is within a range defined by any two of the preceding values. The second velocity may be at least about 1 meter per second (m/s), 2 m/s, 3 m/s, 4 m/s, 5 m/s, 6 m/s, 7 m/s, 8 m/s, 9 m/s, 10 m/s, or more. The second velocity may be at most about 10 m/s, 9 m/s, 8 m/s, 7 m/s, 6 m/s, 5 m/s, 4 m/s, 3 m/s, 2 m/s, 1 m/s, or less. The second velocity may be within a range defined by any two of the preceding values. The Zeeman slowers may comprise 1D Zeeman slowers.

The state preparation unit may comprise a first magneto-optical trap (MOT) 252. The first MOT may be configured to cool the atoms to a first temperature. The first temperature may be at most about 10 millikelvin (mK), 9 mK, 8 mK, 7 mK, 6 mK, 5 mK, 4 mK, 3 mK, 2 mK, 1 mK, 0.9 mK, 0.8 mK, 0.7 mK, 0.6 mK, 0.5 mK, 0.4 mK, 0.3 mK, 0.2 mK, 0.1 mK, or less. The first temperature may be at least about 0.1 mK, 0.2 mK, 0.3 mK, 0.4 mK, 0.5 mK, 0.6 mK, 0.7 mK, 0.8 mK, 0.9 mK, 1 mK, 2 mK, 3 mK, 4 mK, 5 mK, 6 mK, 7 mK, 8 mK, 9 mK, 10 mK, or more. The first temperature may be within a range defined by any two of the preceding values. The first MOT may comprise a 1D, 2D, or 3D MOT.

The first MOT may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

The state preparation unit may comprise a second MOT 253. The second MOT may be configured to cool the atoms from the first temperature to a second temperature that is lower than the first temperature. The second temperature may be at most about 100 microkelvin (μK), 90 μK, 80 μK, 70 μK, 60 μK, 50 μK, 40 μK, 30 μK, 20 μK, 10 μK, 9 μK, 8 μK, 7 μK, 6 μK, 5 μK, 4 μK, 3 μK, 2 μK, 1 μK, 900 nanokelvin (nK), 800 nK, 700 nK, 600 nK, 500 nK, 400 nK, 300 nK, 200 nK, 100 nK, or less. The second temperature may be at least about 100 nK, 200 nK, 300 nK, 400 nK, 500 nK, 600 nK, 700 nK, 800 nK, 900 nK, 1 μK, 2 μK, 3 μK, 4 μK, 5 μK, 6 μK, 7 μK, 8 μK, 9 μK, 10 μK, 20 μK, 30 μK, 40 μK, 50 μK, 60 μK, 70 μK, 80 μK, 90 μK, 100 μK, or more. The second temperature may be within a range defined by any two of the preceding values. The second MOT may comprise a 1D, 2D, or 3D MOT.

The second MOT may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

Although depicted as comprising two MOTs in FIG. 5, the state preparation unit may comprise any number of MOTs, such as at least about 1, 2, 3, 4, 5, 6, 7, 8, 9, 10, or more MOTs or at most about 10, 9, 8, 7, 6, 5, 4, 3, 2, or 1 MOTs.

The state preparation unit may comprise one or more sideband cooling units or Sisyphus cooling units (such as a sideband cooling unit described in www.arxiv.org/abs/1810.06626 or a Sisyphus cooling unit described in www.arxiv.org/abs/1811.06014, each of which is incorporated herein by reference in its entirety for all purposes). For instance, the state preparation unit may comprise sideband cooling unit or Sisyphus cooling unit 254. Although depicted as comprising a single sideband cooling unit or Sisyphus cooling unit in FIG. 5, the state preparation may comprise any number of sideband cooling units or Sisyphus cooling units, such as at least about 1, 2, 3, 4, 5, 6, 7, 8, 9, 10, or more sideband cooling units or Sisyphus cooling units, or at most about 10, 9, 8, 7, 6, 5, 4, 3, 2, or 1 sideband cooling units or Sisyphus cooling units. The sideband cooling units or Sisyphus cooling units may be configured to use sideband cooling to cool the atoms from the second temperature to a third temperature that is lower than the second temperature. The third temperature may be at most about 10 µK, 9 µK, 8 µK, 7 µK, 6 µK, 5 µK, 4 µK, 3 µK, 2 µK, 1 µK, 900 nK, 800 nK, 700 nK, 600 nK, 500 nK, 400 nK, 300 nK, 200 nK, 100 nK, 90 nK, 80 nK, 70 nK, 60 nK, 50 nK, 40 nK, 30 nK, 20 nK, 10 nK, or less. The third temperature may be at most about 10 nK, 20 nK, 30 nK, 40 nK, 50 nK, 60 nK, 70 nK, 80 nK, 90 nK, 100 nK, 200 nK, 300 nK, 400 nK, 500 nK, 600 nK, 700 nK, 800 nK, 900 nK, 1 µK, 2 µK, 3 µK, 4 µK, 5 µK, 6 µK, 7 µK, 8 µK, 9 µK, 10 µK, or more. The third temperature may be within a range defined by any two of the preceding values.

The sideband cooling units or Sisyphus cooling units may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

The state preparation unit may comprise one or more optical pumping units. For instance, the state preparation unit may comprise optical pumping unit 255. Although depicted as comprising a single optical pumping unit in FIG. 5, the state preparation may comprise any number of optical pumping units, such as at least about 1, 2, 3, 4, 5, 6, 7, 8, 9, 10, or more optical pumping units, or at most about 10, 9, 8, 7, 6, 5, 4, 3, 2, or 1 optical pumping units. The optical pumping units may be configured to emit light to optically pump the atoms from an equilibrium distribution of atomic states to a non-equilibrium atomic state. For instance, the optical pumping units may be configured to emit light to optically pump the atoms from an equilibrium distribution of atomic states to a single pure atomic state. The optical pumping units may be configured to emit light to optically pump the atoms to a ground atomic state or to any other atomic state. The optical pumping units may be configured to optically pump the atoms between any two atomic states. The optical pumping units may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

The state preparation unit may comprise one or more coherent driving units. For instance, the state preparation unit may comprise coherent driving unit 256. Although depicted as comprising a coherent driving unit in FIG. 5, the state preparation may comprise any number of coherent driving units, such as at least about 1, 2, 3, 4, 5, 6, 7, 8, 9, 10, or more coherent driving units or at most about 10, 9, 8, 7, 6, 5, 4, 3, 2, or 1 coherent driving units. The coherent driving units may be configured to coherently drive the atoms from the non-equilibrium state to the first or second atomic states described herein. Thus, the atoms may be optically pumped to an atomic state that is convenient to access (for instance, based on availability of light sources that emit particular wavelengths or based on other factors) and then coherently driven to atomic states described herein that are useful for performing quantum computations. The coherent driving units may be configured to induce a single photon transition between the non-equilibrium state and the first or second atomic state. The coherent driving units may be configured to induce a two-photon transition between the non-equilibrium state and the first or second atomic state. The two-photon transition may be induced using light from two light sources described herein (such as two lasers described herein).

The coherent driving units may comprise one or more light sources (such as any light source described herein) configured to emit light. The light may comprise one or more wavelengths of at least about 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more. The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, or less. The light may comprise one or more wavelengths that are within a range defined by any two of the preceding values. For instance, the light may comprise one or more wavelengths that are within a range from 400 nm to 1,000 nm, 500 nm to 1,000 nm, 600 nm to 1,000 nm, 650 nm to 1,000 nm, 400 nm to 900 nm, 400 nm to 800 nm, 400 nm to 700 nm, 400 nm to 600 nm, 400 nm to 500 nm, 500 nm to 700 nm, or 650 nm to 700 nm.

The coherent driving units may be configured to induce an RF transition between the non-equilibrium state and the first or second atomic state. The coherent driving units may comprise one or more electromagnetic radiation sources configured to emit electromagnetic radiation configured to induce the RF transition. For instance, the coherent driving units may comprise one or more RF sources (such as any RF source described herein) configured to emit RF radiation. The RF radiation may comprise one or more wavelengths of at least about 10 centimeters (cm), 20 cm, 30 cm, 40 cm, 50 cm, 60 cm, 70 cm, 80 cm, 90 cm, 1 meter (m), 2 m, 3 m, 4 m, 5 m, 6 m, 7 m, 8 m, 9 m, 10 m, or more. The RF radiation may comprise one or more wavelengths of at most about 10 m, 9 m, 8 m, 7 m, 6 m, 5 m, 4 m, 3 m, 2 m, 1 m, 90 cm, 80 cm, 70 cm, 60 cm, 50 cm, 40 cm, 30 cm, 20 cm, 10 cm, or less. The RF radiation may comprise one or more wavelengths that are within a range defined by any two of the preceding values. Alternatively or in addition, the coherent driving units may comprise one or more light sources (such as any light sources described herein) configured to induce a two-photon transition corresponding to the RF transition.

Example of Controllers

The optical trapping units, electromagnetic delivery units, entanglement units, readout optical units, vacuum units, imaging units, spatial configuration AI units, spatial arrangement AI units, atom rearrangement units, state preparation units, sideband cooling units, optical pumping units, coherent driving units, electromagnetic energy AI units, atom reservoirs, atom movement units, or Rydberg excitation units may include one or more circuits or controllers (such as one or more electronic circuits or controllers) that is connected (for instance, by one or more electronic connections) to the optical trapping units, electromagnetic delivery units, entanglement units, readout optical units, vacuum units, imaging units, spatial configuration AI units, spatial arrangement AI units, atom rearrangement units, state preparation units, sideband cooling units, optical pumping units, coherent driving units, electromagnetic energy AI units, atom reservoirs, atom movement units, or Rydberg excitation units. The circuits or controllers may be configured to control the optical trapping units, electromagnetic delivery units, entanglement units, readout optical units, vacuum units, imaging units, spatial configuration AI units, spatial arrangement AI units, atom rearrangement units, state preparation units, sideband cooling units, optical pumping units, coherent driving units, electromagnetic energy AI units, atom reservoirs, atom movement units, or Rydberg excitation units.

Example of Non-Classical Computers

In an aspect, the present disclosure provides a non-classical computer comprising: a plurality of qubits comprising greater than 60 atoms, each atom trapped within an optical trapping site of a plurality of spatially distinct optical trapping sites, wherein the plurality of qubits comprise at least a first qubit state and a second qubit state, wherein the first qubit state comprises a first atomic state and the second qubit state comprises a second atomic state; one or more electromagnetic delivery units configured to apply electromagnetic energy to one or more qubits of the plurality of qubits, thereby imparting a non-classical operation to the one or more qubits, which non-classical operation includes a superposition between at least the first qubit state and the second qubit state; one or more entanglement units configured to quantum mechanically entangle at least a subset of the plurality of qubits in the superposition with at least another qubit of the plurality of qubits; and one or more readout optical units configured to perform one or more measurements of the one or more qubits, thereby obtaining a non-classical computation.

In an aspect, the present disclosure provides a non-classical computer comprising a plurality of qubits comprising greater than 60 atoms each trapped within an optical trapping site of a plurality of spatially distinct optical trapping sites.

Example of Methods for Performing a Non-Classical Computation

In an aspect, the present disclosure provides a method for performing a non-classical computation, comprising: (a)

generating a plurality of spatially distinct optical trapping sites, the plurality of optical trapping sites configured to trap a plurality of atoms, the plurality of atoms comprising greater than 60 atoms; (b) applying electromagnetic energy to one or more atoms of the plurality of atoms, thereby inducing the one or more atoms to adopt one or more superposition states of a first atomic state and at least a second atomic state that is different from the first atomic state; (c) quantum mechanically entangling at least a subset of the one or more atoms in the one or more superposition states with at least another atom of the plurality of atoms; and (d) performing one or more optical measurements of the one or more superposition state to obtain the non-classical computation.

Figure 6:
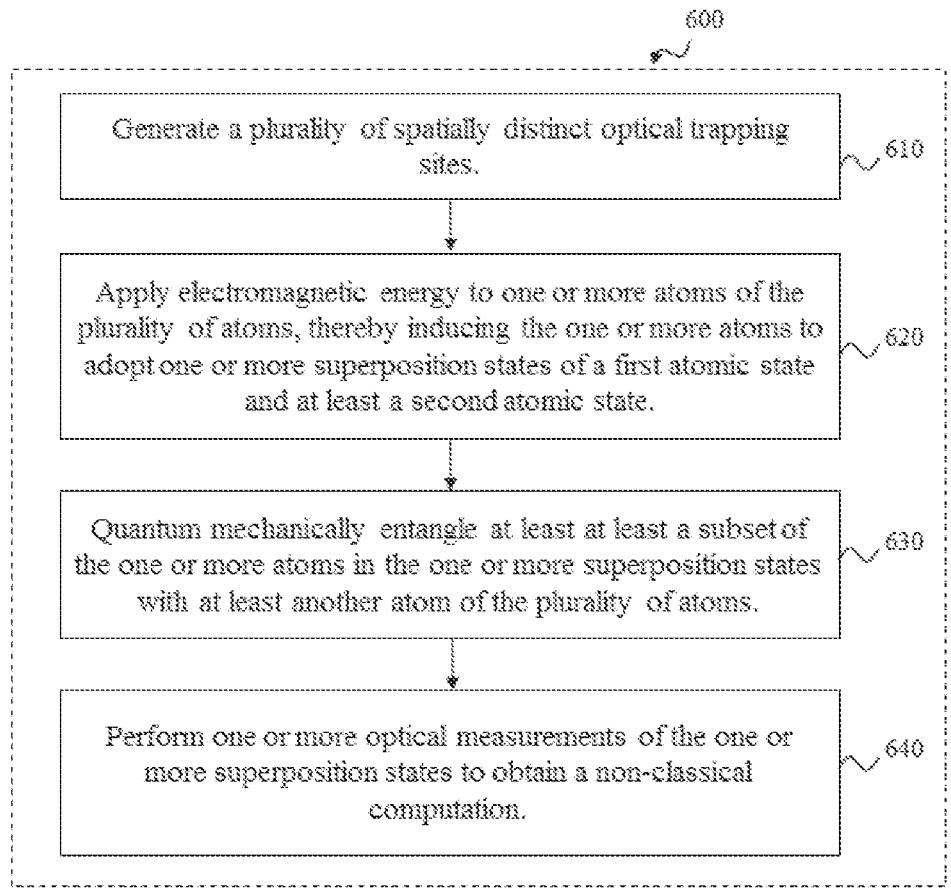
FIG. 6 shows a flowchart for an example of a first method for performing a non-classical computation.

FIG. 6 shows a flowchart for an example of a first method 600 for performing a non-classical computation.

In a first operation 610, the method 600 may comprise generating a plurality of spatially distinct optical trapping sites. The plurality of optical trapping sites may be configured to trap a plurality of atoms. The plurality of atoms may comprise greater than 60 atoms. The optical trapping sites may comprise any optical trapping sites described herein. The atoms may comprise any atoms described herein.

In a second operation 620, the method 600 may comprise applying electromagnetic energy to one or more atoms of the plurality of atoms, thereby inducing the one or more atoms to adopt one or more superposition states of a first atomic state and at least a second atomic state that is different from the first atomic state. The electromagnetic energy may comprise any electromagnetic energy described herein. The first atomic state may comprise any first atomic state described herein. The second atomic state may comprise any second atomic state described herein.

In a third operation 630, the method 600 may comprise quantum mechanically entangling at least a subset of the one or more atoms in the one or more superposition states with at least another atom of the plurality of atoms. The atoms may be quantum mechanically entangled in any manner described herein (for instance, as described herein with respect to FIG. 2).

In a fourth operation 640, the method 600 may comprise performing one or more optical measurements of the one or more superposition state to obtain the non-classical computation. The optical measurements may comprise any optical measurements described herein.

In an aspect, the present disclosure provides a method for performing a non-classical computation, comprising: (a) providing a plurality of qubits comprising greater than 60 atoms, each atom trapped within an optical trapping site of a plurality of spatially distinct optical trapping sites, wherein the plurality of qubits comprise at least a first qubit state and a second qubit state, wherein the first qubit state comprises a first atomic state and the second qubit state comprises a second atomic state; (b) applying electromagnetic energy to one or more qubits of the plurality of qubits, thereby imparting a non-classical operation to the one or more qubits, which non-classical operation includes a superposition between at least the first qubit state and the second qubit state; (c) quantum mechanically entangling at least a subset of the plurality of qubits in the superposition with at least another qubit of the plurality of qubits; and (d) performing one or more optical measurements of the one or more qubits, thereby obtaining said the-classical computation.

Figure 7:
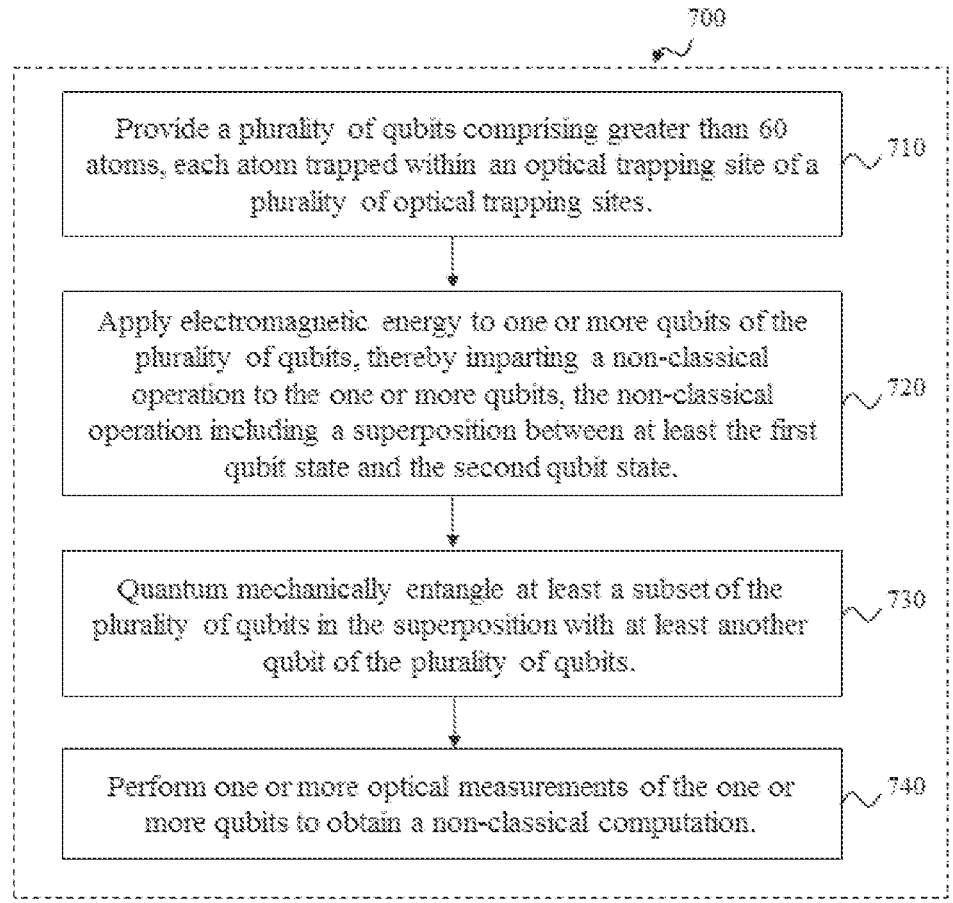
FIG. 7 shows a flowchart for an example of a second method for performing a non-classical computation.

FIG. 7 shows a flowchart for an example of a second method 700 for performing a non-classical computation.

In a first operation 710, the method 700 may comprise providing a plurality of qubits comprising greater than 60 atoms, each atom trapped within an optical trapping site of a plurality of spatially distinct optical trapping sites, wherein the plurality of qubits comprise at least a first qubit state and a second qubit state, wherein the first qubit state comprises a first atomic state and the second qubit state comprises a second atomic state. The optical trapping sites may comprise any optical trapping sites described herein. The qubits may comprise any qubits described herein. The atoms may comprise any atoms described herein. The first qubit state may comprise any first qubit state described herein. The second qubit state may comprise any second qubit state described herein. The first atomic state may comprise any first atomic state described herein. The second atomic state may comprise any second atomic state described herein.

In a second operation 720, the method 700 may comprise applying electromagnetic energy to one or more qubits of the plurality of qubits, thereby imparting a non-classical operation to the one or more qubits, which non-classical operation includes a superposition between at least the first qubit state and the second qubit state. The electromagnetic energy may comprise any electromagnetic energy described herein.

In a third operation 730, the method 700 may comprise quantum mechanically entangling at least a subset of the plurality of qubits in the superposition with at least another qubit of the plurality of qubits. The qubits may be quantum mechanically entangled in any manner described herein (for instance, as described herein with respect to FIG. 2).

In a fourth operation 740, the method 700 may comprise performing one or more optical measurements of the one or more qubits, thereby obtaining the non-classical computation. The optical measurements may comprise any optical measurements described herein.

In an aspect, the present disclosure provides a method for performing a non-classical computation, comprising: (a) providing a plurality of qubits comprising greater than 60 atoms each trapped within an optical trapping site of a plurality of spatially distinct optical trapping sites, and (b) using at least a subset of the plurality of qubits to perform the non-classical computation.

Figure 8:
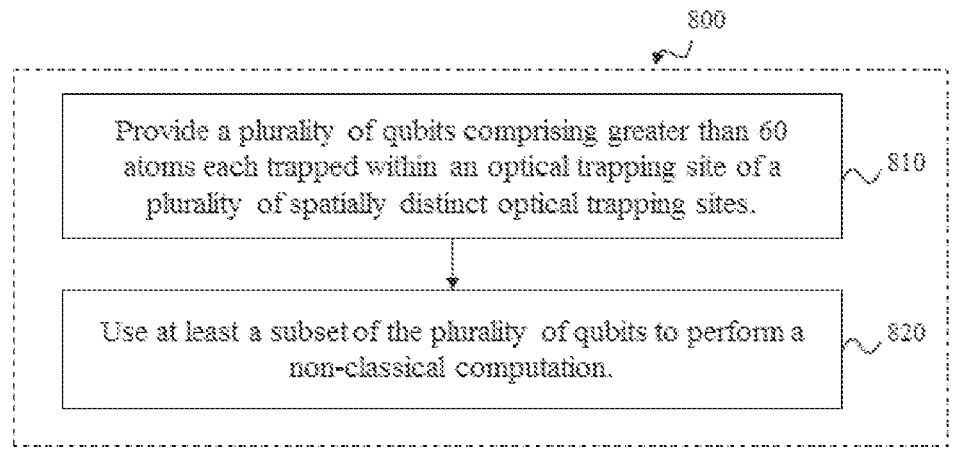
FIG. 8 shows a flowchart for an example of a third method for performing a non-classical computation.

FIG. 8 shows a flowchart for an example of a third method 800 for performing a non-classical computation.

In a first operation 810, the method 800 may comprise providing a plurality of qubits comprising greater than 60 atoms each trapped within an optical trapping site of a plurality of spatially distinct optical trapping sites. The qubits may comprise any qubits described herein. The atoms may comprise any atoms described herein. The optical trapping sites may comprise any optical trapping sites described herein.

In a second operation 820, the method 800 may comprise using at least a subset of the plurality of qubits to perform a non-classical computation.

Example of Computer Systems

FIG. 1 shows a computer system 101 that is programmed or otherwise configured to operate any method or system described herein (such as system or method for performing a non-classical computation described herein). The computer system 101 can regulate various aspects of the present disclosure. The computer system 101 can be an electronic device of a user or a computer system that is remotely located with respect to the electronic device. The electronic device can be a mobile electronic device.

The computer system 101 includes a central processing unit (CPU, also "processor" and "computer processor" herein) 105, which can be a single core or multi core processor, or a plurality of processors for parallel processing. The computer system 101 also includes memory or memory location 110 (e.g., random-access memory, read-only memory, flash memory), electronic storage unit 115 (e.g., hard disk), communication interface 120 (e.g., network adapter) for communicating with one or more other systems, and peripheral devices 125, such as cache, other memory, data storage and/or electronic display adapters. The memory 110, storage unit 115, interface 120 and peripheral devices 125 are in communication with the CPU 105 through a communication bus (solid lines), such as a motherboard. The storage unit 115 can be a data storage unit (or data repository) for storing data. The computer system 101 can be operatively coupled to a computer network ("network") 130 with the aid of the communication interface 120. The network 130 can be the Internet, an internet and/or extranet, or an intranet and/or extranet that is in communication with the Internet. The network 130 in some cases is a telecommunication and/or data network. The network 130 can include one or more computer servers, which can enable distributed computing, such as cloud computing. The network 130, in some cases with the aid of the computer system 101, can implement a peer-to-peer network, which may enable devices coupled to the computer system 101 to behave as a client or a server.

The CPU 105 can execute a sequence of machine-readable instructions, which can be embodied in a program or software. The instructions may be stored in a memory location, such as the memory 110. The instructions can be directed to the CPU 105, which can subsequently program or otherwise configure the CPU 105 to implement methods of the present disclosure. Examples of operations performed by the CPU 105 can include fetch, decode, execute, and writeback.

The CPU 105 can be part of a circuit, such as an integrated circuit. One or more other components of the system 101 can be included in the circuit. In some cases, the circuit is an application specific integrated circuit (ASIC).

The storage unit 115 can store files, such as drivers, libraries and saved programs. The storage unit 115 can store user data, e.g., user preferences and user programs. The computer system 101 in some cases can include one or more additional data storage units that are external to the computer system 101, such as located on a remote server that is in communication with the computer system 101 through an intranet or the Internet.

The computer system 101 can communicate with one or more remote computer systems through the network 130. For instance, the computer system 101 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 101 via the network 130.

Methods as described herein can be implemented by way of machine (e.g., computer processor) executable code stored on an electronic storage location of the computer system 101, such as, for example, on the memory 110 or electronic storage unit 115. The machine executable or machine-readable code can be provided in the form of software. During use, the code can be executed by the processor 105. In some cases, the code can be retrieved from the storage unit 115 and stored on the memory 110 for ready access by the processor 105. In some situations, the electronic storage unit 115 can be precluded, and machine-executable instructions are stored on memory 110.

The code can be pre-compiled and configured for use with a machine having a processor adapted to execute the code or can be compiled during runtime. The code can be supplied in a programming language that can be selected to enable the code to execute in a pre-compiled or as-compiled fashion.

Aspects of the systems and methods provided herein, such as the computer system 101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 101 can include or be in communication with an electronic display 135 that comprises a user interface (UI) 140. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 105. The algorithm can, for example, implement methods for performing a non-classical computation described herein.

CERTAIN DEFINITIONS AND CONSIDERATIONS

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," "less than or equal to," or "at most" precedes the first numerical value in a series of two or more numerical values, the term "no more than," "less than," "less than or equal to," or "at most" applies to each of the numerical values in that series of numerical values. For example, less than or equal to 3, 2, or 1 is equivalent to less than or equal to 3, less than or equal to 2, or less than or equal to 1.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

As used herein, like characters refer to like elements.

As used herein, the terms "non-classical computation," "non-classical procedure," "non-classical operation," any "non-classical computer" generally refer to any method or system for performing computational procedures outside of the paradigm of classical computing. A non-classical computation, non-classical procedure, non-classical operation, or non-classical computer may comprise a quantum computation, quantum procedure, quantum operation, or quantum computer.

As used herein, the terms "quantum computation," "quantum procedure," "quantum operation," and "quantum computer" generally refer to any method or system for performing computations using quantum mechanical operations (such as unitary transformations or completely positive trace-preserving (CPTP) maps on quantum channels) on a Hilbert space represented by a quantum device. As such, quantum and classical (or digital) computation may be similar in the following aspect: both computations may comprise sequences of instructions performed on input information to then provide an output. Various paradigms of quantum computation may break the quantum operations down into sequences of basic quantum operations that affect a subset of qubits of the quantum device simultaneously. The quantum operations may be selected based on, for instance, their locality or their ease of physical implementation. A quantum procedure or computation may then consist of a sequence of such instructions that in various applications may represent different quantum evolutions on the quantum device. For example, procedures to compute or simulate quantum chemistry may represent the quantum states and the annihilation and creation operators of electron spin-orbitals by using qubits (such as two-level quantum systems) and a universal quantum gate set (such as the Hadamard, controlled-not (CNOT), and rotations) through the so-called Jordan-Wigner transformation or Bravyi-Kitaev transformation.

Additional examples of quantum procedures or computations may include procedures for optimization such as quantum approximate optimization algorithm (QAOA) or quantum minimum finding. QAOA may comprise performing rotations of single qubits and entangling gates of multiple qubits. In quantum adiabatic computation, the instructions may carry stochastic or non-stochastic paths of evolution of an initial quantum system to a final one.

Quantum-inspired procedures may include simulated annealing, parallel tempering, master equation solver, Monte Carlo procedures and the like. Quantum-classical or hybrid algorithms or procedures may comprise such procedures as variational quantum eigensolver (VQE) and the variational and adiabatically navigated quantum eigensolver (VanQver).

A quantum computer may comprise one or more adiabatic quantum computers, quantum gate arrays, one-way quantum computers, topological quantum computers, quantum Turing machines, quantum annealers, Ising solvers, or gate models of quantum computing.

As used herein, the term "adiabatic" refers to any process performed on a quantum mechanical system in which the parameters of the Hamiltonian are changed slowly in comparison to the natural timescale of evolution of the system.

As used herein, the term "non-adiabatic" refers to any process performed quantum mechanical system in which the parameters of the Hamiltonian are changed quickly in comparison to the natural timescale of evolution of the system or on a similar timescale as the natural timescale of evolution of the system.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A device for forming an optical trap, the device comprising:
   a first optical cavity, said first optical cavity configured to form a first standing wave pattern, wherein said first standing wave pattern is two-dimensional;
   a second optical cavity, said second optical cavity configured to form a second standing wave pattern, wherein said second standing wave pattern is one-dimensional; and
   a chamber configured to hold one or more atoms disposed within a three-dimensional array of trapping potentials formed by an overlap between said first standing wave pattern and said second standing wave pattern.

2. The device of claim 1, wherein said one or more atoms comprise one or more qubits.

3. The device of claim 2, wherein said one or more qubits are configured to perform a quantum computation.

4. The device of claim 3, wherein said quantum computation comprises a gate-model quantum computation or an adiabatic quantum computation.

5. The device of claim 1, wherein said one or more atoms comprise neutral atoms.

6. The device of claim 1, wherein said first optical cavity is a folded, standing wave cavity.

7. The device of claim 6, wherein said first optical cavity comprises two end mirrors and at least two fold mirrors, wherein said at least two fold mirrors are oriented to form a point of intersection, within said first optical cavity.

8. The device of claim 7, wherein each of said two end mirrors has a radius of curvature of at least 40 millimeters (mm).

9. The device of claim 7, wherein said at least two fold mirrors are flat.

10. The device of claim 7, wherein said point of intersection is coincident with an imaging axis of an imager configured to obtain one or more images of said one or more atoms.

11. The device of claim 1, wherein said second optical cavity is a folded, running wave cavity.

12. The device of claim 11, wherein a first arm and a second arm of said folded, running wave cavity intersect to form an accordion mode.

13. The device of claim 11, wherein said folded, running wave cavity comprises a point of intersection, wherein said point of intersection is coincident with an imaging axis of an imager configured to obtain one or more images of said one or more atoms.

14. The device of claim 1, wherein said second optical cavity is a ring cavity.

15. The device of claim 14, wherein said ring cavity comprises a bow-tie configuration, wherein said bow-tie configuration comprises a point of intersection, wherein said point of intersection is coincident with an imaging axis of an imaging unit configured to obtain one or more images of said one or more atoms.

16. The device of claim 1, wherein said first standing wave pattern is within said first optical cavity, and wherein said second standing wave pattern is within said second optical cavity.

17. The device of claim 16, wherein said second standing wave pattern is within a third-dimension that is not parallel to either dimension of said first standing wave pattern.

18. The device of claim 17, wherein a period of said second standing wave pattern is twice a period of said two-dimensional standing wave pattern.

19. The device of claim 1, wherein said first optical cavity or said second optical cavity is part of said chamber.

20. The device of claim 1, wherein said one or more atoms disposed within said three-dimensional trapping potential comprise a temperature of 10 microkelvin (µK).

21. The device of claim 1, wherein said first optical cavity and said second optical cavity are disposed within one or more vacuum units configured to maintain a pressure of at most $10^{-6}$ Pascal (Pa).

22. The device of claim 1, wherein said three-dimensional trapping potential comprises a plurality of optical trapping sites, wherein each optical trapping site of said plurality of optical trapping sites is spatially distinct.

23. The device of claim 22, wherein each optical trapping site of said plurality of optical trapping sites is spatially separated from each other optical trapping site by at least 200 nanometers (nm).

24. The device of claim 22, wherein each optical trapping site of said plurality of optical trapping sites is configured to trap a single atom of said plurality of atoms.

25. The device of claim 1, wherein said first optical cavity and said second optical cavity each comprises one or more cavity mirrors, wherein each of said one or more cavity mirrors is disposed within a cavity spacer.

26. The device of claim 25, wherein said cavity spacer comprises ultra-low thermal expansion glass, wherein said ultra-low thermal expansion glass comprises a coefficient of thermal expansion of at most 400+/−30 parts per billion (ppB)/° C. at 5 to 35° C.

27. A method for forming an optical trap, the method comprising:
   forming a first standing wave pattern with a first optical cavity, wherein said first standing wave pattern is two-dimensional;
   forming a second standing wave pattern with a second optical cavity, wherein said second standing wave pattern is one-dimensional; and
   holding one or more atoms disposed within a three-dimensional array of trapping potentials, wherein said three-dimensional array of trapping potentials is formed by an overlap between said first standing wave pattern and said second standing wave pattern.

28. The method of claim 27, wherein said second standing wave pattern is within a third-dimension that is not parallel to either dimension of said first standing wave pattern.

29. The method of claim 27, wherein said first optical cavity is a folded, standing wave cavity, and wherein said second optical cavity is a folded, running wave cavity.

30. The method of claim 29, wherein a first arm and a second arm of said folded, running wave cavity intersect to form an accordion mode.

31. The method of claim 29, wherein said second optical cavity is a ring cavity.

32. The method of claim 31, wherein said ring cavity comprises a bow-tie configuration.

33. The method of claim 29, wherein a first arm and a second arm of said folded, standing wave cavity intersect to form the two-dimensional standing wave pattern.

34. The method of claim 27, wherein said three-dimensional trapping potential comprises a plurality of optical trapping sites, wherein each optical trapping site of said plurality of optical trapping sites is spatially distinct.

* * * * *

UNITED STATES PATENT AND TRADEMARK OFFICE
CERTIFICATE OF CORRECTION

Page 1 of 1

PATENT NO. : 11,875,227 B2
APPLICATION NO. : 18/333437
DATED : January 16, 2024
INVENTOR(S) : Albert Ryou et al.

It is certified that error appears in the above-identified patent and that said Letters Patent is hereby corrected as shown below:

On the Title Page

(73) "Mickey Mcdonald" should read --Mickey McDonald--

Signed and Sealed this
Ninth Day of December, 2025

John A. Squires
*Director of the United States Patent and Trademark Office*